(12) United States Patent
Lee et al.

(10) Patent No.: US 11,729,724 B2
(45) Date of Patent: Aug. 15, 2023

(54) METHOD FOR TRANSMITTING UPLINK PHYSICAL CHANNEL IN WIRELESS COMMUNICATION SYSTEM AND DEVICE FOR SUPPORTING SAME

(71) Applicant: LG ELECTRONICS INC., Seoul (KR)

(72) Inventors: Hyunho Lee, Seoul (KR); Duckhyun Bae, Seoul (KR); Kyuhwan Kwak, Seoul (KR); Yunjung Yi, Seoul (KR)

(73) Assignee: LG ELECTRONICS INC., Seoul (KR)

(*) Notice: Subject to any disclaimer, the term of this patent is extended or adjusted under 35 U.S.C. 154(b) by 84 days.

(21) Appl. No.: 17/044,301

(22) PCT Filed: Mar. 29, 2019

(86) PCT No.: PCT/KR2019/003694
§ 371 (c)(1),
(2) Date: Sep. 30, 2020

(87) PCT Pub. No.: WO2019/203472
PCT Pub. Date: Oct. 24, 2019

(65) Prior Publication Data
US 2021/0084596 A1 Mar. 18, 2021

Related U.S. Application Data

(60) Provisional application No. 62/759,910, filed on Nov. 12, 2018, provisional application No. 62/711,606, (Continued)

(51) Int. Cl.
*H04W 52/14* (2009.01)
*H04W 52/24* (2009.01)
(Continued)

(52) U.S. Cl.
CPC ....... *H04W 52/143* (2013.01); *H04W 52/242* (2013.01); *H04W 52/248* (2013.01); *H04W 72/0446* (2013.01); *H04W 72/23* (2023.01)

(58) Field of Classification Search
CPC ............. H04W 52/242; H04W 52/248; H04W 72/0446; H04W 72/23; H04W 52/143; H04W 52/146
See application file for complete search history.

(56) References Cited

U.S. PATENT DOCUMENTS 6,285,886 B1 * 9/2001 Kamel ................ H04W 52/283
455/69
2010/0238892 A1 * 9/2010 Dahlman .............. H04W 52/54
370/329
(Continued)

OTHER PUBLICATIONS

PCT International Application No. PCT/KR2019/003694, International Search Report dated Jul. 24, 2019, 3 pages.
(Continued)

*Primary Examiner* — James P Duffy
(74) *Attorney, Agent, or Firm* — Lee, Hong, Degerman, Kang & Waimey PC

(57) ABSTRACT

A method for transmitting an uplink physical channel in a wireless communication system and a device supporting the same are disclosed. More specifically, the method performed by a user equipment (UE) includes receiving, from a base station, transmission power related information via higher layer signaling, receiving a physical downlink control channel from the base station, and transmitting the uplink physical channel to the base station based on the physical downlink control channel, wherein the uplink physical channel includes a first uplink physical channel or a second uplink physical channel, wherein transmission powers for the first uplink physical channel and the second uplink physical channel are respectively calculated by different power related parameters determined based on the transmission power related information and the physical downlink control channel.

14 Claims, 21 Drawing Sheets

Related U.S. Application Data filed on Jul. 29, 2018, provisional application No. 62/675,676, filed on May 23, 2018, provisional application No. 62/658,492, filed on Apr. 16, 2018.

(51) Int. Cl.
*H04W 72/0446* (2023.01)
*H04W 72/23* (2023.01)

(56) References Cited

U.S. PATENT DOCUMENTS

2015/0124673 A1* 5/2015 Ouchi ................ H04W 52/362
370/311
2016/0337984 A1 11/2016 Takeda et al.

OTHER PUBLICATIONS

LG Electronics, "Remaining issues on non-CA aspect of UL power control," 3GPP TSG RAN WG1 Meeting 92bis, R1-1804566, Sanya, China, Apr. 16-20, 2018, 4 pages.
Huawei et al., "PUCCH reliability," 3GPP TSG RAN WG1 Meeting #92bis, R1-1804291, Sanya, China, Apr. 16-20, 2018, 4 pages.
OPPO, "Summary of offline discussion on PUCCH resource allocation," 3GPP TSG RAN WG1 Meeting #92, R1-1803428, Athens, Greece, Feb. 26-Mar. 2, 2018, 11 pages.
Huawei et al., "Remaining details of UL power control design," 3GPP TSG RAN WG1 Meeting #92, R1-1801462, Athens, Greece, Feb. 26-Mar. 2, 2018, 14 pages.

* cited by examiner

[FIG. 2]
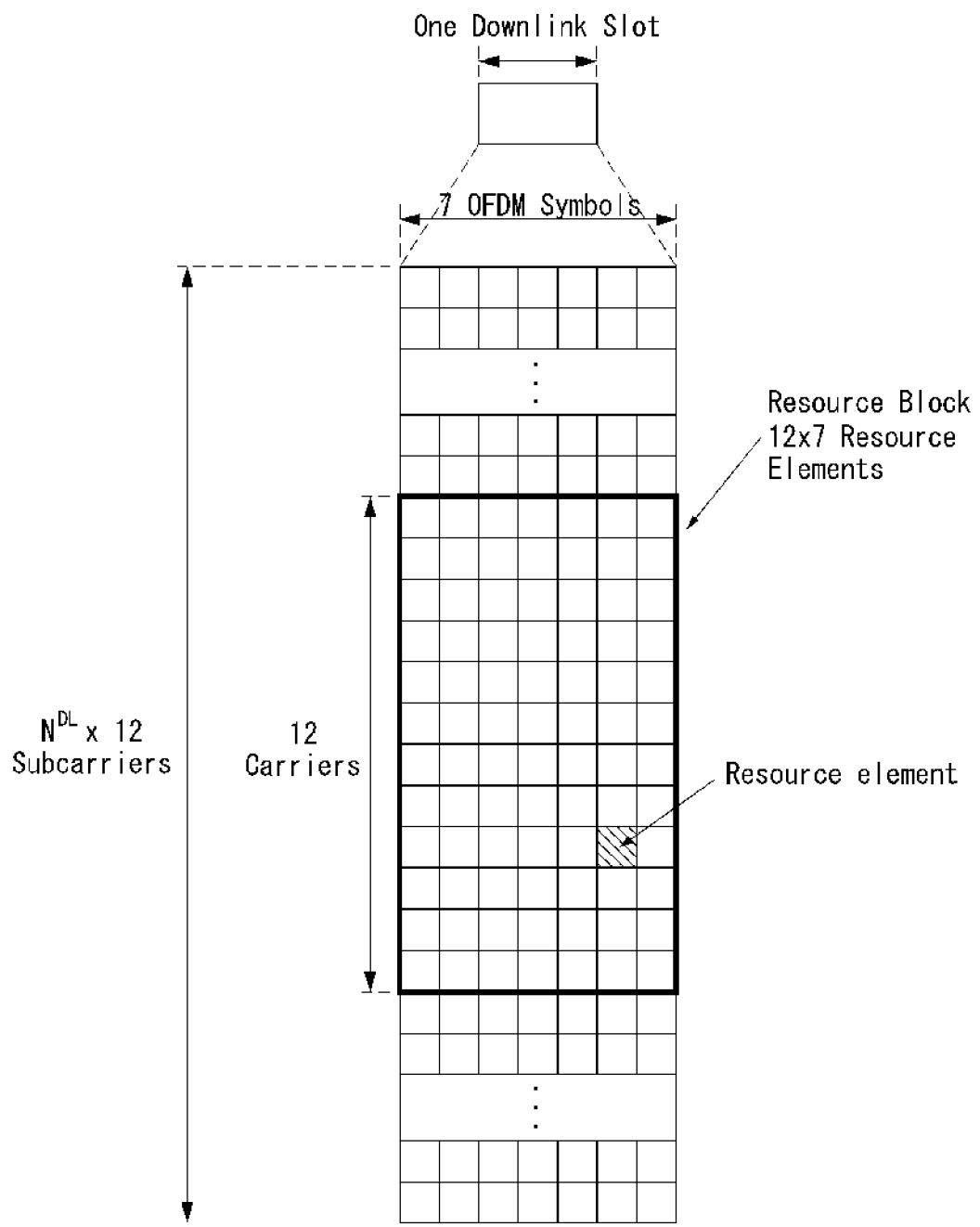

[FIG. 3]
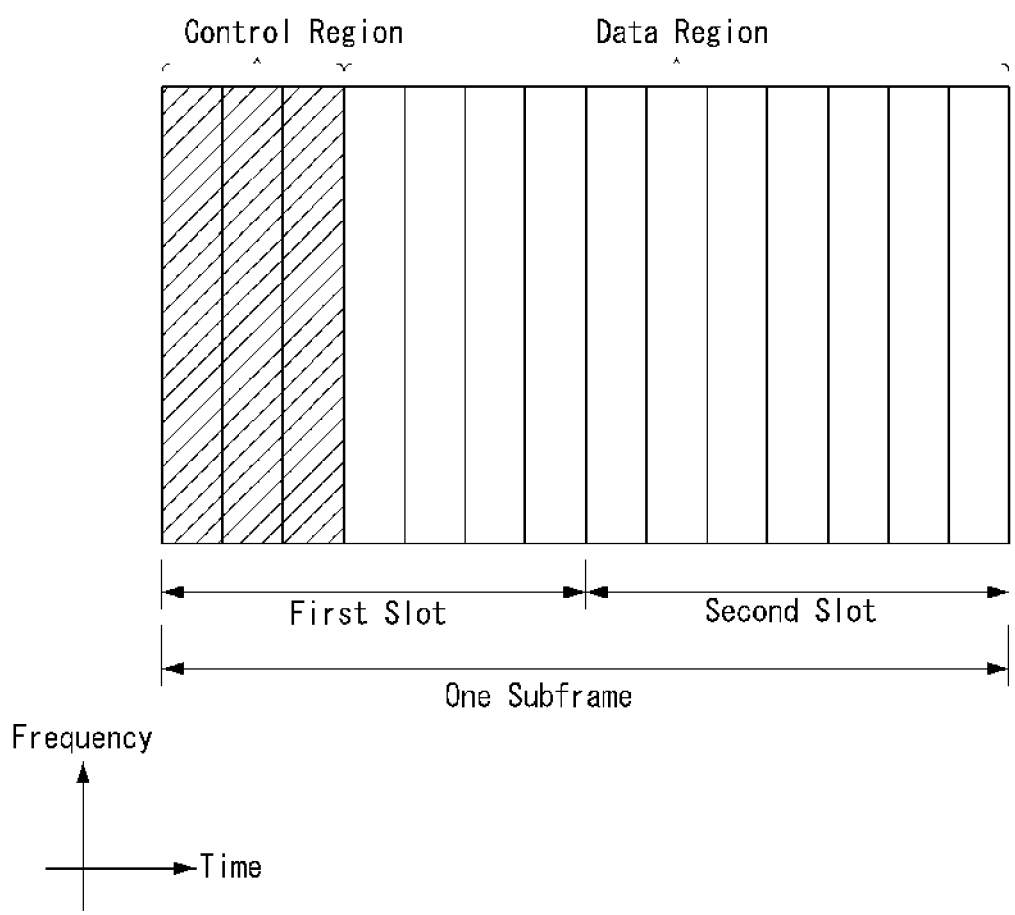

[FIG. 4]
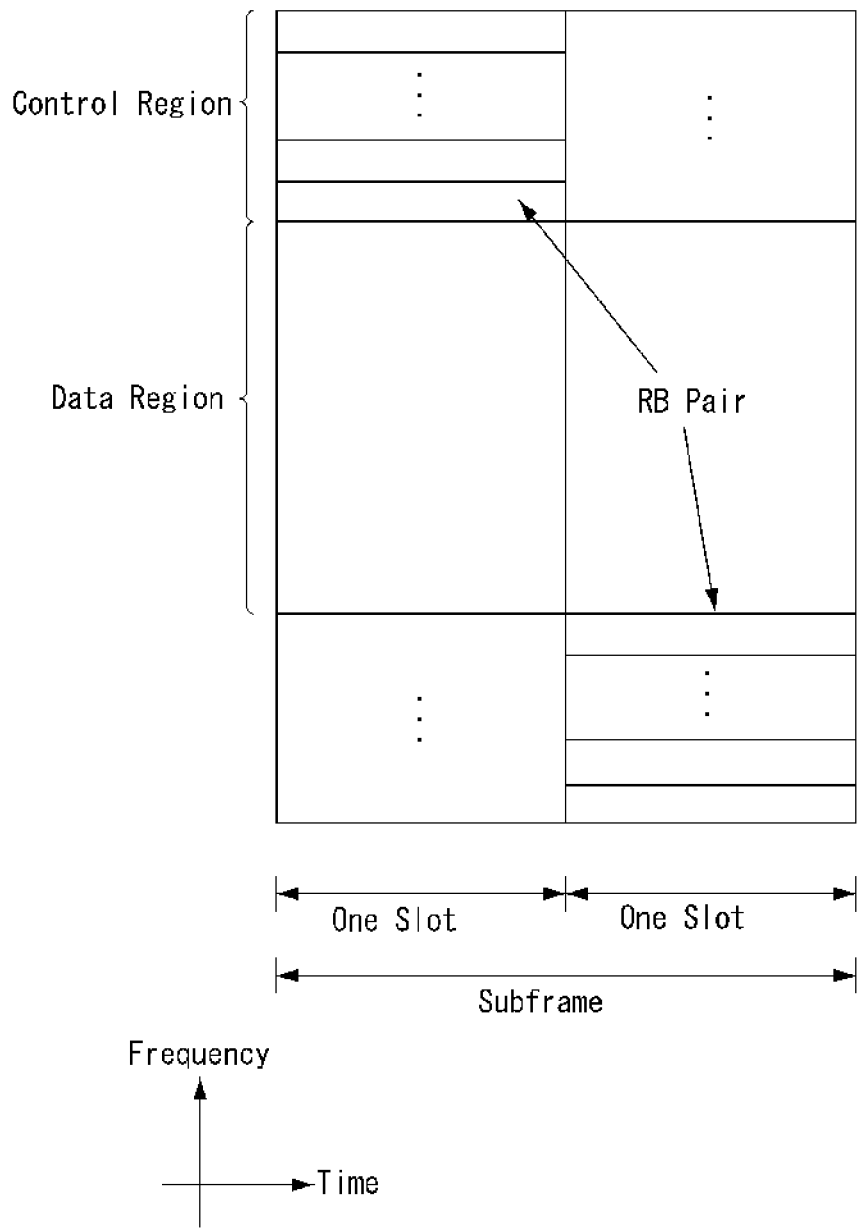

【FIG. 5】
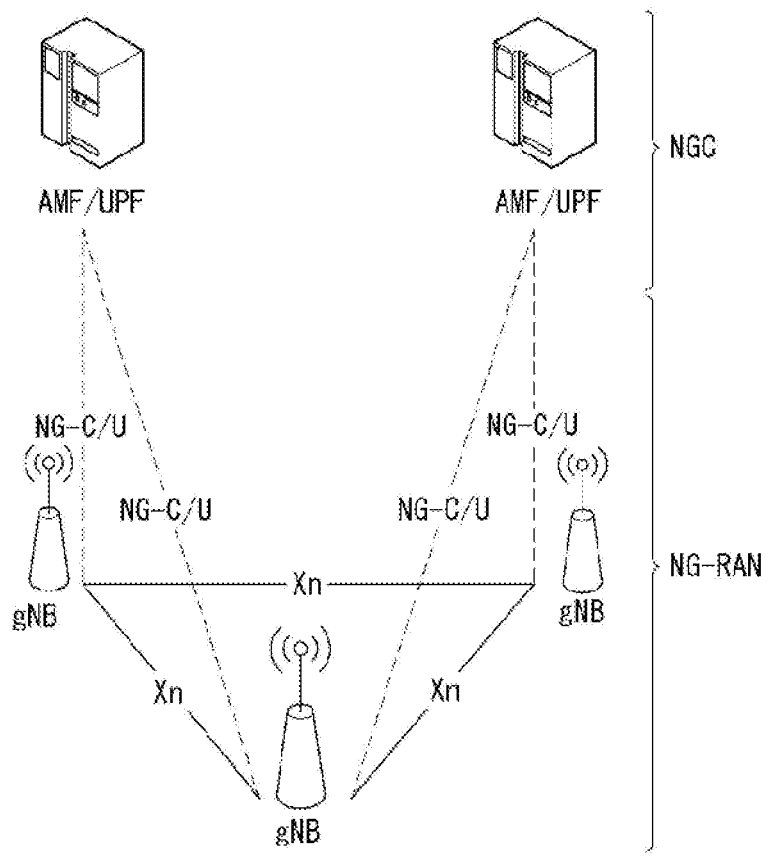
【FIG. 6】
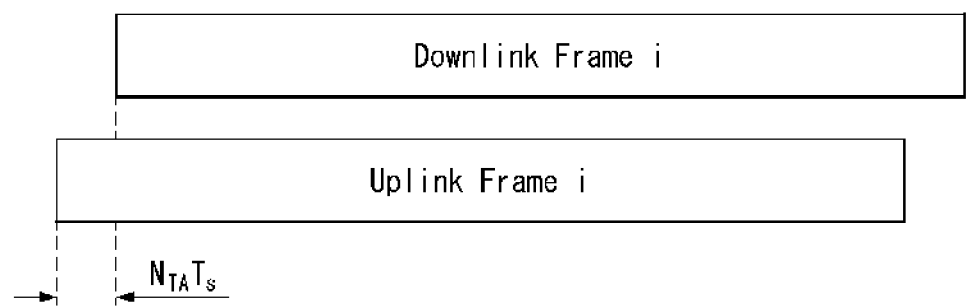

[FIG. 18]
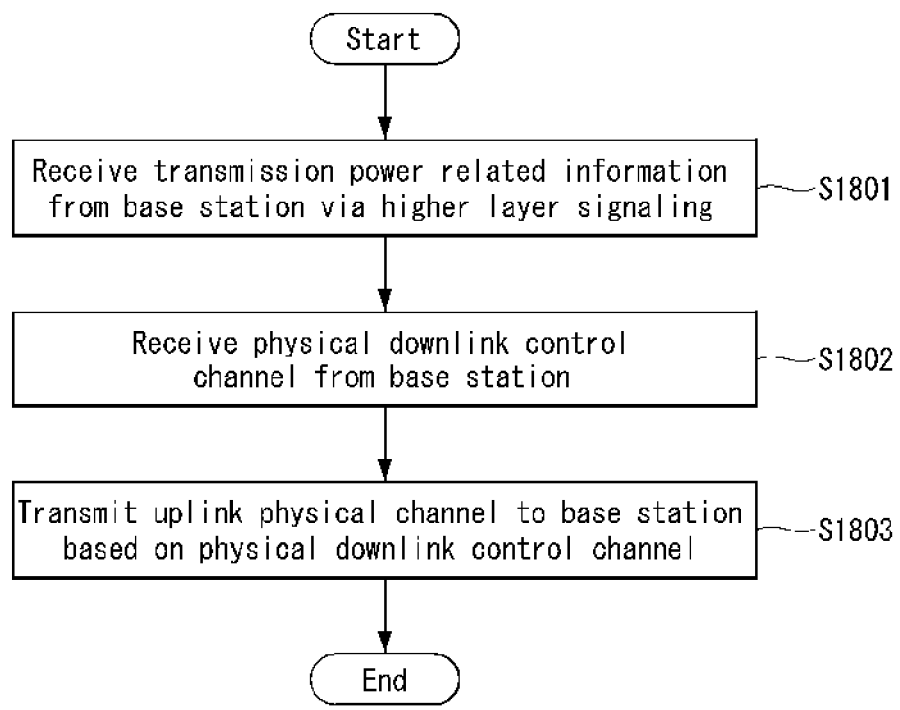

[FIG. 19]
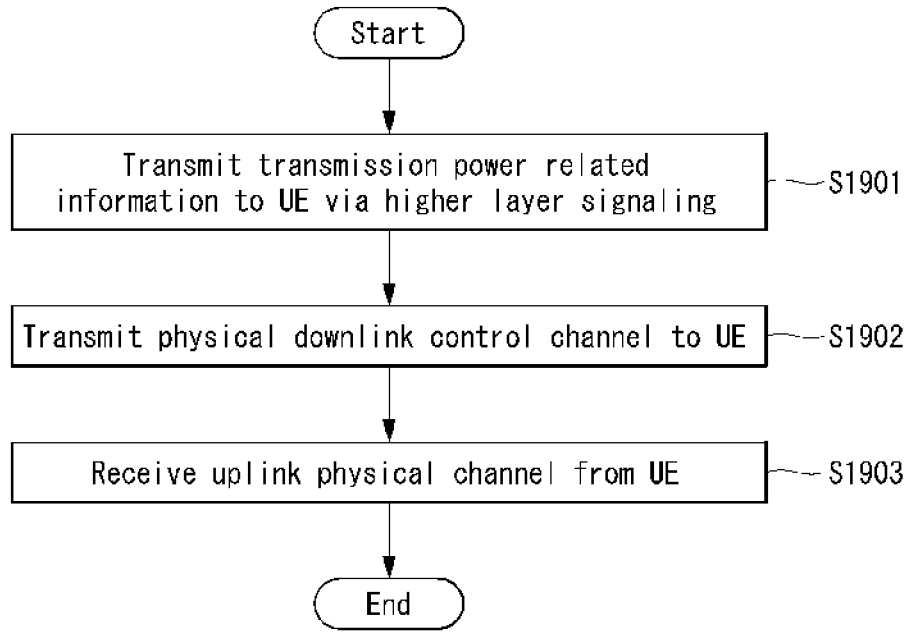
[FIG. 20]
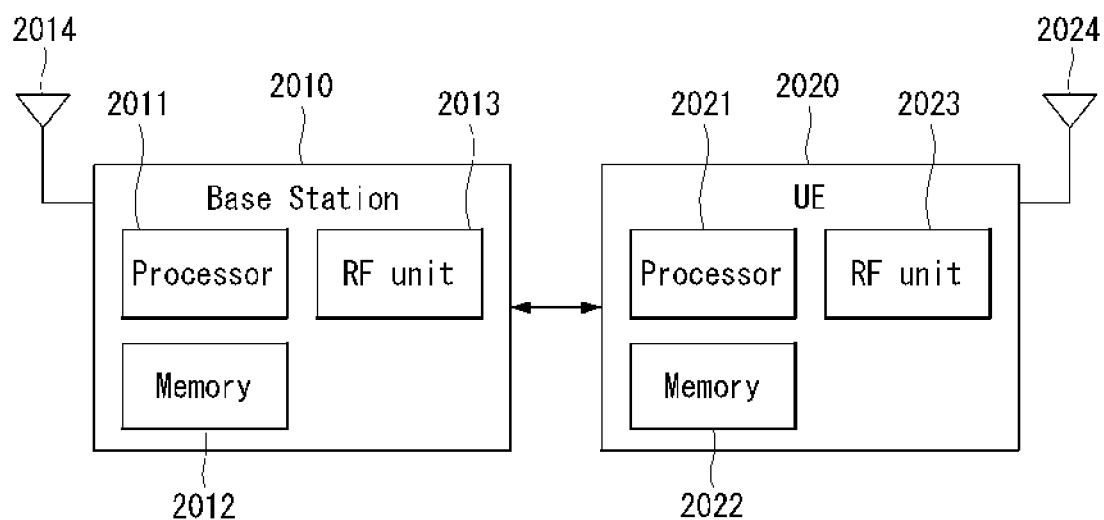

[FIG. 21]
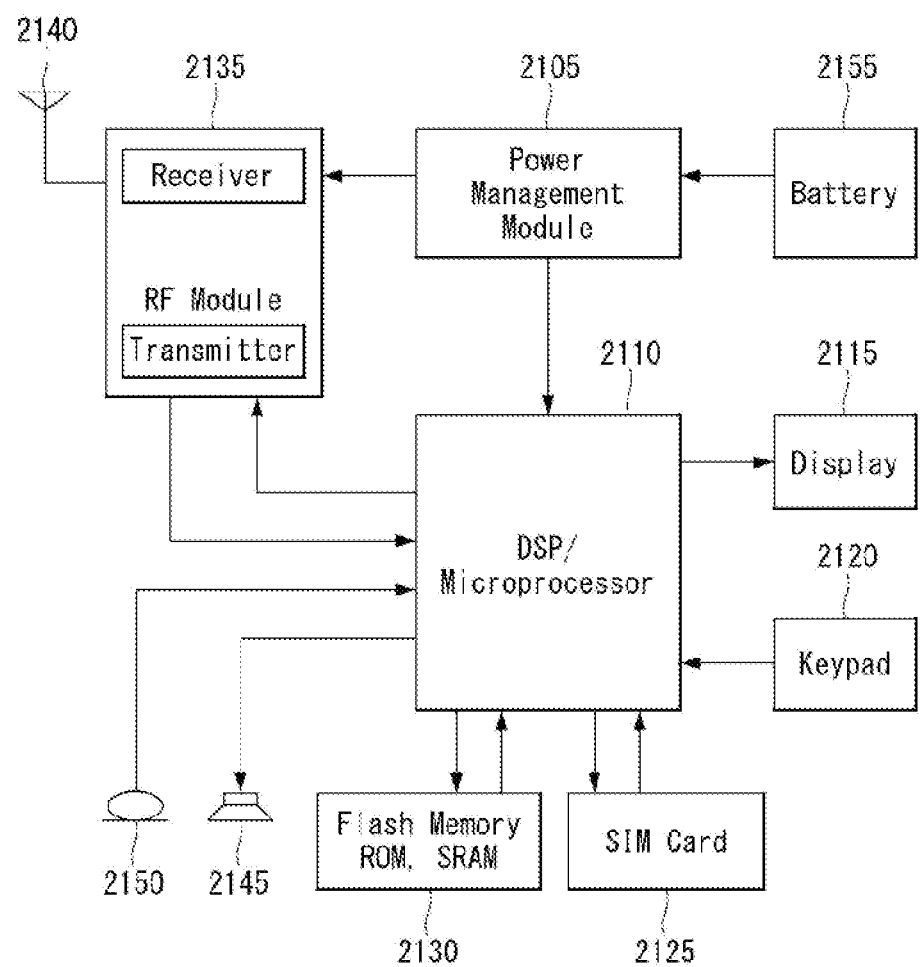

METHOD FOR TRANSMITTING UPLINK PHYSICAL CHANNEL IN WIRELESS COMMUNICATION SYSTEM AND DEVICE FOR SUPPORTING SAME

CROSS-REFERENCE TO RELATED APPLICATIONS

This application is the National Stage filing under 35 U.S.C. 371 of International Application No. PCT/KR2019/003694, filed on Mar. 29, 2019, which claims the benefit of U.S. Provisional Application No. 62/658,492, filed on Apr. 16, 2018, 62/675,676, filed on May 23, 2018, 62/711,606, filed on Jul. 29, 2018, and 62/759,910, filed on Nov. 12, 2018, the contents of which are all hereby incorporated by reference herein in their entirety.

TECHNICAL FIELD

The present disclosure relates to a wireless communication system, and more particularly to a method for controlling transmission power of an uplink physical channel (e.g., physical uplink control channel (PUCCH) and/or physical uplink shared channel (PUSCH)) and a device supporting the same.

BACKGROUND ART

Mobile communication systems have been developed to provide voice services, while ensuring activity of users. However, coverage of the mobile communication systems has been extended up to data services, as well as voice service, and currently, an explosive increase in traffic has caused shortage of resources, and since users expect relatively high speed services, an advanced mobile communication system is required.

Requirements of a next-generation mobile communication system include accommodation of explosive data traffic, a significant increase in a transfer rate per user, accommodation of considerably increased number of connection devices, very low end-to-end latency, and high energy efficiency. To this end, there have been researched various technologies such as dual connectivity, massive multiple input multiple output (MIMO), in-band full duplex, non-orthogonal multiple access (NOMA), super wideband, device networking, and the like.

DISCLOSURE

Technical Problem

The present disclosure provides a method of adjusting and/or controlling transmission power of a PUCCH or a PUSCH depending on a service type (or feature) and/or service requirement.

Technical problems to be solved by the present disclosure are not limited by the above-mentioned technical problems, and other technical problems which are not mentioned above can be clearly understood from the following description by those skilled in the art to which the present disclosure pertains.

Technical Solution

In one aspect, there is provided a method of a user equipment (UE) to transmit an uplink physical channel in a wireless communication system, the method comprising receiving, from a base station, transmission power related information via higher layer signaling, receiving a physical downlink control channel from the base station, and transmitting the uplink physical channel to the base station based on the physical downlink control channel, wherein the uplink physical channel includes a first uplink physical channel or a second uplink physical channel, wherein transmission powers for the first uplink physical channel and the second uplink physical channel are respectively calculated by different power related parameters determined based on the transmission power related information and the physical downlink control channel.

The transmission power related information may include one or more base station reception related parameters, one or more path loss related parameters, and/or one or more transmission power control command related parameters.

The physical downlink control channel may include downlink control information (DCI). The downlink control information may include indication information for a power related parameter for calculating the transmission power of the first uplink physical channel or the second uplink physical channel.

The transmission power for the first uplink physical channel or the second uplink physical channel may be calculated by a power related parameter determined by the indication information among the transmission power related information A power related parameter for the first uplink physical channel may have a higher value than a power related parameter for the second uplink physical channel.

The physical downlink control channel may include downlink control information (DCI). The transmission power for the first uplink physical channel or the second uplink physical channel may be calculated by a power related parameter related to a format of the downlink control information among the transmission power related information.

The uplink physical channel may include at least one of a physical uplink control channel or a physical uplink shared channel.

The first uplink physical channel may be a physical uplink channel for a service requiring higher reliability, higher quality of service, a larger subcarrier spacing, a shorter transmission time interval (TTI) length, a lower latency, a shorter processing time, and/or a lower block error rate than the second uplink physical channel.

The first uplink physical channel may include a first uplink channel and a second uplink channel transmitted before the first uplink channel. A reference value of a power control adjustment state of the first uplink channel may be reset when a pre-configured time exceeds from a time at which the second uplink channel is transmitted or scheduled.

In another aspect, there is provided a user equipment (UE) transmitting an uplink physical channel in a wireless communication system, the UE comprising a transceiver configured to transmit and receive a radio signal, and a processor functionally connected to the transceiver, wherein the processor is configured to receive, from a base station, transmission power related information via higher layer signaling, receive a physical downlink control channel from the base station, and transmit the uplink physical channel to the base station based on the physical downlink control channel, wherein the uplink physical channel includes a first uplink physical channel or a second uplink physical channel, wherein transmission powers for the first uplink physical channel and the second uplink physical channel are respectively calculated by different power related parameters determined based on the transmission power related information and the physical downlink control channel.

The transmission power related information may include one or more base station reception related parameters, one or more path loss related parameters, and/or one or more transmission power control command related parameters.

The physical downlink control channel may include downlink control information (DCI). The downlink control information may include indication information for a power related parameter for calculating the transmission power of the first uplink physical channel or the second uplink physical channel.

The transmission power for the first uplink physical channel or the second uplink physical channel may be calculated by a power related parameter determined by the indication information among the transmission power related information.

The first uplink physical channel may be a physical uplink channel for a service requiring higher reliability, higher quality of service, a larger subcarrier spacing, a shorter transmission time interval (TTI) length, a lower latency, a shorter processing time, and/or a lower block error rate than the second uplink physical channel.

In another aspect, there is provided a base station receiving an uplink physical channel in a wireless communication system, the base station comprising a transceiver configured to transmit and receive a radio signal, and a processor functionally connected to the transceiver, wherein the processor is configured to transmit, to a user equipment (UE), transmission power related information via higher layer signaling, transmit a physical downlink control channel to the UE, and receive the uplink physical channel from the UE, wherein the uplink physical channel includes a first uplink physical channel or a second uplink physical channel, wherein transmission powers for the first uplink physical channel and the second uplink physical channel are respectively calculated by different power related parameters determined based on the transmission power related information and the physical downlink control channel.

Advantageous Effects

The present disclosure has an effect capable of increasing power efficiency by adjusting and/or controlling power depending on a service type (or feature) and/or service requirement.

The present disclosure has an effect capable of transmitting ultra reliability low latency communication (URLLC) traffic requiring high reliability with high power by adjusting and/or controlling power depending on a service type (or feature) and/or service requirement.

Effects obtainable from the present disclosure are not limited by the effects mentioned above, and other effects which are not mentioned above can be clearly understood from the following description by those skilled in the art to which the present disclosure pertains.

DESCRIPTION OF DRAWINGS

The accompanying drawings, which are included to provide a further understanding of the present disclosure and constitute a part of the detailed description, illustrate embodiments of the present disclosure and together with the description serve to explain the principle of the present disclosure.

FIG. 2 illustrates a resource grid for one downlink slot in a wireless communication system to which the present disclosure is applicable.

FIG. 3 illustrates a structure of a downlink subframe in a wireless communication system to which the present disclosure is applicable.

FIG. 4 illustrates a structure of an uplink subframe in a wireless communication system to which the present disclosure is applicable.

FIG. 5 illustrates an example of an overall structure of a NR system to which a method described in the present disclosure is applicable.

FIG. 6 illustrates a relation between an uplink frame and a downlink frame in a wireless communication system to which a method proposed by the present disclosure is applicable.

FIG. 18 is a flow chart illustrating an operation method of a user equipment (UE) described in the present disclosure.

FIG. 19 is a flow chart illustrating an operation method of a base station described in the present disclosure.

FIG. 20 illustrates a block configuration diagram of a wireless communication device to which methods described in the present disclosure are applicable.

FIG. 21 illustrates a block configuration diagram of a communication device according to an embodiment of the present disclosure.

MODE FOR INVENTION

Figure 1:
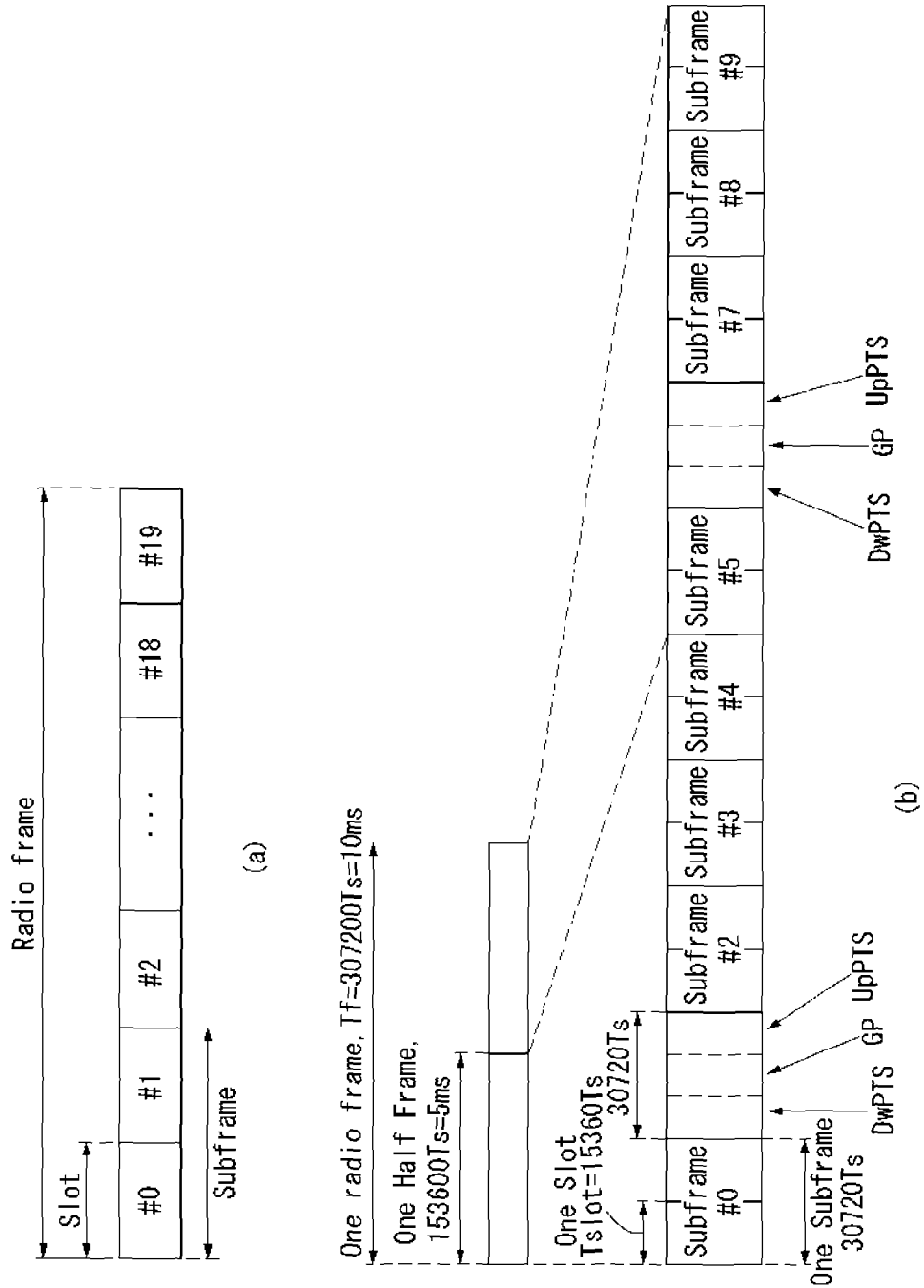
FIG. 1 illustrates a structure of a radio frame in a wireless communication system to which the present disclosure is applicable.

Hereinafter, preferred embodiments of the present disclosure will be described in detail with reference to the accompanying drawings. A detailed description to be disclosed below together with the accompanying drawing is to describe embodiments of the present disclosure and not to describe a unique embodiment for carrying out the present disclosure. The detailed description below includes details in order to provide a complete understanding. However, those skilled in the art know that the present disclosure can be carried out without the details.

In some cases, in order to prevent a concept of the present disclosure from being ambiguous, known structures and devices may be omitted or may be illustrated in a block diagram format based on core function of each structure and device.

In the present disclosure, a base station means a terminal node of a network directly performing communication with a terminal. In the present document, specific operations described to be performed by the base station may be performed by an upper node of the base station in some cases. That is, it is apparent that in the network constituted by multiple network nodes including the base station, various operations performed for communication with the terminal may be performed by the base station or other network nodes other than the base station. A base station (BS) may be generally substituted with terms such as a fixed station, Node B, evolved-NodeB (eNB), a base transceiver system (BTS), an access point (AP), and the like. Further, a 'terminal' may be fixed or movable and be substituted with terms such as a user equipment (UE), a mobile station (MS), a user terminal (UT), a mobile subscriber station (MSS), a subscriber station (SS), an advanced mobile station (AMS), a wireless terminal (WT), a Machine-Type Communication (MTC) device, a Machine-to-Machine (M2M) device, a Device-to-Device (D2D) device, and the like.

Hereinafter, downlink refers to communication from the base station to the terminal, and uplink refers to communication from the terminal to the base station. In the downlink, a transmitter may be a part of the base station, and a receiver may be a part of the terminal. In the uplink, the transmitter may be a part of the terminal, and the receiver may be a part of the base station.

Specific terms used in the following description are provided to help appreciating the present disclosure and the use of the specific terms may be modified into other forms within the scope without departing from the technical spirit of the present disclosure.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. The CDMA may be implemented by radio technology universal terrestrial radio access (UTRA) or CDMA2000. The TDMA may be implemented by radio technology such as Global System for Mobile communications (GSM)/General Packet Radio Service (GPRS)/Enhanced Data Rates for GSM Evolution (EDGE). The OFDMA may be implemented as radio technology such as IEEE 802.11 (Wi-Fi), IEEE 802.16 (WiMAX), IEEE 802-20, E-UTRA (Evolved UTRA), and the like. The UTRA is a part of a universal mobile telecommunication system (UMTS). 3rd generation partnership project (3GPP) long term evolution (LTE) as a part of an evolved UMTS (E-UMTS) using evolved-UMTS terrestrial radio access (E-UTRA) adopts the OFDMA in a downlink and the SC-FDMA in an uplink. LTE-advanced (A) is an evolution of the 3GPP LTE.

The embodiments of the present disclosure may be based on standard documents disclosed in at least one of IEEE 802, 3GPP, and 3GPP2 which are the wireless access systems. That is, steps or parts which are not described to definitely show the technical spirit of the present disclosure among the embodiments of the present disclosure may be based on the documents. Further, all terms disclosed in the document may be described by the standard document.

3GPP LTE/LTE-A is primarily described for clear description, but technical features of the present disclosure are not limited thereto.

Overview of System

FIG. 1 illustrates a structure of a radio frame in a wireless communication system to which the present disclosure is applicable.

3GPP LTE/LTE-A supports radio frame structure type 1 applicable to frequency division duplex (FDD) and radio frame structure Type 2 applicable to time division duplex (TDD).

In FIG. 1, the size of a radio frame in a time domain is represented as a multiple of a time unit of $T\_s=1/(15000*2048)$. Downlink and uplink transmissions are organized into radio frames with a duration of $T\ f=307200*T\_s=10$ ms.

FIG. 1(*a*) illustrates radio frame structure type 1. The radio frame structure type 1 is applicable to both full duplex FDD and half duplex FDD.

A radio frame consists of 10 subframes. One radio frame consists of 20 slots of $T\_slot=15360*T\_s=0.5$ ms length, and indexes of 0 to 19 are given to the respective slots. One subframe consists of two consecutive slots in the time domain, and subframe i consists of slot 2i and slot 2i+1. A time required to transmit one subframe is referred to as a transmission time interval (TTI). For example, the length of one subframe may be 1 ms, and the length of one slot may be 0.5 ms.

The uplink transmission and the downlink transmission in the FDD are distinguished in the frequency domain. Whereas there is no restriction in the full duplex FDD, a UE cannot transmit and receive simultaneously in the half duplex FDD operation.

One slot includes a plurality of orthogonal frequency division multiplexing (OFDM) symbols in the time domain and includes a plurality of resource blocks (RBs) in a frequency domain. Since 3GPP LTE uses OFDMA in downlink, OFDM symbols are used to represent one symbol period. The OFDM symbol may be called one SC-FDMA symbol or a symbol period. The resource block is a resource allocation unit and includes a plurality of consecutive subcarriers in one slot.

FIG. 1(*b*) illustrates frame structure type 2.

The radio frame type 2 consists of two half-frames of $153600*T\_s=5$ ms length each. Each half-frame consists of five subframes of $30720*T\_s=1$ ms length.

In the frame structure type 2 of a TDD system, uplink-downlink configuration is a rule indicating whether uplink and downlink are allocated (or reserved) to all subframes. Table 1 represents uplink-downlink configuration.

TABLE 1

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms  | D | S | U | U | U | D | S | U | U | U |
| 1 | 5 ms  | D | S | U | U | D | D | S | U | U | D |
| 2 | 5 ms  | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms  | D | S | U | U | U | D | S | U | U | D |

In all the configurations, subframes 0 and 5 and a DwPTS are reserved for downlink transmission only. An UpPTS and a subframe immediately following the subframe are always reserved for uplink transmission.

Such uplink-downlink configurations may be known to both the base station and the UE as system information. The base station may inform the UE of change in an uplink-downlink allocation state of a radio frame by transmitting only indexes of uplink-downlink configuration information to the UE each time the uplink-downlink configuration information is changed. Furthermore, configuration information is a kind of downlink control information and may be transmitted via a physical downlink control channel (PDCCH) like other scheduling information, or is a kind of broadcast information and may be commonly transmitted to all UEs within a cell via a broadcast channel.

Table 2 represents configuration (length of DwPTS/GP/UpPTS) of a special subframe.

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$  | $2192 \cdot T_s$ | $2560 \cdot T_s$ | $7680 \cdot T_s$  | $2192 \cdot T_s$ | $2560 \cdot T_s$ |
| 1 | $19760 \cdot T_s$ |                  |                  | $20480 \cdot T_s$ |                  |                  |
| 2 | $21952 \cdot T_s$ |                  |                  | $23040 \cdot T_s$ |                  |                  |
| 3 | $24144 \cdot T_s$ |                  |                  | $25600 \cdot T_s$ |                  |                  |
| 4 | $26336 \cdot T_s$ |                  |                  | $7680 \cdot T_s$  | $4384 \cdot T_s$ | $5120 \cdot T_s$ |
| 5 | $6592 \cdot T_s$  | $4384 \cdot T_s$ | $5120 \cdot T_s$ | $20480 \cdot T_s$ |                  |                  |
| 6 | $19760 \cdot T_s$ |                  |                  | $23040 \cdot T_s$ |                  |                  |
| 7 | $21952 \cdot T_s$ |                  |                  | —                 | —                | —                |
| 8 | $24144 \cdot T_s$ |                  |                  | —                 | —                | —                |

Referring to Table 1, in each subframe of the radio frame, 'D' represents a subframe for downlink transmission, 'U' represents a subframe for uplink transmission, and 'S' represents a special subframe consisting of three types of fields including a downlink pilot time slot (DwPTS), a guard period (GP), and an uplink pilot time slot (UpPTS). The DwPTS is used for an initial cell search, synchronization or channel estimation in a UE. The UpPTS is used for channel estimation in a base station and uplink transmission synchronization of the UE. The GP is a period for removing interference generated in uplink due to multi-path delay of a downlink signal between uplink and downlink.

Each subframe i consists of slot 2i and slot 2i+1 of T_slot=15360*T_s=0.5 ms length each.

The uplink-downlink configuration may be classified into 7 types, and a location and/or the number of a downlink subframe, a special subframe and an uplink subframe are different for each configuration.

A point of time at which switching from downlink to uplink or switching from uplink to downlink is performed is referred to as a switching point. A switch-point periodicity refers to a period in which switched patterns of an uplink subframe and a downlink subframe are equally repeated, and both 5 ms and 10 ms switch-point periodicity are supported. In case of 5 ms downlink-to-uplink switch-point periodicity, the special subframe S exists in every half-frame. In case of 5 ms downlink-to-uplink switch-point periodicity, the special subframe S exists in a first half-frame only.

The structure of a radio frame according to an example of FIG. 1 is merely an example, and the number of subcarriers included in a radio frame, the number of slots included in a subframe, and the number of OFDM symbols included in a slot may be variously changed.

FIG. 2 is a diagram illustrating a resource grid for one downlink slot in the wireless communication system to which the present disclosure is applicable.

Referring to FIG. 2, one downlink slot includes the plurality of OFDM symbols in the time domain. Herein, it is exemplarily described that one downlink slot includes 7 OFDM symbols and one resource block includes 12 subcarriers in the frequency domain, but the present disclosure is not limited thereto.

Each element on the resource grid is referred to as a resource element and one resource block includes 12×7 resource elements. The number of resource blocks included in the downlink slot, NDL is subordinated to a downlink transmission bandwidth.

A structure of the uplink slot may be the same as that of the downlink slot.

FIG. 3 illustrates a structure of a downlink subframe in the wireless communication system to which the present disclosure is applicable.

Referring to FIG. 3, a maximum of three fore OFDM symbols in the first slot of the sub frame is a control region to which control channels are allocated and residual OFDM symbols is a data region to which a physical downlink shared channel (PDSCH) is allocated. Examples of the downlink control channel used in the 3GPP LTE include a Physical Control Format Indicator Channel (PCFICH), a Physical Downlink Control Channel (PDCCH), a Physical Hybrid-ARQ Indicator Channel (PHICH), and the like.

The PFCICH is transmitted in the first OFDM symbol of the subframe and transports information on the number (that is, the size of the control region) of OFDM symbols used for transmitting the control channels in the subframe. The PHICH which is a response channel to the uplink transports an Acknowledgement (ACK)/Not-Acknowledgement (NACK) signal for a hybrid automatic repeat request (HARQ). Control information transmitted through a PDCCH is referred to as downlink control information (DCI). The downlink control information includes uplink resource allocation information, downlink resource allocation information, or an uplink transmission (Tx) power control command for a predetermined terminal group.

The PDCCH may transport A resource allocation and transmission format (also referred to as a downlink grant) of a downlink shared channel (DL-SCH), resource allocation information (also referred to as an uplink grant) of an uplink shared channel (UL-SCH), paging information in a paging channel (PCH), system information in the DL-SCH, resource allocation for an upper-layer (higher-layer) control message such as a random access response transmitted in the PDSCH, an aggregate of transmission power control commands for individual terminals in the predetermined terminal group, a voice over IP (VoIP). A plurality of PDCCHs may be transmitted in the control region and the terminal may monitor the plurality of PDCCHs. The PDCCH is constituted by one or an aggregate of a plurality of continuous control channel elements (CCEs). The CCE is a logical allocation wise used to provide a coding rate depending on a state of a radio channel to the PDCCH. The CCEs correspond to a plurality of resource element groups. A format of the PDCCH and a bit number of usable PDCCH are determined according to an association between the number of CCEs and the coding rate provided by the CCEs.

The base station determines the PDCCH format according to the DCI to be transmitted and attaches a cyclic redundancy check (CRC) to the control information. The CRC is masked with a unique identifier (referred to as a radio network temporary identifier (RNTI)) according to an owner or a purpose of the PDCCH. In the case of a PDCCH for a specific terminal, the unique identifier of the terminal, for example, a cell-RNTI (C-RNTI) may be masked with the CRC. Alternatively, in the case of a PDCCH for the paging message, a paging indication identifier, for example, the CRC may be masked with a paging-RNTI (P-RNTI). In the case of a PDCCH for the system information, in more detail, a system information block (SIB), the CRC may be masked with a system information identifier, that is, a system information (SI)-RNTI. The CRC may be masked with a random access (RA)-RNTI in order to indicate the random access response which is a response to transmission of a random access preamble.

An enhanced PDCCH (EPDCCH) carries UE-specific signaling. The EPDCCH is located in a physical resource block (PRB) that is configured to be UE specific. In other words, as described above, the PDCCH may be transmitted in up to first three OFDM symbols in a first slot of a subframe, but the EPDCCH may be transmitted in a resource region other than the PDCCH. A time (i.e., symbol) at which the EPDCCH starts in the subframe may be configured to the UE via higher layer signaling (e.g., RRC signaling, etc.).

The EPDCCH may carry a transport format, resource allocation and HARQ information related to DL-SCH, a transport format, resource allocation and HARQ information related to UL-SCH, resource allocation information related to sidelink shared channel (SL-SCH) and physical sidelink control channel (PSCCH), etc. Multiple EPDCCHs may be supported, and the UE may monitor a set of EPCCHs.

The EPDCCH may be transmitted using one or more consecutive enhanced CCEs (ECCEs), and the number of ECCEs per EPDCCH may be determined for each EPDCCH format.

Each ECCE may consist of a plurality of enhanced resource element groups (EREGs). The EREG is used to define mapping of the ECCE to the RE. There are 16 EREGs per PRB pair. All REs except the RE carrying the DMRS in each PRB pair are numbered from 0 to 15 in increasing order of the frequency and then in increasing order of time.

The UE may monitor a plurality of EPDCCHs. For example, one or two EPDCCH sets may be configured in one PRB pair in which the UE monitors EPDCCH transmission.

Different coding rates may be implemented for the EPCCH by combining different numbers of ECCEs. The EPCCH may use localized transmission or distributed transmission, and hence, the mapping of ECCE to the RE in the PRB may vary.

FIG. 4 illustrates a structure of an uplink subframe in the wireless communication system to which the present disclosure is applicable.

Referring to FIG. 4, the uplink subframe may be divided into the control region and the data region in a frequency domain. A physical uplink control channel (PUCCH) transporting uplink control information is allocated to the control region. A physical uplink shared channel (PUSCH) transporting user data is allocated to the data region. One terminal does not simultaneously transmit the PUCCH and the PUSCH in order to maintain a single carrier characteristic.

A resource block (RB) pair in the subframe are allocated to the PUCCH for one terminal. RBs included in the RB pair occupy different subcarriers in two slots, respectively. The RB pair allocated to the PUCCH frequency-hops in a slot boundary.

The invention described in the present disclosure can be applied to a 5G NR system (or device) as well as a LTE/LTE-A system (or device).

Communication of the 5G NR system is described below with reference to FIGS. 5 to 10.

The 5G NR system defines enhanced mobile broadband (eMBB), massive machine type communications (mMTC), ultra-reliable and low latency communications (URLLC), and vehicle-to-everything (V2X) based on usage scenario (e.g., service type).

A 5G NR standard is divided into standalone (SA) and non-standalone (NSA) depending on co-existence between a NR system and a LTE system.

The 5G NR system supports various subcarrier spacings and supports CP-OFDM in the downlink and CP-OFDM and DFT-s-OFDM (SC-OFDM) in the uplink.

Embodiments of the present disclosure can be supported by standard documents disclosed in at least one of IEEE 802, 3GPP, and 3GPP2 which are the wireless access systems. That is, steps or parts in embodiments of the present disclosure which are not described to clearly show the technical spirit of the present disclosure can be supported by the standard documents. Further, all terms disclosed in the present disclosure can be described by the standard document.

As smartphones and Internet of Things (IoT) terminals spread rapidly, an amount of information exchanged through a communication network is increasing. Hence, it is necessary to consider an environment (e.g., enhanced mobile broadband communication) that provides faster services to more users than the existing communication system (or existing radio access technology) in the next generation wireless access technology.

To this end, a design of a communication system considering machine type communication (MTC) that provides services by connecting multiple devices and objects is being discussed. In addition, a design of a communication system (e.g., ultra-reliable and low latency communication (URLLC) considering a service and/or a terminal sensitive to reliability and/or latency of communication is also being discussed.

Hereinafter, in the present disclosure, for convenience of explanation, the next generation radio access technology is referred to as NR (new RAT, radio access technology), and a wireless communication system to which the NR is applied is referred to as an NR system.

Definition of NR System Related Terms eLTE eNB: The eLTE eNB is the evolution of eNB that supports connectivity to EPC and NGC.

gNB: A node which supports the NR as well as connectivity to NGC.

New RAN: A radio access network which supports either NR or E-UTRA or interfaces with the NGC.

Network slice: A network slice is a network defined by the operator customized to provide an optimized solution for a specific market scenario which demands specific requirements with end-to-end scope.

Network function: A network function is a logical node within a network infrastructure that has well-defined external interfaces and well-defined functional behavior.

NG-C: A control plane interface used on NG2 reference points between new RAN and NGC.

NG-U: A user plane interface used on NG3 reference points between new RAN and NGC.

Non-standalone NR: A deployment configuration where the gNB requires an LTE eNB as an anchor for control plane connectivity to EPC, or requires an eLTE eNB as an anchor for control plane connectivity to NGC.

Non-standalone E-UTRA: A deployment configuration where the eLTE eNB requires a gNB as an anchor for control plane connectivity to NGC.

User plane gateway: A termination point of NG-U interface.

FIG. 5 illustrates an example of an overall structure of a NR system to which a method proposed by the present disclosure is applicable.

Referring to FIG. 5, an NG-RAN consists of gNBs that provide an NG-RA user plane (new AS sublayer/PDCP/RLC/MAC/PHY) and control plane (RRC) protocol terminations for a user equipment (UE).

The gNBs are interconnected with each other by means of an Xn interface.

The gNBs are also connected to an NGC by means of an NG interface.

More specifically, the gNBs are connected to an access and mobility management function (AMF) by means of an N2 interface and to a user plane function (UPF) by means of an N3 interface.

NR (New Rat) Numerology and Frame Structure

In a NR system, multiple numerologies can be supported. A numerology may be defined by a subcarrier spacing and a cyclic prefix (CP) overhead. Multiple subcarrier spacings can be derived by scaling a basic subcarrier spacing by an integer N (or μ). Further, although it is assumed not to use a very low subcarrier spacing at a very high carrier frequency, the numerology used can be selected independently of a frequency band.

In the NR system, various frame structures according to the multiple numerologies can be supported.

Hereinafter, an orthogonal frequency division multiplexing (OFDM) numerology and a frame structure which may be considered in the NR system will be described.

Multiple OFDM numerologies supported in the NR system may be defined as in Table 3.

TABLE 3

| μ | Δf = $2^\mu \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

In regard to a frame structure in the NR system, a size of various fields in a time domain is expressed as a multiple of a time unit of $T_s=1/(\Delta f_{max} \cdot N_f)$, where $\Delta f_{max}=480\cdot 10^3$ and $N_f=4096$. Downlink and uplink transmissions are organized into radio frames with a duration of $T_f=\Delta f_{max} N_f/100) \cdot T_s=10$ ms Here, the radio frame consists of ten subframes each having a duration of $T_{sf}=(\Delta f_{max} N_f/1000) \cdot T_s=1$ ms. In this case, there may be a set of frames in the uplink and a set of frames in the downlink. FIG. 6 illustrates a relation between an uplink frame and a downlink frame in a wireless communication system to which a method described in the present disclosure is applicable.

As illustrated in FIG. 6, uplink frame number i for transmission from a user equipment (UE) shall start $T_{TA}=N_{TA}T_s$ before the start of a corresponding downlink frame at the corresponding UE.

Regarding the numerology μ, slots are numbered in increasing order of $n_s \in \{0, \ldots, N_{subframe}^{slots,\mu}-1\}$ within a subframe and are numbered in increasing order of $n_{s,f}^\mu \in \{0, \ldots, N_{frame}^{slots,\mu}-1\}$ within a radio frame. One slot consists of consecutive OFDM symbols of $N_{symb}^\mu$, and $N_{symb}^\mu$ is determined depending on a numerology used and slot configuration. The start of slots $n_s^\mu$ in a subframe is aligned in time with the start of OFDM symbols $n_s^\mu N_{symb}^\mu$ in the same subframe.

Not all UEs are able to transmit and receive at the same time, and this means that not all OFDM symbols in a downlink slot or an uplink slot are available to be used.

Table 4 represents the number $N_{symb}^{slot}$ of OFDM symbols per slot, the number $N_{slot}^{frame,\mu}$ of slots per radio frame, and the number $N_{slot}^{subframe, \mu}$ of slots per subframe in a normal CP. Table 5 represents the number of OFDM symbols per slot, the number of slots per radio frame, and the number of slots per subframe in an extended CP.

TABLE 4

| μ | $N_{symb}^{slot}$ | $N_{slot}^{frame, \mu}$ | $N_{slot}^{subframe, \mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 5

| μ | $N_{symb}^{slot}$ | $N_{slot}^{frame, \mu}$ | $N_{slot}^{subframe, \mu}$ |
|---|---|---|---|
| 2 | 12 | 40 | 4 |

Figure 7:
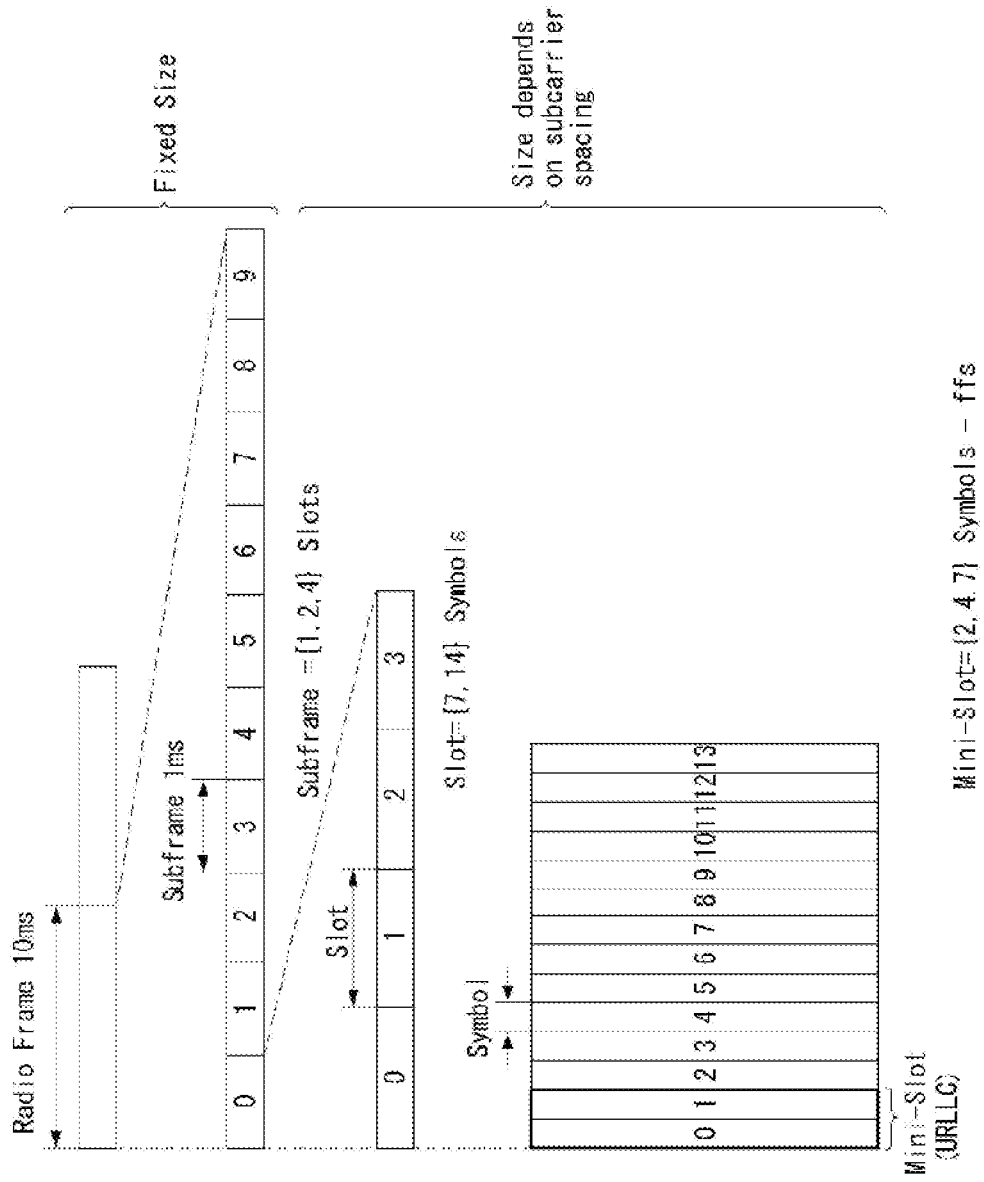
FIG. 7 illustrates an example of a frame structure in a NR system.

FIG. 7 illustrates an example of a frame structure in a NR system. FIG. 7 is merely for convenience of explanation and does not limit the scope of the present disclosure. In Table 5, in case of μ=2, i.e., as an example in which a subcarrier spacing (SCS) is 60 kHz, one subframe (or frame) may include four slots with reference to Table 4, and one subframe={1, 2, 4} slots shown in FIG. 3, for example, the number of slot(s) that may be included in one subframe may be defined as in Table 2.

Further, a mini-slot may consist of 2, 4, or 7 symbols, or may consist of more symbols or less symbols.

In regard to physical resources in the NR system, an antenna port, a resource grid, a resource element, a resource block, a carrier part, etc. may be considered.

Hereinafter, the above physical resources that can be considered in the NR system are described in more detail.

First, in regard to an antenna port, the antenna port is defined so that a channel over which a symbol on an antenna port is conveyed can be inferred from a channel over which another symbol on the same antenna port is conveyed. When large-scale properties of a channel over which a symbol on one antenna port is conveyed can be inferred from a channel over which a symbol on another antenna port is conveyed, the two antenna ports may be regarded as being in a quasi co-located or quasi co-location (QC/QCL) relation. Here, the large-scale properties may include at least one of delay spread, Doppler spread, frequency shift, average received power, and received timing.

Figure 8:
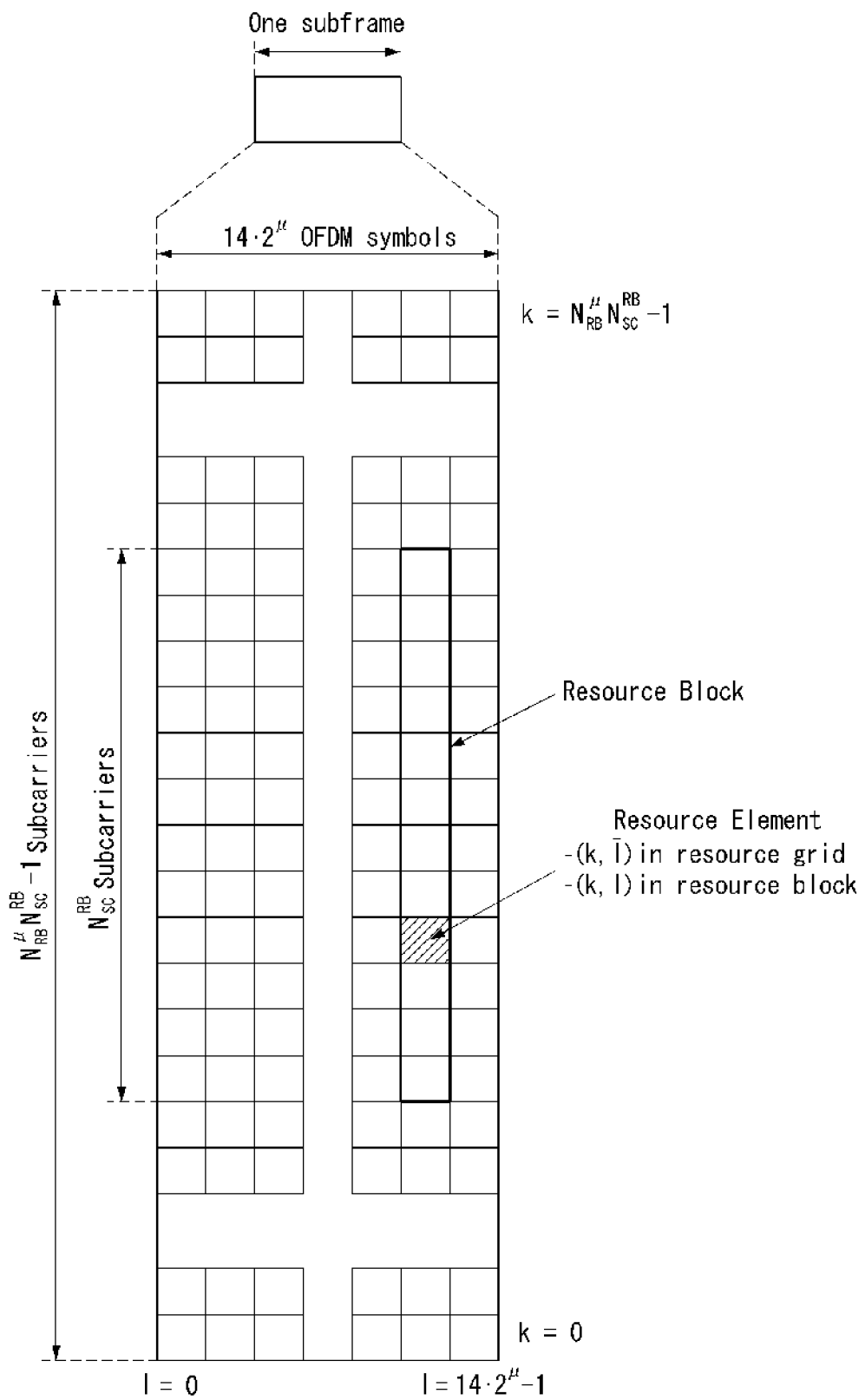
FIG. 8 illustrates an example of a resource grid supported in a wireless communication system to which a method proposed by the present disclosure is applicable.

FIG. 8 illustrates an example of a resource grid supported in a wireless communication system to which a method described in the present disclosure is applicable.

Referring to FIG. 8, a resource grid consists of $N_{RB}^{\mu} N_{sc}^{RB}$ subcarriers on a frequency domain, each subframe consisting of 14·2μ OFDM symbols, but the present disclosure is not limited thereto.

In the NR system, a transmitted signal is described by one or more resource grids, consisting of $N_{RB}^{\mu} N_{sc}^{RB}$ subcarriers, and $2^{\mu} N_{symb}^{(\mu)}$ OFDM symbols, where $N_{RB}^{\mu} \leq N_{RB}^{max,\mu}$. $N_{RB}^{max, \mu}$ denotes a maximum transmission bandwidth and may change not only between numerologies but also between uplink and downlink.

Figure 9:
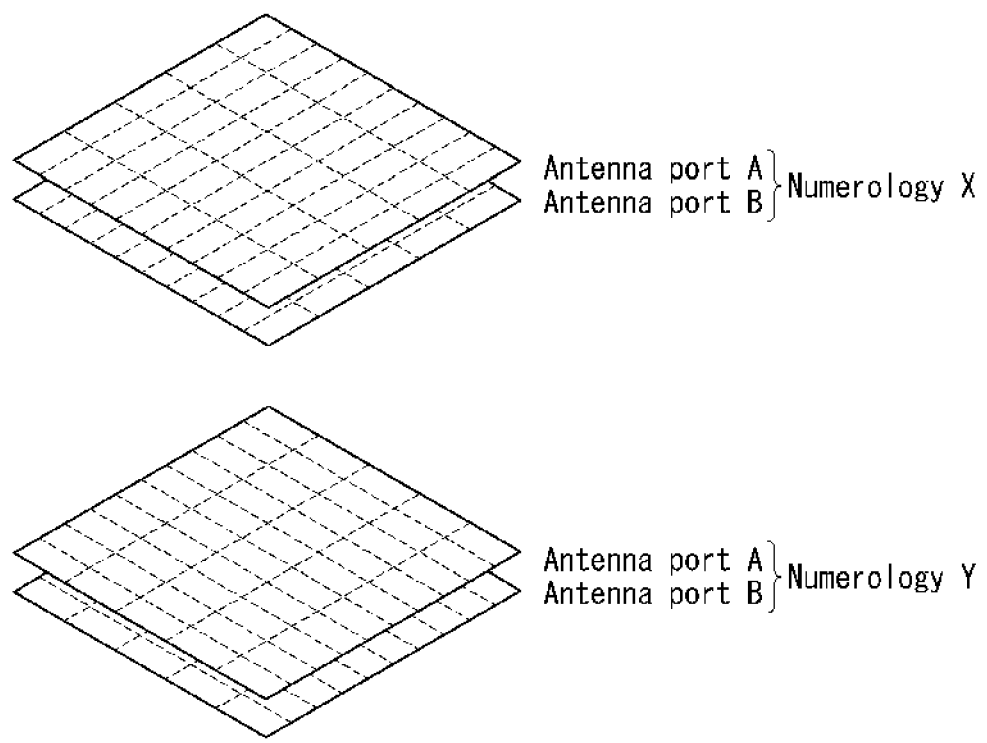
FIG. 9 illustrates examples of a resource grid per antenna port and numerology to which a method proposed by the present disclosure is applicable.

In this case, as illustrated in FIG. 9, one resource grid may be configured per numerology μ and antenna port p.

FIG. 9 illustrates examples of a resource grid per antenna port and numerology to which a method described in the present disclosure is applicable.

Each element of the resource grid for the numerology μ and the antenna port p is called a resource element and is uniquely identified by an index pair (k,ī), where k=0, ..., $N_{RB}^{\mu} N_{sc}^{RB}-1$ is an index on a frequency domain, and ī=0, ..., $2^{\mu} N_{symb}^{(\mu)}-1$ refers to a location of a symbol in a subframe. The index pair (k,ī) is used to refer to a resource element in a slot, where l=0, ..., $N_{symb}^{\mu}-1$.

The resource element (k,ī), for the numerology μ and the antenna port p corresponds to a complex value $a_{k,\bar{l}}^{(p,\mu)}$. When there is no risk for confusion or when a specific antenna port or numerology is not specified, the indexes p and μ may be dropped, and as a result, the complex value may be $a_{k,\bar{l}}^{(p)}$ or $a_{k,\bar{l}}$.

Further, a physical resource block is defined as $N_{sc}^{RB}=12$ consecutive subcarriers in the frequency domain.

Point A serves as a common reference point of a resource block grid and may be obtained as follows.

offsetToPointA for PCell downlink represents a frequency offset between the point A and a lowest subcarrier of a lowest resource block that overlaps a SS/PBCH block used by the UE for initial cell selection, and is expressed in units of resource blocks assuming 15 kHz subcarrier spacing for FR1 and 60 kHz subcarrier spacing for FR2;

absoluteFrequencyPointA represents frequency-location of the point A expressed as in absolute radio-frequency channel number (ARFCN).

The common resource blocks are numbered from 0 and upwards in the frequency domain for subcarrier spacing configuration μ.

The center of subcarrier 0 of common resource block 0 for the subcarrier spacing configuration μ coincides with 'point A'. A common resource block number $n_{CRB}^{\mu}$ in the frequency domain and resource elements (k, l) for the subcarrier spacing configuration μ may be given by the following Equation 1.

$$n_{CRB}^{\mu} = \left\lfloor \frac{k}{N_{sc}^{RB}} \right\rfloor \quad \text{[Equation 1]}$$

Here, k may be defined relative to the point A so that k=0 corresponds to a subcarrier centered around the point A. Physical resource blocks are defined within a bandwidth part (BWP) and are numbered from 0 to $N_{BWP,i}^{size}-$, where i is No. of the BWP. A relation between the physical resource block $n_{PRB}$ in BWP i and the common resource block $n_{CRB}$ may be given by the following Equation 2.

$$n_{CRB} = n_{PRB} + N_{BWP,i}^{start} \quad \text{[Equation 2]}$$

Here, $N_{BWP,i}^{start}$ may be the common resource block where the BWP starts relative to the common resource block 0.

Self-Contained Structure

A time division duplexing (TDD) structure considered in the NR system is a structure in which both uplink (UL) and downlink (DL) are processed in one slot (or subframe). The structure is to minimize a latency of data transmission in a TDD system and may be referred to as a self-contained structure or a self-contained slot.

Figure 10:
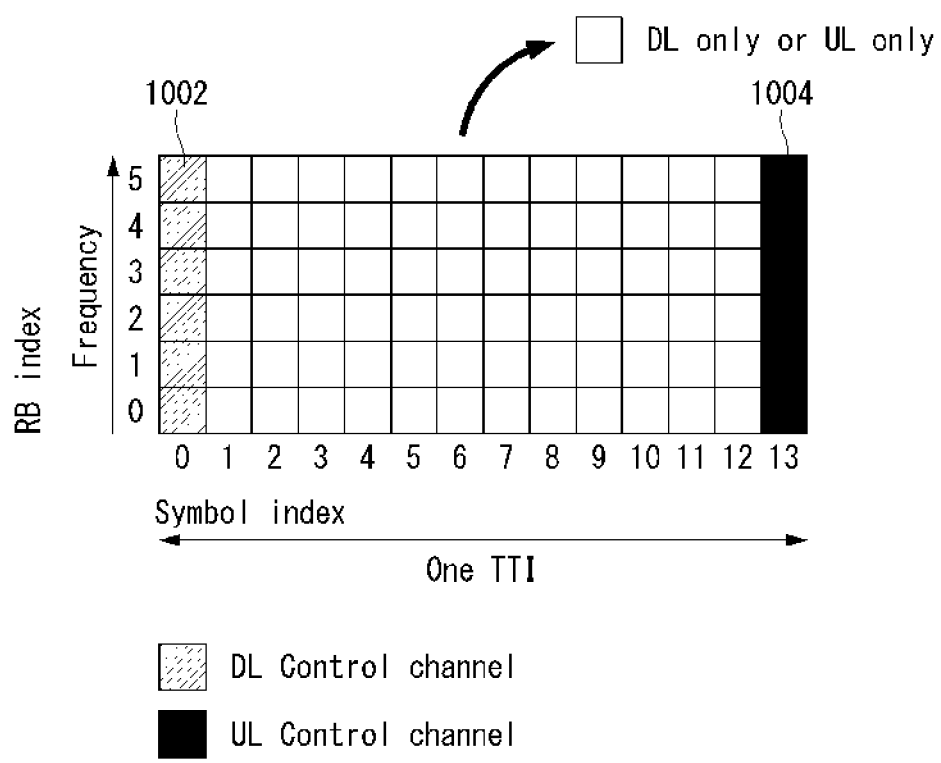
FIG. 10 illustrates an example of a self-contained structure to which a method proposed by the present disclosure is applicable.

FIG. 10 illustrates an example of a self-contained structure to which a method described in the present disclosure is applicable. FIG. 10 is merely for convenience of explanation and does not limit the scope of the present disclosure.

Referring to FIG. 10, as in legacy LTE, it is assumed that one transmission unit (e.g., slot, subframe) consists of 14 orthogonal frequency division multiplexing (OFDM) symbols.

In FIG. 10, a region 1002 means a downlink control region, and a region 1004 means an uplink control region. Further, regions (i.e., regions without separate indication) other than the region 1002 and the region 1004 may be used for transmission of downlink data or uplink data.

That is, uplink control information and downlink control information may be transmitted in one self-contained slot. On the other hand, in case of data, uplink data or downlink data is transmitted in one self-contained slot.

When the structure illustrated in FIG. 10 is used, in one self-contained slot, downlink transmission and uplink transmission may sequentially proceed, and downlink data transmission and uplink ACK/NACK reception may be performed.

As a result, if an error occurs in the data transmission, time required until retransmission of data can be reduced. Hence, the latency related to data transfer can be minimized.

In the self-contained slot structure illustrated in FIG. 10, a base station (e.g., eNodeB, eNB, gNB) and/or a user equipment (UE) (e.g., terminal) require a time gap for a process for converting a transmission mode into a reception mode or a process for converting a reception mode into a transmission mode. In regard to the time gap, if uplink transmission is performed after downlink transmission in the self-contained slot, some OFDM symbol(s) may be configured as a guard period (GP).

Physical Uplink Control Channel (PUCCH)

Uplink control information (UCI) transmitted on a PUCCH may include scheduling request (SR), HARQ ACK/NACK information, and downlink channel measurement information.

The HARQ ACK/NACK information may be produced depending on whether decoding of downlink data packet on a PDSCH is successful or not. In the existing wireless communication system, one ACK/NACK bit is transmitted in case of single codeword downlink transmission while two ACK/NACK bits are transmitted in case of two codeword downlink transmissions.

The channel measurement information refers to feedback information related to a multiple input multiple output (MIMO) scheme and may include a channel quality indicator (CQI), a precoding matrix index (PMI), and a rank indicator (RI). The channel measurement information may collectively be referred to as a CQI.

20 bits per subframe may be used for the CQI transmission.

The PUCCH may be modulated by using a binary phase shift keying (BPSK) scheme and a quadrature phase shift keying (QPSK) scheme. Control information for a plurality of UEs may be transmitted on the PDCCH. In case of performing code division multiplexing (CDM) to distinguish signals of the respective UEs, a length-12 constant amplitude zero autocorrelation (CAZAC) sequence is mostly used. Since the CAZAC sequence has characteristics of maintaining a predetermined amplitude in a time domain and a frequency domain, the CAZAC has properties suitable to increase coverage by reducing a peak-to-average power ratio (PAPR) or a cubic metric (CM) of the UE. In addition, the ACK/NACK information for downlink data transmission transmitted on the PDCCH is covered by using an orthogonal sequence or an orthogonal cover (OC).

Further, control information transmitted on the PUCCH may be distinguished using a cyclically shifted sequence each having a different cyclic shift (CS) value. The cyclically shifted sequence may be produced by cyclically shifting a base sequence by as much as a specific cyclic shift (CS) amount. The specific CS amount is indicated by a CS index. The number of available cyclic shifts may vary depending on the delay spread of a channel. Various kinds of sequences may be used as the base sequence, and the CAZAC sequence described above is an example.

An amount of control information that the UE can transmit in one subframe may be determined depending on the number of SC-FDMA symbols (i.e., SC-FDMA symbols except SC-FDMA symbols used for reference signal (RS) transmission for coherent detection of the PUCCH), that can be used in the transmission of the control information.

In the 3GPP LTE system, the PUCCH is defined as a total of seven different formats depending on transmitted control information, a modulation scheme, an amount of control information, etc., and attributes of uplink control information (UCI) transmitted according to each PUCCH format may be summarized as in the following Table 6.

TABLE 6

| PUCCH Format | Uplink Control Information(UCI) |
|---|---|
| Format 1 | Scheduling Request (SR) (unmodulated waveform) |
| Format 1a | 1-bit HARQ ACK/NACK with/without SR |
| Format 1b | 2-bit HARQ ACK/NACK with/without SR |
| Format 2 | CQI (20 coded bits) |
| Format 2 | CQI and 1-or 2-bit HARQ ACK/NACK (20 bits) for extended CP only |
| Format 2a | CQI and 1-bit HARQ ACK/NACK (20 + 1 coded bits) |
| Format 2b | CQI and 2-bit HARQ ACK/NACK (20 + 2 coded bits) |

PUCCH format 1 is used for single transmission of SR. In case of single transmission of SR, an unmodulated waveform is applied, which will be described below in detail. PUCCH format 1a or 1b is used for transmission of HARQ ACK/NACK. In case of single transmission of HARQ ACK/NACK in a random subframe, PUCCH format 1a or 1b may be used. Alternatively, the HARQ ACK/NACK and the SR may be transmitted in the same subframe using the PUCCH format 1a or 1b.

PUCCH format 2 is used for transmission of a CQI, and PUCCH format 2a or 2b is used for transmission of the CQI and the HARQ ACK/NACK.

In case of an extended CP, the PUCCH format 2 may also be used for transmission of the CQI and the HARQ ACK/NACK.

Figure 11:
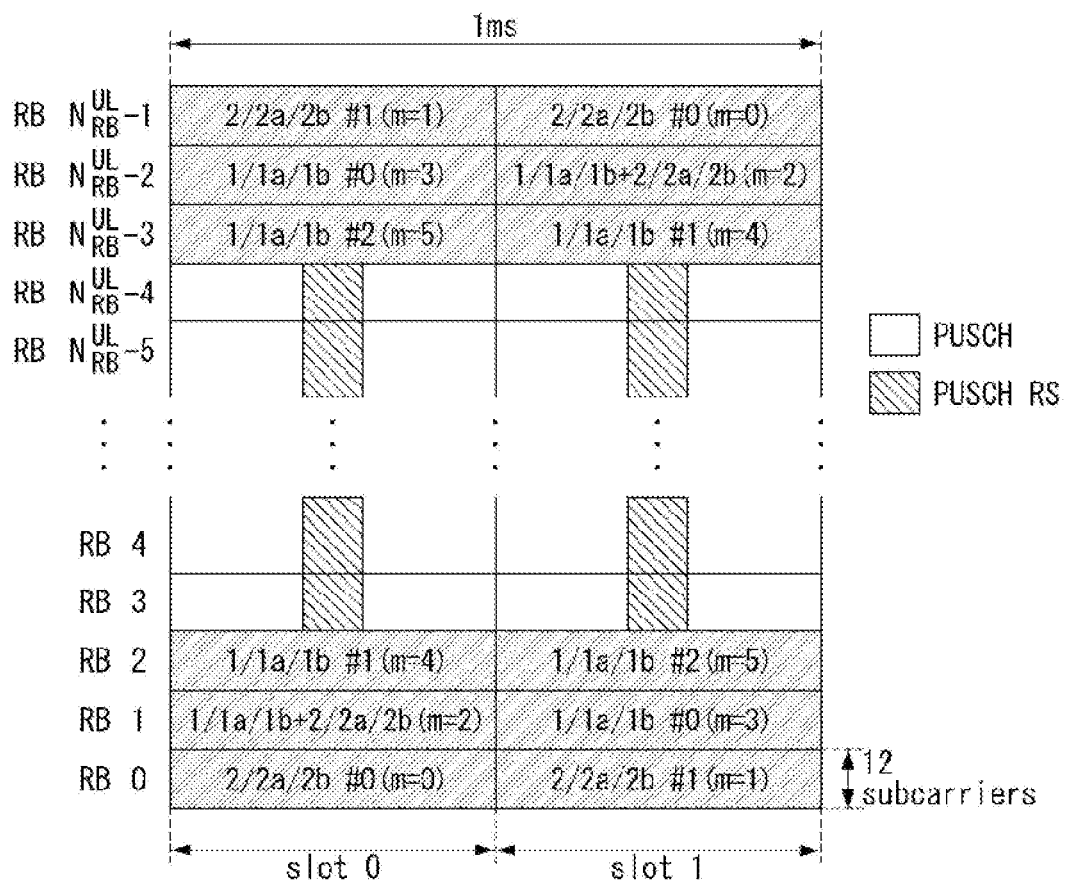
FIG. 11 illustrates an example in which physical uplink control channel (PUCCH) formats are mapped to PUCCH regions of uplink physical resource blocks in a wireless communication system to which the present disclosure is applicable.

FIG. 11 illustrates an example in which PUCCH formats are mapped to PUCCH regions of uplink physical resource blocks in a wireless communication system to which the present disclosure is applicable.

In FIG. 11, $N_{RB}^{UL}$ represents the number of resource blocks in the uplink, and 0, 1, . . . , $N_{RB}^{UL}-1$ refers to No. of s physical resource block. Basically, the PUCCH is mapped to both edges of an uplink frequency block. As illustrated in FIG. 11, the PUCCH format 2/2a/2b is mapped to a PUCCH region marked by m=0, 1, which may represent that the PUCCH format 2/2a/2b is mapped to resource blocks located at band edges. In addition, the PUCCH format 2/2a/2b and the PUCCH format 1/1a/1b are mixedly mapped to the PUCCH region marked by m=2. Next, the PUCCH format 1/1a/1b may be mapped to a PUCCH region marked by m=3, 4, 5. The number $N_{RB}^{(2)}$ of PUCCH RBs available for use by the PUCCH format 2/2a/2b may be indicated to the UEs in a cell by broadcasting signaling.

The PUCCH format 2/2a/2b is described. The PUCCH format 2/2a/2b is a control channel used to transmit channel measurement feedbacks CQI, PMI, and RI.

A periodicity and a frequency unit (or a frequency resolution) to be used to report the channel measurement feedback (hereinafter, collectively referred to as CQI information) may be controlled by the base station. Periodic CQI reporting and aperiodic CQI reporting in a time domain can be reported. The PUCCH format 2 may be used for the periodic CQI reporting only, and the PUSCH may be used for the aperiodic CQI reporting. In case of the aperiodic CQI reporting, the base station may instruct the UE to send an individual CQI report embedded into a resource which is scheduled for uplink data transmission.

Figure 12:
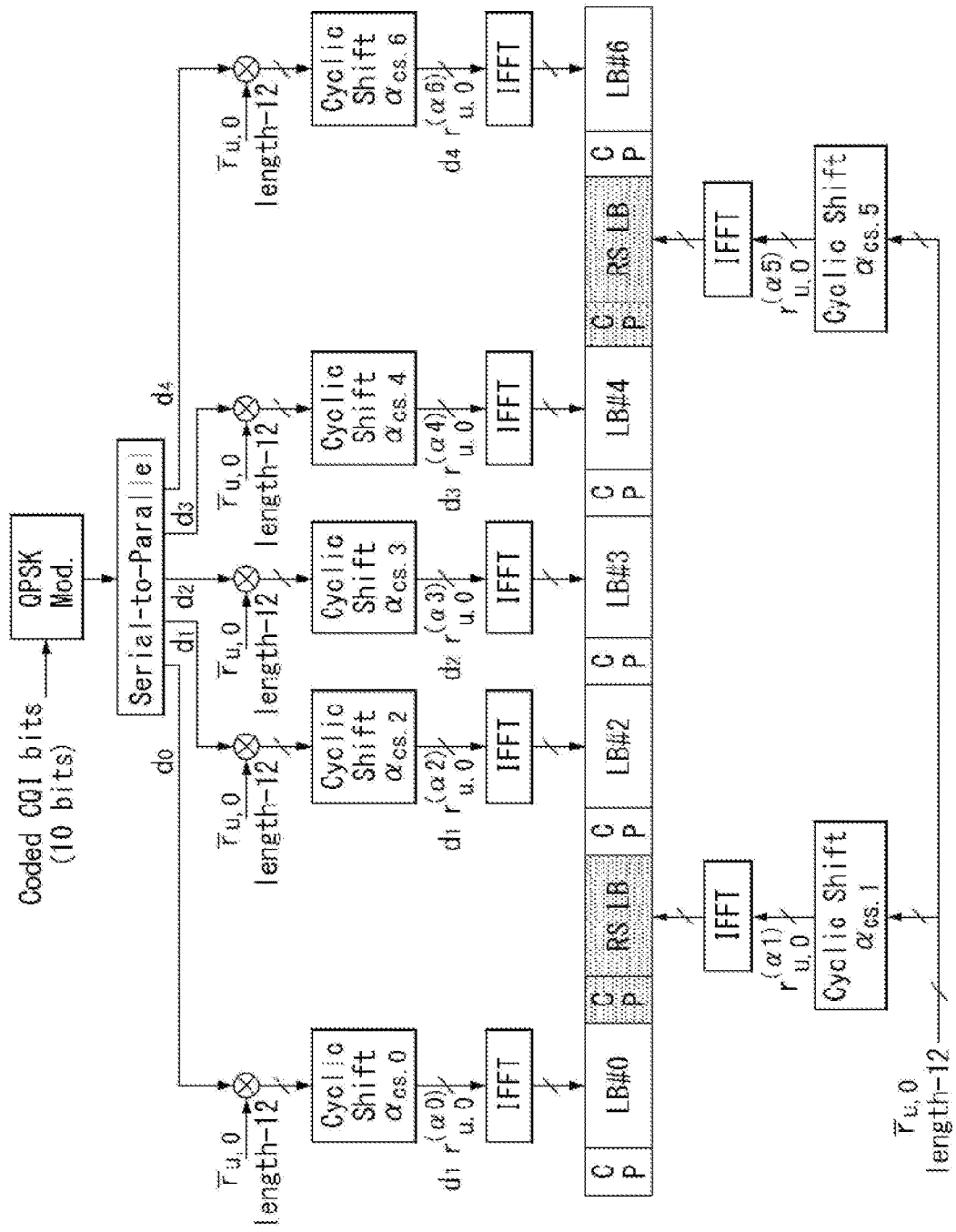
FIG. 12 illustrates a structure of channel quality indicator (CQI) channel in case of a normal cyclic prefix (CP) in a wireless communication system to which the present disclosure is applicable.

FIG. 12 illustrates a structure of CQI channel in case of a normal CP in a wireless communication system to which the present disclosure is applicable.

Among SC-FDMA symbols 0 to 6 of one slot, SC-FDMA symbols 1 and 5 (second and sixth symbols) may be used for transmission of demodulation reference signal (DMRS), and the CQI information may be transmitted in the remaining SC-FDMA symbols. In case of the extended CP, one SC-FDMA symbol (SC-FDMA symbol 3) is used for the DMRS transmission.

In the PUCCH format 2/2a/2b, the modulation by the CAZAC sequence is supported, and a QPSK modulated symbol is multiplied by the length-12 CAZAC sequence. A cyclic shift (CS) of the sequence is changed between symbols and slots. An orthogonal covering is used for the DMRS.

The reference signal (DMRS) is carried on two SC-FDMA symbols which are separated from each other at an interval of three SC-FDMA symbols among seven SC-FDMA symbols included in one slot, and the CQI information is carried on the remaining five SC-FDMA symbols. The use of two RSs in one slot is to support a high speed UE. Further, the respective UEs are distinguished using a cyclic shift (CS) sequence. CQI information symbols are modulated and transmitted to all the SC-FDMA symbols, and the SC-FDMA symbol is composed of one sequence. That is, the UE modulates the CQI and transmits the modulated CQI to each sequence.

The number of symbols which can be transmitted in one TTI is 10, and the modulation of the CQI information is also determined up to the QPSK. Since a 2-bit CQI value can be carried in case of using the QPSK mapping for the SC-FDMA symbol, a 10-bit CQI value can be carried on one slot. Thus, a CQI value of maximum 20 bits can be carried in one subframe. A frequency domain spreading code is used to spread the CQI information in a frequency domain.

As the frequency domain spreading code, length-12 CAZAC sequence (e.g., ZC sequence) may be used. Each control channel may be distinguished by applying the CAZAC sequence having a different cyclic shift value. An IFFT is performed on frequency domain spreading CQI information.

The 12 equally-spaced cyclic shifts may allow 12 different UEs to be orthogonally multiplexed on the same PUCCH RB. In case of a normal CP, a DMRS sequence on the SC-FDMA symbol 1 and 5 (on the SC-FDMA symbol 3 in case of an extended CP) is similar to a CQI signal sequence on the frequency domain, but the modulation like the CQI information is not applied.

The UE may be semi-statically configured by higher layer signaling to report periodically different CQI, PMI, and RI types on PUCCH resources indicated as PUCCH resource indexes ($n_{PUCCH}^{(1,\tilde{p})}$, $n_{PUCCH}^{(2,\tilde{p})}$, $n_{PUCCH}^{(3,\tilde{p})}$). Here, the PUCCH resource index ($n_{PUCCH}^{(2,\tilde{p})}$) is information indicating a PUCCH region used for the PUCCH format 2/2a/2b transmission and a cyclic shift (CS) value to be used.

PUCCH Channel Structure

PUCCH formats 1a and 1b are described.

In the PUCCH format 1a/1b, a symbol modulated using a BPSK or QPSK modulation scheme is multiplied by length-12 CAZAC sequence. For example, the result of multiplying length-N CAZAC sequence r(n) (where n=0, 1, 2, . . . , N−1) by a modulation symbol d(0) is y(0), y(1), y(2), . . . , y(N−1). The symbols y(0), y(1), y(2), . . . , y(N−1) may be referred to as a block of symbols. After the CAZAC sequence is multiplied by the modulation symbol, the block-wise spreading using an orthogonal sequence is applied.

A length-4 Hadamard sequence is used for normal ACK/NACK information, and a length-3 discrete fourier transform (DFT) sequence is used for shortened ACK/NACK information and a reference signal.

A length-2 Hadamard sequence is used for the reference signal in case of an extended CP.

Figure 13:
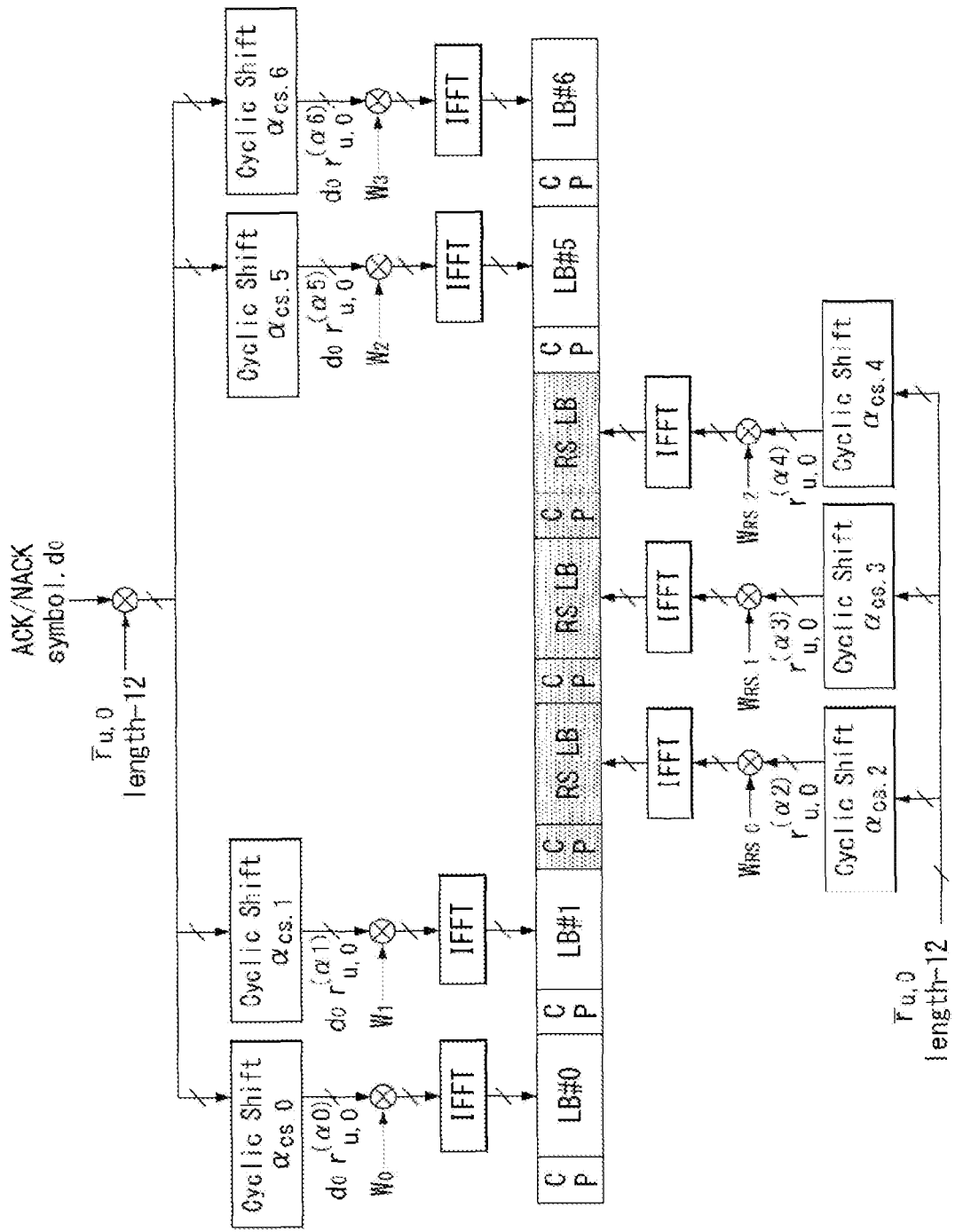
FIG. 13 illustrates a structure of ACK/NACK channel in case of a normal CP in a wireless communication system to which the present disclosure is applicable.

FIG. 13 illustrates a structure of ACK/NACK channel in case of a normal CP in a wireless communication system to which the present disclosure is applicable.

More specifically, FIG. 13 illustrates an example of a PUCCH channel structure for HARQ ACK/NACK transmission without CQI.

A reference signal (RS) is carried on three consecutive SC-FDMA symbols in the middle of seven SC-FDMA symbols included in one slot, and an ACK/NACK signal is carried on the remaining four SC-FDMA symbols.

In case of an extended CP, the RS may be carried on two consecutive symbols in the middle. The number and location of symbols used for the RS may vary depending on a control channel, and the number and location of symbols used for the ACK/NACK signal related may be changed accordingly.

Both 1-bit and 2-bit acknowledgement information (in a state of not being scrambled) may be expressed as a single HARQ ACK/NACK modulation symbol using the BPSK and QPSK modulation schemes, respectively. Positive acknowledgement (ACK) may be encoded as '1', and negative ACK (NACK) may be encoded as '0'.

When a control signal is transmitted in an allocated bandwidth, two-dimensional spreading is applied to increase a multiplexing capacity. That is, frequency domain spreading and time domain spreading are simultaneously applied to increase the number of UEs or the number of control channels that can be multiplexed.

In order to spread an ACK/NACK signal in the frequency domain, a frequency domain sequence is used as a base sequence. As the frequency domain sequence, a Zadoff-Chu (ZC) sequence which is a kind of CAZAC sequence may be used. For example, multiplexing of different UEs or different control channels can be applied by applying different cyclic shifts (CS) to the ZC sequence which is the base sequence. The number of CS resources supported in SC-FDMA symbols for PUCCH RBs for the HARQ ACK/NACK transmission is configured by a cell-specific higher layer signaling parameter $\Delta_{shift}^{PUCCH}$.

The frequency domain spreading ACK/NACK signal is spread in a time domain using an orthogonal spreading code. A Walsh-Hadamard sequence or a DFT sequence may be used as the orthogonal spreading code. For example, the ACK/NACK signal may be spread using length-4 orthogonal sequences (w0, w1, w2, w3) for four symbols. An RS is also spread through length-3 or length-2 orthogonal sequence. This is referred to as orthogonal covering (OC).

As described above, multiple UEs may be multiplexed in a code division multiplexing (CDM) method using CS resources in the frequency domain and OC resources in the time domain. That is, ACK/NACK information and a RS of a large number of UEs may be multiplexed on the same PUCCH RB.

As to the time domain spreading CDM, the number of spreading codes supported for the ACK/NACK information is limited by the number of RS symbols. That is, since the number of SC-FDMA symbols for RS transmission is less than the number of SC-FDMA symbols for ACK/NACK information transmission, a multiplexing capacity of the RS is less than a multiplexing capacity of the ACK/NACK information.

For example, in case of the normal CP, the ACK/NACK information may be transmitted on four symbols, and not four but three orthogonal spreading codes may be used for the ACK/NACK information. This is because the number of RS transmission symbols is limited to three, and three orthogonal spreading codes only may be used for the RS.

If three symbols in one slot are used for the RS transmission and four symbols are used for the ACK/NACK information transmission in a subframe of the normal CP, for example, if six cyclic shifts (CSs) in the frequency domain and three orthogonal covering (OC) resources in the time domain can be used, HARQ acknowledgement from a total of 18 different UEs may be multiplexed within one PUCCH RB. If two symbols in one slot are used for the RS transmission and four symbols are used for the ACK/NACK information transmission in a subframe of the extended CP, for example, if six cyclic shifts (CSs) in the frequency domain and two orthogonal covering (OC) resources in the time domain can be used, HARQ acknowledgement from a total of 12 different UEs may be multiplexed in one PUCCH RB.

Next, the PUCCH format 1 is described. A scheduling request (SR) is transmitted in such a manner that the UE is requested to be scheduled or is not request. A SR channel reuses an ACK/NACK channel structure in the PUCCH format 1a/1b, and is configured in an on-off keying (OOK) method based on an ACK/NACK channel design. In the SR channel, a reference signal is not transmitted. Thus, length-7 sequence is used in the normal CP, and length-6 sequence is used in the extended CP. Different cyclic shifts or orthogonal covers may be allocated for the SR and the ACK/NACK. That is, the UE transmits HARQ ACK/NACK on resources allocated for the SR for the purpose of positive SR transmission. The UE transmits HARQ ACK/NACK on resources allocated for the ACK/NACK for the purpose of negative SR transmission.

Next, an enhanced-PUCCH (e-PUCCH) format is described. The e-PUCCH format may correspond to PUCCH format 3 of the LTE-A system. A block spreading scheme may be applied to the ACK/NACK transmission using the PUCCH format 3.

PUCCH Piggybacking in Rel-8 LTE

Figure 14:
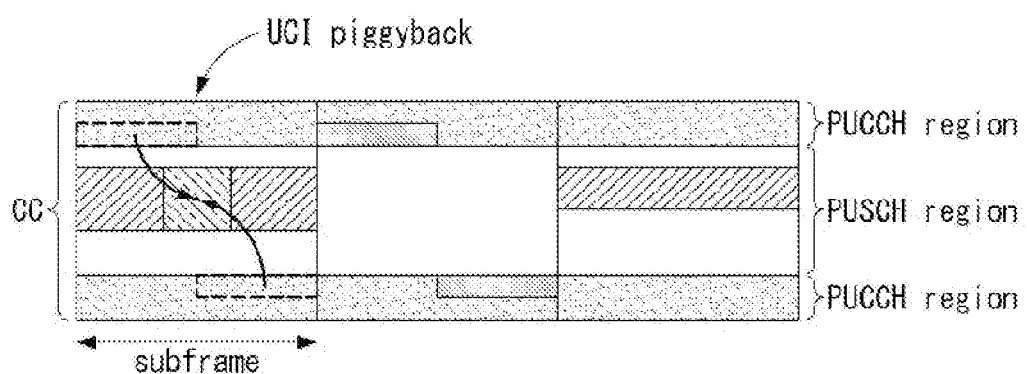
FIG. 14 illustrates an example of transport channel processing of an uplink shared channel (UL-SCH) in a wireless communication system to which the present disclosure is applicable.

FIG. 14 illustrates an example of transport channel processing of an UL-SCH in a wireless communication system to which the present disclosure is applicable.

In the 3GPP LTE system (=E-UTRA, Rel. 8), in case of the UL, for efficient utilization of a power amplifier of a terminal, peak-to-average power ratio (PAPR) characteristics or cubic metric (CM) characteristics that affect a performance of the power amplifier are configured so that good single carrier transmission is maintained. That is, in the existing LTE system, the good single carrier characteristics can be maintained by maintaining single carrier characteristics of data to be transmitted through DFT-precoding in case of the PUSCH transmission, and transmitting information carried on a sequence with the single carrier characteristic in case of the PUCCH transmission. However, when DFT-precoded data is non-consecutively allocated to a frequency axis or the PUSCH and the PUCCH are simultaneously transmitted, the single carrier characteristics are degraded. Thus, as illustrated in FIG. 8, when the PUSCH is transmitted in the same subframe as the PUCCH transmission, uplink control information (UCI) to be transmitted to the PUCCH for the purpose of maintaining the single carrier characteristics is transmitted (piggyback) together with the data via the PUSCH.

As described above, because the PUCCH and the PUSCH cannot be simultaneously transmitted in the existing LTE terminal, the existing LTE terminal uses a method that multiplexes uplink control information (UCI) (CQI/PMI, HARQ-ACK, RI, etc.) to the PUSCH region in a subframe in which the PUSCH is transmitted.

For example, when a channel quality indicator (CQI) and/or a precoding matrix indicator (PMI) needs to be transmitted in a subframe allocated to transmit the PUSCH, UL-SCH data and the CQI/PMI are multiplexed before DFT-spreading to transmit both control information and data. In this case, the UL-SCH data performs rate-matching considering CQI/PMI resources. Further, a scheme is used, in which control information such as HARQ ACK and RI punctures the UL-SCH data and is multiplexed to the PUSCH region.

Figure 15:
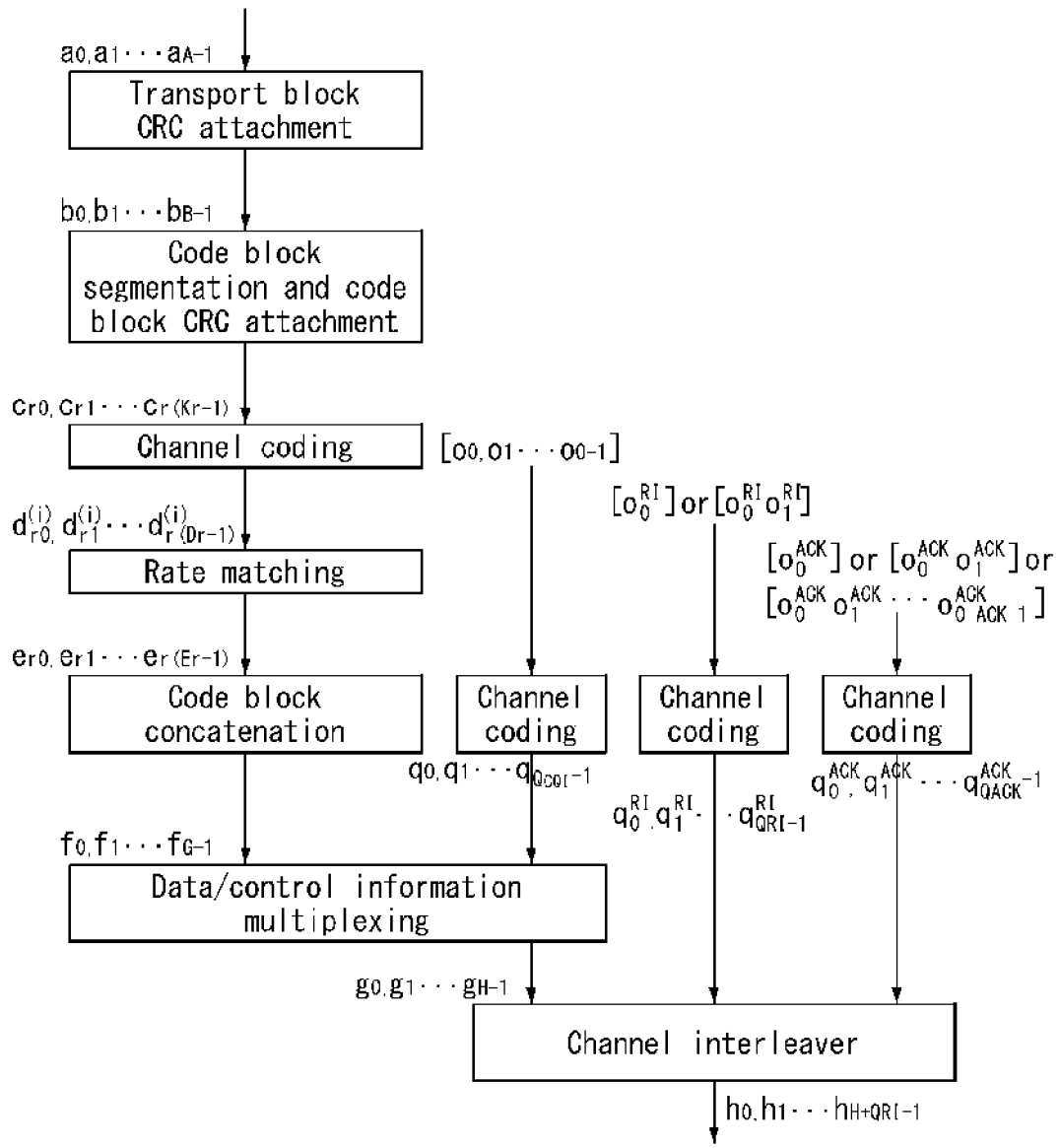
FIG. 15 illustrates an example of signal processing of an uplink shared channel that is a transport channel in a wireless communication system to which the present disclosure is applicable.

FIG. 15 illustrates an example of signal processing of an uplink shared channel that is a transport channel in a wireless communication system to which the present disclosure is applicable.

Hereinafter, signal processing of an uplink shared channel (hereinafter, referred to as "UL-SCH") may be applied to one or more transport channels or control information types.

Referring to FIG. 15, the UL-SCH transfers data to a coding unit in the form of a transport block (TB) once every transmission time interval (TTI).

CRC parity bits $p_0, p_1, p_2, p_3, \ldots, p_{L-1}$ are attached to bits $a_0, a_1, a_2, a_3, \ldots, a_{A-1}$ of a transport block transferred from the upper layer (higher layer). In this instance, A denotes a size of the transport block, and L denotes the number of parity bits. Input bits, to which the CRC is attached, are denoted by $b_0, b_1, b_2, b_3, \ldots, b_{B-1}$. In this instance, B denotes the number of bits of the transport block including the CRC.

$b_0, b_1, b_2, b_3, \ldots, b_{B-1}$ are segmented into multiple code blocks (CBs) according to the size of the TB, and the CRC is attached to the multiple segmented CBs. Bits after the code block segmentation and the CRC attachment are denoted by $c_{r0}, c_{r1}, c_{r2}, c_{r3}, \ldots, c_{r(K_r-1)}$, where r is No. (r=0, . . . , C−1) of the code block, and $K_r$ is the number of bits depending on the code block r. Further, C denotes the total number of code blocks.

Subsequently, channel coding is performed. Output bits after the channel coding are denoted by $d_{r0}^{(i)}, d_{r1}^{(i)}, d_{r2}^{(i)}, d_{r3}^{(i)}, \ldots, d_{r(D_r-1)}^{(i)}$. In this instance, i represents a coded stream index and may have a value of 0, 1, or 2. Dr represents the number of bits of an i-th coded stream for a code block r. r represents a code block number (r=0, . . . , C−1), and C represents the total number of code blocks. Each code block may be coded by turbo coding.

Subsequently, rate matching is performed. Bits after the rate matching are denoted by $e_{r0}, e_{r1}, e_{r2}, e_{r3}, \ldots, e_{r(E_r-1)}$. In this case, r represents the code block number (r=0, . . . , C−1), and C represents the total number of code blocks. Er represents the number of rate-matched bits of a r-th code block.

Subsequently, concatenation between the code blocks is performed again. Bits after the concatenation of the code blocks is performed are denoted by $f_0, f_1, f_2, f_3, \ldots, f_{G-1}$. In this instance, G represents the total number of bits coded for transmission, and when the control information is multiplexed with the UL-SCH, the number of bits used for the transmission of the control information is not included.

When the control information is transmitted on the PUSCH, channel coding of CQI/PMI, RI, and ACK/NACK which are the control information is independently performed. Because different coded symbols are allocated for the transmission of each control information, each control information has a different coding rate.

In time division duplex (TDD), an ACK/NACK feedback mode supports two modes of ACK/NACK bundling and ACK/NACK multiplexing by higher layer configuration. ACK/NACK information bit for the ACK/NACK bundling consists of 1 bit or 2 bits, and ACK/NACK information bit for the ACK/NACK multiplexing consists of between 1 bit and 4 bits.

After the concatenation between the code blocks, coded bits $f_0, f_1, f_2, f_3, \ldots, f_{G-1}$ of the UL-SCH data and coded bits $q_0, q_1, q_2, q_3, \ldots, q_{N_L \cdot Q_{CQI}-1}$ of the CQI/PMI are multiplexed. The result of multiplexing the data and the CQI/PMI is denoted by $\underline{g}_0, \underline{g}_1, \underline{g}_2, \underline{g}_3, \ldots, \underline{g}_{H'-1}$. In this instance, $\underline{g}_i$ (i=0, ..., H'−1) represents a column vector with a length of $(Q_m \cdot N_L)$, $H = (G + N_L \cdot Q_{CQI})$, and $H' = H/(N_L \cdot Q_m)$. $N_L$ represents the number of layers mapped to a UL-SCH transport block, and H represents the total number of coded bits allocated, for the UL-SCH data and the CQI/PMI information, to $N_L$ transport layers to which the transport block is mapped.

Subsequently, multiplexed data and CQI/PMI, separately channel-coded RI, and ACK/NACK are channel-interleaved to generate an output signal.

PDCCH Assignment Procedure

A plurality of PDCCHs may be transmitted within one subframe. That is, a control region of one subframe consists of a plurality of CCEs having indexes 0 to $N_{CCE,k}-1$, where $N_{CCE,k}$ denotes the total number of CCEs in a control region of a k-th subframe. The UE monitors a plurality of PDCCHs in every subframe. Here, the monitoring means that the UE attempts the decoding of each PDCCH depending on a monitored PDCCH format. The base station does not provide the UE with information about where the corresponding PDCCH is in a control region allocated in a subframe. Since the UE cannot know which position its own PDCCH is transmitted at which CCE aggregation level or DCI format in order to receive a control channel transmitted by the base station, the UE monitors a set of PDCCH candidates in the subframe and searches its own PDCCH. This is called blind decoding/detection (BD). The blind decoding refers to a method, by the UE, for de-masking its own UE identifier (UE ID) from a CRC part and then checking whether a corresponding PDCCH is its own control channel by reviewing a CRC error.

In an active mode, the UE monitors a PDCCH of each subframe in order to receive data transmitted to the UE. In a DRX mode, the UE wakes up in a monitoring interval of each DRX period and monitors a PDCCH in a subframe corresponding to the monitoring interval. A subframe in which the monitoring of the PDCCH is performed is called a non-DRX subframe.

The UE shall perform the blind decoding on all of CCEs present in a control region of the non-DRX subframe in order to receive the PDCCH transmitted to the UE. Since the UE does not know which PDCCH format will be transmitted, the UE shall decode all of PDCCHs at a possible CCE aggregation level until the blind decoding of the PDCCHs is successful within each non-DRX subframe. Since the UE does not know how many CCEs are used for the PDCCH for the UE, the UE shall attempt detection at all the possible CCE aggregation levels until the blind decoding of the PDCCH is successful. That is, the UE performs the blind decoding per CCE aggregation level. That is, the UE first attempts decoding by setting a CCE aggregation level unit to 1. If all the decoding fails, the UE attempts decoding by setting the CCE aggregation level unit to 2. Thereafter, the UE attempts decoding by setting the CCE aggregation level unit to 4 and setting the CCE aggregation level unit to 8. Furthermore, the UE attempts the blind decoding on a total of four of C-RNTI, P-RNTI, SI-RNTI, and RA-RNTI. The UE attempts blind decoding on all the DCI formats that need to be monitored.

As described above, if the UE performs blind decoding on all the possible RNTIs and all the DCI formats, that need to monitored, per each of all the CCE aggregation levels, the number of detection attempts excessively increases. Therefore, in the LTE system, a search space (SS) concept is defined for the blind decoding of the UE. The search space means a set of PDCCH candidates for monitoring, and may have a different size depending on each PDCCH format.

The search space may include a common search space (CSS) and a UE-specific/dedicated search space (USS). In the case of the common search space, all the UEs may be aware of the size of the common search space, but the UE-specific search space may be individually configured to each UE. Thus, the UE must monitor both the UE-specific search space and the common search space in order to decode the PDCCH, and thus performs blind decoding (BD) up to 44 times in one subframe. This does not include blind decoding performed based on a different CRC value (e.g., C-RNTI, P-RNTI, SI-RNTI, RA-RNTI).

There may occur a case where the base station cannot secure CCE resources for transmitting a PDCCH to all the UEs which intend to transmit the PDCCH within a given subframe due to a small search space. This is because resources left over after a CCE location is allocated may not be included in a search space of a specific UE. In order to minimize such a barrier that may continue even in a next subframe, a UE-specific hopping sequence may be applied to the point at which the UE-specific search space starts.

Table 7 represents the size of the common search space and the UE-specific search space.

TABLE 7

| PDCCH format | Number of CCEs (n) | Number of candidates in common search space | Number of candidates in dedicated search space |
| --- | --- | --- | --- |
| 0 | 1 | — | 6 |
| 1 | 2 | — | 6 |
| 2 | 4 | 4 | 2 |
| 3 | 8 | 2 | 2 |

In order to reduce a computational load of a UE according to the number of times that the UE attempts blind decoding, the UE does not perform search according to all of defined DCI formats at the same time. Specifically, the UE may always perform search for DCI formats 0 and 1A in the UE-specific search space. In this instance, the DCI formats 0 and 1A have the same size, but the UE may distinguish between the DCI formats using a flag for the DCI format 0/format 1A differentiation included in a PDCCH. Furthermore, DCI formats other than the DCI formats 0 and 1A may be required for the UE depending on a PDSCH transmission mode configured by the base station. For example, DCI formats 1, 1B and 2 may be used.

The UE in the common search space may search for the DCI formats 1A and 1C. Furthermore, the UE may be configured to search for the DCI format 3 or 3A. The DCI formats 3 and 3A have the same size as the DCI formats 0 and 1A, but the UE may distinguish between the DCI formats using CRS scrambled by another identifier not a UE-specific identifier.

A search space $S_k^{(L)}$ means a set of PDCCH candidates according to an aggregation level L∈{1, 2, 4, 8} A CCE according to a PDCCH candidate set m of the search space may be determined by the following Equation 3.

$$L \cdot \{(Y_k + m) \bmod \lfloor N_{CCE,k}/L \rfloor\} + i \qquad \text{[Equation 3]}$$

Here, $M^{(L)}$ represents the number of PDCCH candidates according to a CCE aggregation level L for monitoring in the search space, and m=0, . . . , $M^{(L)}$–1. i is an index for designating an individual CCE in each PDCCH candidate, where i=0, . . . , L–1.

As described above, the UE monitors both the UE-specific search space and the common search space in order to decode the PDCCH. Here, the common search space (CSS) supports PDCCHs with an aggregation level of {4, 8}, and the UE-specific search space (USS) supports PDCCHs with an aggregation level of {1, 2, 4, 8}.

Table 8 represents DCCH candidates monitored by a UE.

TABLE 8

| Type | Search space $S_k^{(L)}$ Aggregation Level L | Size [in CCEs] | Number of PDCCH candidates $M^{(L)}$ |
|---|---|---|---|
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

Referring to Equation 3, in case of the common search space, $Y_k$ is set to 0 with respect to two aggregation levels L=4 and L=8. On the other hand, in case of the UE-specific search space with respect to an aggregation level L, $Y_k$ is defined as in Equation 4

$$Y_k = (A \cdot Y_{k-1}) \bmod D \qquad \text{[Equation 4]}$$

Here, $Y_{-1} = n_{RNTI} \neq 0$, and an RNTI value used for $n_{RNTI}$ may be defined as one of identifications of the UE. Further, A=39827, D=65537, and k=$\lfloor n_s/2 \rfloor$, where $n_s$ denotes a slot number (or index) in a radio frame.

General ACK/NACK Multiplexing Method

In a situation in which a UE shall simultaneously transmit multiple ACKs/NACKs corresponding to multiple data units received from an eNB, an ACK/NACK multiplexing method based on PUCCH resource selection may be considered to maintain single-frequency characteristics of an ACK/NACK signal and reduce ACK/NACK transmission power.

Together with ACK/NACK multiplexing, contents of ACK/NACK responses for multiple data units are identified by combining a PUCCH resource and a resource of QPSK modulation symbols used for actual ACK/NACK transmission.

For example, if one PUCCH resource transmits 4 bits and up to four data units can be transmitted, an ACK/NACK result can be identified at the eNB as indicated in the following

TABLE 9

| HARQ-ACK(0), HARQ-ACK(1), HARQ-ACK(2), HARQ-ACK(3) | $n_{PUCCH}^{(1)}$ | b(0), b(1) |
|---|---|---|
| ACK, ACK, ACK, ACK | $n_{PUCCH,1}^{(1)}$ | 1, 1 |
| ACK, ACK, ACK, NACK/DTX | $n_{PUCCH,1}^{(1)}$ | 1, 0 |
| NACK/DTX, NACK/DTX, NACK, DTX | $n_{PUCCH,2}^{(1)}$ | 1, 1 |
| ACK, ACK, NACK/DTX, ACK | $n_{PUCCH,1}^{(1)}$ | 1, 0 |
| NACK, DTX, DTX, DTX | $n_{PUCCH,0}^{(1)}$ | 1, 0 |

TABLE 9-continued

| HARQ-ACK(0), HARQ-ACK(1), HARQ-ACK(2), HARQ-ACK(3) | $n_{PUCCH}^{(1)}$ | b(0), b(1) |
|---|---|---|
| ACK, ACK, NACK/DTX, NACK/DTX | $n_{PUCCH,1}^{(1)}$ | 1, 0 |
| ACK, NACK/DTX, ACK, ACK | $n_{PUCCH,3}^{(1)}$ | 0, 1 |
| NACK/DTX, NACK/DTX, NACK/DTX, NACK | $n_{PUCCH,3}^{(1)}$ | 1, 1 |
| ACK, NACK/DTX, ACK, NACK/DTX | $n_{PUCCH,2}^{(1)}$ | 0, 1 |
| ACK, NACK/DTX, NACK/DTX, ACK | $n_{PUCCH,0}^{(1)}$ | 0, 1 |
| ACK, NACK/DTX, NACK/DTX, NACK/DTX | $n_{PUCCH,0}^{(1)}$ | 1, 1 |
| NACK/DTX, ACK, ACK, ACK | $n_{PUCCH,3}^{(1)}$ | 0, 1 |
| NACK/DTX, NACK, DTX, DTX | $n_{PUCCH,1}^{(1)}$ | 0, 0 |
| NACK/DTX, ACK, ACK, NACK/DTX | $n_{PUCCH,2}^{(1)}$ | 1, 0 |
| NACK/DTX, ACK, NACK/DTX, ACK | $n_{PUCCH,3}^{(1)}$ | 1, 0 |
| NACK/DTX, ACK, NACK/DTX, NACK/DTX | $n_{PUCCH,1}^{(1)}$ | 0, 1 |
| NACK/DTX, NACK/DTX, ACK, ACK | $n_{PUCCH,3}^{(1)}$ | 0, 1 |
| NACK/DTX, NACK/DTX, ACK, NACK/DTX | $n_{PUCCH,2}^{(1)}$ | 0, 0 |
| NACK/DTX, NACK/DTX, NACK/DTX, ACK | $n_{PUCCH,3}^{(1)}$ | 0, 0 |
| DTX, DTX, DTX, DTX | N/A | N/A |

In the above Table 9, HARQ-ACK(i) represents an ACK/NACK result for an i-th data unit. In the above Table 9, discontinuous transmission (DTX) means that there is no data unit to be transmitted for the corresponding HARQ-ACK(i) or that the UE does not detect the data unit corresponding to the HARQ-ACK(i). According to the above Table 9, a maximum of four PUCCH resources ($n_{PUCCH,0}^{(1)}$, $n_{PUCCH,1}^{(1)}$, $n_{PUCCH,2}^{(1)}$, and $n_{PUCCH,3}^{(1)}$) are provided, and b(0) and b(1) are two bits transmitted by using a selected PUCCH.

For example, if the UE successfully receives all of four data units, the UE transmits 2-bit (1,1) using $n_{PUCCH,1}^{(1)}$.

If the UE fails in decoding in first and third data units and succeeds in decoding in second and fourth data units, the US transmits bits (1,0) using $n_{PUCCH,3}^{(1)}$.

In ACK/NACK channel selection, if there is at least one ACK, the NACK and the DTX are coupled with each other. This is because a combination of the reserved PUCCH resource and the QPSK symbol may not all ACK/NACK states. However, if there is no ACK, the DTX is decoupled from the NACK.

In this case, the PUCCH resource linked to the data unit corresponding to one definite NACK may also be reserved to transmit signals of multiple ACKs/NACKs.

General ACK/NACK Transmission

In the LTE-A system, it considers to transmit, via a specific UL component carrier (CC), a plurality of ACK/NACK information/signals for a plurality of PDS CHs transmitted via a plurality of DL CCs. To this end, unlike ACK/NACK transmission using PUCCH format 1a/1b in the existing Rel-8 LTE, it may consider to transmit a plurality of ACK/NACK information/signals by channel-coding (e.g., Reed-Muller code, Tail-biting convolutional code, etc.) a plurality of ACK/NACK information and then using PUCCH format 2 or a new PUCCH format (i.e., E-PUCCH format) of the following block spreading based modified type.

A block spreading scheme is a scheme for modulating control signal transmission using an SC-FDMA method, unlike the existing PUCCH format 1 series or 2 series. As illustrated in FIG. 8, a symbol sequence may be spread on a time domain using an orthogonal cover code (OCC) and may be transmitted. Control signals of a plurality of UEs may be multiplexed on the same RB using the OCC. In case of the PUCCH format 2 described above, one symbol sequence is transmitted over the time domain, and the control signals of the plurality of UEs are multiplexed using a cyclic shift (CS) of a CAZAC sequence. On the other hand, in case of the block spreading based PUCCH format (e.g., PUCCH format 3), one symbol sequence is transmitted over a frequency domain, and the control signals of the plurality of UEs are multiplexed using a time domain spreading using the OCC.

Figure 16:
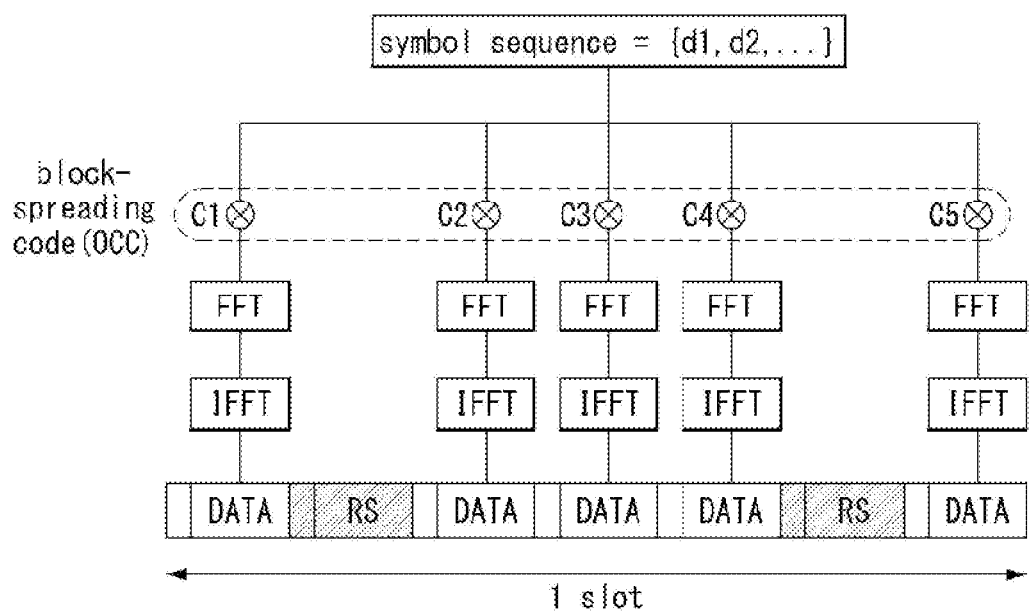
FIG. 16 illustrates an example of generating and transmitting 5 SC-FDMA symbols during one slot in a wireless communication system to which the present disclosure is applicable.

FIG. 16 illustrates an example of generating and transmitting 5 SC-FDMA symbols during one slot in a wireless communication system to which the present disclosure is applicable.

FIG. 16 illustrates an example of generating and transmitting five SC-FDMA symbols (i.e., data part) using an OCC of the length 5 (or SF=5) in one symbol sequence during one slot. In this case, two RS symbols may be used during one slot.

In the example of FIG. 16, the RS symbol may be generated from a CAZAC sequence, to which a specific cyclic shift value is applied, and may be transmitted in the form in which a predetermined OCC is applied (or multiplied) over a plurality of RS symbols. Further, in the example of FIG. 8, if it is assumed that 12 modulation symbols are used for each OFDM symbol (or SC-FDMA symbol) and each modulation symbol is generated by QPSK, the maximum number of bits which can be transmitted on one slot is 24 bits (=12×2). Thus, the number of bits which can be transmitted on two slots is a total of 48 bits. If a PUCCH channel structure of the block spreading scheme is used as described above, control information of an extended size can be transmitted as compared to the existing PUCCH format 1 series and 2 series.

For convenience of explanation, such a channel coding based method for transmitting a plurality of ACKs/NACKs using the PUCCH format 2 or the E-PUCCH format is referred to as a multi-bit ACK/NACK coding transmission method. The method refers to a method for transmitting an ACK/NACK coded block generated by channel-coding ACK/NACK information or discontinuous transmission (DTX) information (representing that a PDCCH has not been received/detected) for PDSCHs of a plurality of DL CCs. For example, if the UE operates in a SU-MIMO mode on any DL CC and receives two codewords (CWs), the UE may transmit a total of 4 feedback states of ACK/ACK, ACK/NACK, NACK/ACK, and NACK/NACK per CW on the DL CC, or may have up to 5 feedback states including until DTX. If the UE receives a single CW, the UE may have up to 3 states of ACK, NACK, and DTX (if NACK and DTX are identically processed, the UE may have a total of two states of ACK and NACK/DTX). Thus, if the UE aggregates up to 5 DL CCs and operates in an SU-MIMO mode on all the CCs, the UE may have up to 55 transmittable feedback states, and the size of an ACK/NACK payload for representing these states is a total of 12 bits (if DTX and NACK are identically processed, the number of feedback states is 45, and the size of the ACK/NACK payload for representing these states is a total of 10 bits).

In the above ACK/NACK multiplexing (i.e., ACK/NACK selection) method applied to the existing Rel-8 TDD system, the method may basically consider an implicit ACK/NACK selection method that uses implicit PUCCH resources (i.e., linked to a lowest CCE index) corresponding to PDCCH scheduling each PDSCH of the corresponding UE, in order to secure PUCCH resources of each UE. The LTE-A FDD system basically considers a plurality of ACK/NACK transmissions for a plurality of PDSCHs, which is transmitted via a plurality of DL CCs, via one specific UL CC that is UE-specifically configured. To this end, the LTE-A FDD system considers an ACK/NACK selection method using an implicit PUCCH resource linked to PDCCH (i.e., linked to a lowest CCE index n_CCE, or linked to n_CCE and n_CCE+1) that schedules a specific DL CC, or some of DL CCs, or all DL CCs, or a combination of the corresponding implicit PUCCH resource and an explicit PUCCH resource that is previously reserved to each UE via RRC signaling.

The LTE-A TDD system may also consider a situation in which a plurality of CCs is aggregated (i.e., CA). Hence, it may consider transmitting a plurality of ACK/NACK information/signals for a plurality of PDSCHs, which is transmitted via a plurality of DL subframes and a plurality of CCs, via a specific CC (i.e., AN/CC) in UL subframes corresponding to the corresponding plurality of DL subframes. In this instance, unlike the LTE-A FDD system mentioned above, the LTE-A TDD system may consider a method (i.e., full ACK/NACK) for transmitting a plurality of ACKs/NACKs corresponding to the maximum number of CWs, that can be transmitted via all the CCs assigned to the UE, in all of a plurality of DL subframes (i.e., SFs), or a method (i.e., bundles ACK/NACK) for transmitting ACKs/NACKs by applying ACK/NACK bundling to CW and/or CC and/or SF domain to reduce the total number of ACKs/NACKs to be transmitted (here, the CW bundling means that ACK/NACK bundling for CW is applied to each DL SF per each CC, the CC bundling means that ACK/NACK bundling for all or some of CCs is applied to each DL SF, and the SF bundling means that ACK/NACK bundling for all or some of DL SFs is applied to each CC. Characteristically, as a SF bundling method, it may consider an ACK-counter method which informs the total number of ACKs (or the number of some of the ACKs) per CC with respect to all PDSCHs or DL grant PDCCHs received for each CC). In this instance, a multi-bit ACK/NACK coding or an ACK/NACK selection based ACK/NACK transmission method may be configurably applied according to a size of an ACK/NACK payload per UE, i.e., a size of an ACK/NACK payload for full or bundled ACK/NACK transmission that is configured for each UE.

ACK/NACK Transmission for LTE-A

The LTE-A system supports transmitting, via a specific UL CC, a plurality of ACK/NACK information/signals for a plurality of PDSCHs which are transmitted via a plurality of DL CCs. To this end, unlike ACK/NACK transmission using PUCCH format 1a/1b in the existing Rel-8 LTE, a plurality of ACK/NACK information may be transmitted through a PUCCH format 3.

Figure 17:
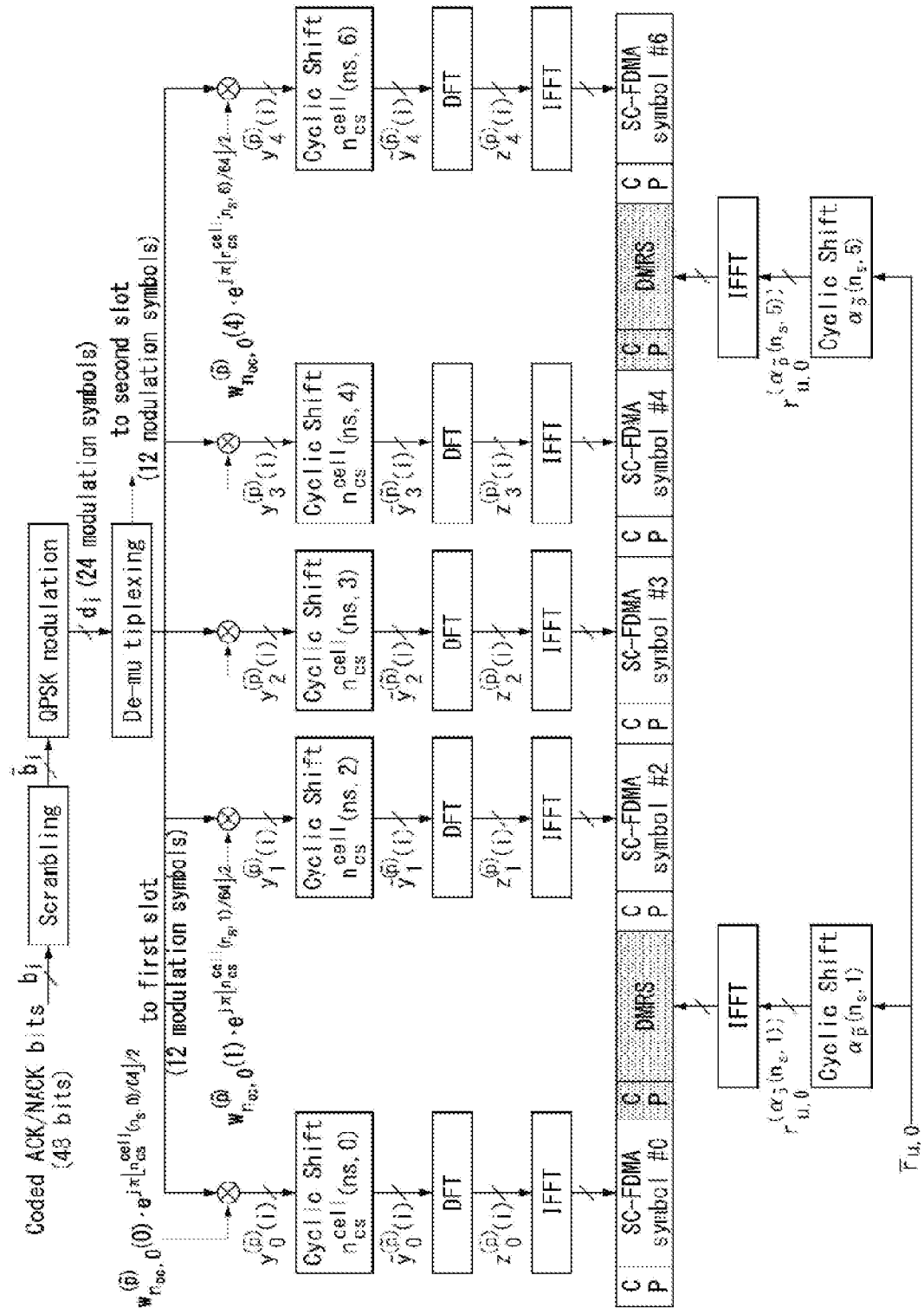
FIG. 17 illustrates an ACK/NACK channel structure for PUCCH format 3 with a normal CP.

FIG. 17 illustrates an ACK/NACK channel structure for PUCCH format 3 with a normal CP.

As illustrated in FIG. 17, a symbol sequence is transmitted by time-domain spreading by an orthogonal cover code (OCC) and may multiplex control signals of multiple UEs on the same RB using the OCC. In the PUCCH format 2 mentioned above, one symbol sequence is transmitted over a time domain and performs the UE multiplexing using a cyclic shift of a CAZAC sequence. On the other hand, in case of the PUCCH format 3, one symbol sequence is transmitted over a frequency domain and performs the UE multiplexing using the time-domain spreading based on the OCC. FIG. 17 illustrates a method for generating and transmitting five SC-FDMA symbols from one symbol sequence using OCC of length-5 (spreading factor=5). In an example of FIG. 17, a total of two RS symbols have been used during one slot, but various applications including a method of using three RS symbols and using the OCC of spreading factor=4, etc. may be considered. Here, the RS symbol may be generated from a CAZAC sequence with a specific cyclic shift and may be transmitted in the form in which a specific OCC is applied (or multiplied) to a plurality of RS symbols of the time domain. In the example of FIG.

17, if it is assumed that 12 modulation symbols are used for each SC-FDMA symbol and each modulation symbol uses QPSK, the maximum number of bits which can be transmitted on each slot is 24 bits (=12×2). Thus, the number of bits which can be transmitted on two slots is a total of 48 bits.

For convenience of explanation, such a channel coding based method for transmitting a plurality of ACKs/NACKs using the PUCCH format 2 or the E-PUCCH format is referred to as a "multi-bit ACK/NACK coding" transmission method. The method refers to a method for transmitting an ACK/NACK coded block generated by channel-coding ACK/NACK information or DTX information (representing that a PDCCH has not been received/detected) for PDSCHs of a plurality of DL CCs. For example, if the UE operates in a SU-MIMO mode on any DL CC and receives two codewords (CWs), the UE may transmit a total of 4 feedback states of ACK/ACK, ACK/NACK, NACK/ACK, and NACK/NACK per CW on the DL CC, or may have up to 5 feedback states including until DTX. If the UE receives a single CW, the UE may have up to 3 states of ACK, NACK, and DTX (if NACK and DTX are identically processed, the UE may have a total of two states of ACK and NACK/DTX). Thus, if the UE aggregates up to 5 DL CCs and operates in an SU-MIMO mode on all the CCs, the UE may have up to 55 transmittable feedback states, and the size of an ACK/NACK payload for representing these states is a total of 12 bits (if DTX and NACK are identically processed, the number of feedback states is 45, and the size of the ACK/NACK payload for representing these states is a total of 10 bits).

In the above ACK/NACK multiplexing (i.e., ACK/NACK selection) method applied to the existing Rel-8 TDD system, the method may basically consider an implicit ACK/NACK selection method that uses implicit PUCCH resources (i.e., linked to a lowest CCE index) corresponding to PDCCH scheduling each PDSCH of the corresponding UE, in order to secure PUCCH resources of each UE. The LTE-A FDD system basically considers a plurality of ACK/NACK transmissions for a plurality of PDSCHs, which is transmitted via a plurality of DL CCs, via one specific UL CC that is UE-specifically configured. To this end, the LTE-A FDD system considers an "ACK/NACK selection" method using an implicit PUCCH resource linked to PDCCH (i.e., linked to a lowest CCE index n_CCE, or linked to n_CCE and n_CCE+1) that schedules a specific DL CC, or some of DL CCs, or all DL CCs, or a combination of the corresponding implicit PUCCH resource and an explicit PUCCH resource that is previously reserved to each UE via RRC signaling.

The LTE-A TDD system may also consider a situation in which a plurality of CCs is aggregated (i.e., CA). Hence, it may consider transmitting a plurality of ACK/NACK information/signals for a plurality of PDSCHs, which is transmitted via a plurality of DL subframes and a plurality of CCs, via a specific CC (i.e., AN/CC) in UL subframes corresponding to the corresponding plurality of DL subframes. In this instance, unlike the LTE-A FDD system mentioned above, the LTE-A TDD system may consider a method (i.e., full ACK/NACK) for transmitting a plurality of ACKs/NACKs corresponding to the maximum number of CWs, that can be transmitted via all the CCs assigned to the UE, in all of a plurality of DL subframes (i.e., SFs), or a method (i.e., bundles ACK/NACK) for transmitting ACKs/NACKs by applying ACK/NACK bundling to CW and/or CC and/or SF domain to reduce the total number of ACKs/NACKs to be transmitted (here, the CW bundling means that ACK/NACK bundling for CW is applied to each DL SF per each CC, the CC bundling means that ACK/NACK bundling for all or some of CCs is applied to each DL SF, and the SF bundling means that ACK/NACK bundling for all or some of DL SFs is applied to each CC. Characteristically, as a SF bundling method, it may consider an "ACK-counter" method which informs of the total number of ACKs (or the number of some ACKs) per CC for all PDSCHs or DL grant PDCCHs received for each CC). In this instance, a "multi-bit ACK/NACK coding" or an "ACK/NACK selection" based ACK/NACK transmission method may be configurably applied according to a size of an ACK/NACK payload per UE, i.e., a size of an ACK/NACK payload for the full or bundled ACK/NACK transmission that is configured for each UE.

The next-generation wireless communication system uses a wide frequency band and aims to support various services or requirements. For example, in new radio (NR) requirements of the 3GPP, Ultra Reliable and Low Latency Communication (URLLC) that is one of representative scenarios may require low latency and high reliability requirements that a user plane latency is within 0.5 ms and X-byte data shall be transmitted at an error rate of $10^{-5}$ within 1 ms.

Further, traffic of URLLC is characterized in that it has a file size within tens to hundreds of bytes and occurs sporadically, unlike enhanced Mobile BroadBand (eMBB) with a large traffic capacity.

Thus, the eMBB requires transmission that maximizes a transfer rate and minimize an overhead of control information, whereas the URLLC requires a transmission method with a short scheduling time unit and the reliability.

A reference time unit assumed/used to transmit and receive a physical channel may be variously configured depending on an applied field or a type of traffic. The reference time may be a base unit for scheduling a specific physical channel. The reference time unit may vary depending on the number of symbols constituting the corresponding scheduling unit and/or a subcarrier spacing, or the like.

The present disclosure uses a slot and a mini-slot as the reference time unit, for convenience of explanation. For example, the slot used may be a scheduling base unit used in a normal data traffic (e.g., eMBB).

The mini-slot may have a shorter time duration than the slot in a time domain. The mini-slot may be a scheduling base unit used in more special purpose traffic or communication schemes (e.g., URLLC, unlicensed band or millimeter wave, etc.).

However, this is merely an example, and it is apparent that methods described in the present disclosure can be extended and applied even if the eMBB transmits and receives the physical channel based on the mini-slot, and/or even if the URLLC or other communication schemes transmit and receive the physical channel based on the slot.

Hereinafter, the present disclosure describes a method of controlling and/or determining a transmission power depending on a state of HARQ-ACK and/or a priority of service (first embodiment), a method of calculating and/or determining a power transmission related parameter by giving a weight depending on a priority of service (second embodiment), a method of controlling power by configuring a TPC related definition and/or rule (third embodiment), a method of controlling and/or determining power considering a priority of service (fourth embodiment), and a method of controlling and/or configuring power for a plurality of SPS configurations (fifth embodiment).

The following embodiments described in the present disclosure are merely divided for convenience of explanation, and thus it is apparent that a partial method and/or partial configuration, etc., of any embodiment can be replaced by or combined with methods and/or configurations, etc. of other embodiments.

Furthermore, a slot, a subframe, a frame, etc. mentioned in embodiments of the present disclosure may correspond to detailed examples of certain time units used in a wireless communication system. That is, when applying methods described in the present disclosure, a time unit, etc. can be replaced by other time units applied to other wireless communication systems.

First Embodiment

First, a method of controlling a transmission power depending on a state of HARQ-ACK and a method of controlling a transmission power in a power-limited situation are described.

Methods described below are merely divided for convenience of explanation, and thus it is apparent that configuration of any method can be replaced by or combined with configurations of other methods.

(Method 1)

A method of controlling power considering a ratio of a NACK state and/or a priority of service is described in detail below.

For ultra-reliable low latency communication (URLLC) service, it may be more important to reduce a non-acknowledgement (NACK)-to-acknowledgement (ACK) error rather than an error such as ACK-to-NACK or ACK-to-discontinuous reception (DTX).

If an error such as ACK-to-NACK or ACK-to-DTX occurs, the error may cause an unnecessary retransmission, but may not greatly affect reliability of transmission itself. On the other hand, the NACK-to-ACK error makes a transmitter end to mistake that decoding succeeded although the decoding failed at a receiver end, and does not schedule a retransmission therefor. Therefore, the NACK-to-ACK error may greatly adversely affect reliability of the transmission itself.

Considering this, as one method to reduce the NACK-to-ACK error, a method of differently providing power depending on a state of HARQ-ACK may be considered.

For example, a rule may be defined so that a transmission power in a NACK state is allocated more than a transmission power in an ACK state. Detailed methods therefor are described as follows.

First, a method may be considered which defines and/or configures a rule so that if x % or more bits of total HARQ-ACK bits are in the NACK state, power of a transmission channel (e.g., PUCCH) is allocated more than the otherwise case.

In this instance, x may be previously defined/promised, or configured/indicated (by a base station, etc.) via higher/physical layer signalling (e.g., RRC signalling, MAC-CE, DCI, etc.).

In particular, the above method may be applied when y bits or more of total HARQ-ACK bits are HARQ-ACK of PDSCH corresponding to target service (e.g., URLLC, eMBB, etc.), quality of service (QoS), block error rate (BLER) requirement, reliability requirement, latency requirement, TTI length, and/or numerology that have a higher priority.

Hereinafter, for convenience of explanation, "target service, QoS, BLER requirement, reliability requirement, latency requirement, TTI length, processing time, and/or numerology" may be referred to as service (or service type).

For example, URLLC service may be previously defined and/or stipulated at a higher priority than higher reliability, lower latency, lower BLER, shorter TTI length, larger subcarrier spacing, and eMBB.

And/or, a power boosting degree may be determined by a ratio of bits corresponding to NACK to HARQ-ACK bits. More specifically, the power boosting degree may be previously promised for each ratio (or pre-defined bit ratio range) of bits corresponding to NACK to the total HARQ-ACK bits, or may be configured/indicated (by the base station, etc.) via higher/physical layer signalling.

Next, a method may be considered which defines and/or configures a rule so that if HARQ-ACK bits of PDSCH corresponding to service of a higher priority of x % or more bits of total HARQ-ACK bits are in the NACK state, power of a transmission channel (e.g., PUCCH) is allocated more than the otherwise case. In this instance, x may be previously defined/promised, or configured/indicated (by the base station, etc.) via higher/physical layer signalling (e.g., RRC signalling, MAC-CE, DCI, etc.).

And/or, a power boosting degree may be determined by a ratio of bits corresponding to NACK of PDSCH corresponding to service of a higher priority among total HARQ-ACK bits. More specifically, the power boosting degree may be previously promised for each ratio (or pre-defined bit ratio range) of bits corresponding to NACK of PDSCH corresponding to service of a higher priority to the total HARQ-ACK bits, or may be configured/indicated via higher/physical layer signalling.

(Method 2)

Next, a method of controlling power considering a priority of service in a power-limited situation is described in detail.

That is, a rule may be defined so that if the power-limited situation occurs due to the above-described power boosting, HARQ-ACK bit of PDSCH corresponding to service of a lower priority is first dropped, and a payload consists of remaining HARQ-ACK bits. More specifically, a rule may be defined to drop from the back of HARQ-ACK bits of PDSCH corresponding to service of a lower priority. Characteristically, the bit dropping may be performed only until the power limit is not reached.

Second Embodiment

A method of calculating and/or determining a power control related parameter considering a priority of service is described in detail.

For example, for PUCCH format 1/2/3, parameter h{n_CQI, n_HARQ, n_SR} is defined so that power is determined by bits of transmitted uplink control information (UCI).

In this instance, a rule may be defined so that when multiple UCIs with different services are transmitted via one channel, a different weight is applied for each service.

As a detailed example, n_HARQ is in the form of linear combination of the number of HARQ-ACK bits for URLLC PDSCH and the number of HARQ-ACK bits for non-URLLC (e.g., eMBB) PDSCH and may be calculated as the following Equation 5.

$$n\_HARQ = a * n\_\{HARQ, URLLC\} + b * n\_\{HARQ, non-URLLC\} \quad \text{[Equation 5]}$$

In Equation 5, 'a' denotes a weight for HARQ-ACK of PDSCH corresponding to service of a higher priority. For example, a>1, b=1 or a=1, b<1 may be previously defined/ promised, or configured/indicated (by a base station, etc.) via higher/physical layer signalling (e.g., RRC signalling, MAC-CE, DCI, etc.).

Third Embodiment

Next, a method of controlling power by configuring a transmit power control (TPC) related definition and/or rule is described. Methods described below are merely divided for convenience of explanation, and thus it is apparent that configuration of any method can be replaced by or combined with configurations of other methods.

(Method 1)

First, a method of applying and/or using TPC considering repetition transmission of downlink control information (DCI) is described in detail.

Specifically, as one method to improve reliability of a control channel, DCI repetition may be considered. The DCI repetition may expect a gain by combining respective PDCCHs, or may expect an opportunistic gain from the possible perspective of data channel scheduling if any one of a plurality of PDCCHs based on non-combining succeeds in decoding.

One data channel may be scheduled by the DCI repetition, and each DCI may include a TPC command (or DCI field corresponding to this, etc.) for closed-loop power adjustment. In this case, if the UE performs an accumulation operation through the corresponding information, power adjustment may be unnecessarily repeated and applied. To prevent this, a method may be considered which defines and/or configures a rule so that the UE always applies TPC of the last detected DCI in the DCI repetition.

And/or, while one DCI schedules one transport block, PUSCH/PDSCH repetition transmitted over a plurality of transmission time intervals (TTIs) may be considered. For example, there may be a case where PUSCH of the same transport block is scheduled on TTIs #5, 6, 7 and 8 by PDCCH of TTI #1. In this case, a rule may be defined and/or configured so that a TPC command (or DCI field corresponding to this) for closed-loop power adjustment of the corresponding DCI is applied only to PUSCH (or PUCCH) corresponding to a first TTI.

In other words, the accumulation by the TPC command may not be applied for PUSCH (or PUCCH) which will be repeatedly transmitted on remaining TTIs except PUSCH (or PUCCH) corresponding to the first TTI. This may mean that for PUSCH (or PUCCH) to be repeatedly transmitted on the remaining TTIs except PUSCH (or PUCCH) corresponding to the first TTI, a reference power before the application of accumulation by the TPC command always corresponds to a previous TTI based on the first TTI. For example, the reference power before the application of accumulation by the TPC command may be power corresponding to fc(i−1) in Equation fc(i)=fc(i−1)+delta,c(i−K_PUSCH) in the LTE standard.

(Method 2)

Next, a method of adjusting power regardless of a detection time of PDCCH is described in detail.

There may be a case where the same transport block is scheduled on a plurality of TTIs by PDCCH transmitted on a plurality of TTIs.

For example, there may be a case to schedule PUSCH of TTI #5 by PDCCH of TTI #1, schedule PUSCH of TTI #6 by PDCCH of TTI #2, schedule PUSCH of TTI #7 by PDCCH of TTI #3, and so on.

As another example, there may be a case to schedule PDSCH by PDCCH of TTI #1, schedule PDSCH by PDCCH of TTI #2, schedule PDSCH by PDCCH of TTI #3, and so on.

In this case, the number of repetitions of PUSCH/PUCCH that the UE actually transmits may vary depending on which TTI the UE succeeds in detecting PDCCH.

For example, when PDCCH is repeated during four TTIs to schedule one transport block, if the UE succeeds in detecting the PDCCH at a first TTI, it is possible to perform PUCCH transmission for HARQ-ACK transmission corresponding to PUSCH or PDSCH on the four consecutive TTIs.

Alternatively, if the UE succeeds in detecting the PDCCH from a third TTI, it is possible to perform PUCCH transmission for HARQ-ACK transmission corresponding to PUSCH or PDSCH only on the two consecutive TTIs.

Accordingly, considering that a detection success time of the UE is not constant, the TPC may be configured so that a certain degree of power adjustment always occurs, regardless of whether or not the UE succeeds in PDCCH detection from any TTI.

For example, if a target power adjustment is +3 dB, 10*log 10(8/4)=3 dB boost may be indicated at TPC of a first PDCCH, 10*log 10(8/3) dB boost may be indicated at TPC of a second PDCCH, 10*log 10(8/2)=6 dB boost may be indicated at TPC of a third PDCCH, and 10*log 10(8/1) =9 dB boost may be indicated at TPC of a fourth PDCCH.

A rule may be applied so that the UE applies the corresponding TPC to PUCCH for HARQ-ACK transmission corresponding to PUSCH or PDSCH scheduled by PDCCH that the UE first succeeds in detecting, no more applies the accumulation to PUCCH for HARQ-ACK transmission corresponding to PUSCH or PDSCH which is subsequently transmitted repeatedly, and uses the same power.

In other words, a rule may be applied to ignore accumulation by a TPC included in a PDCCH subsequent to the PDCCH that the UE first succeeds in detecting.

Hence, a constant power boosting can be applied to the repetition transmission, regardless of the number of TTIs of PUSCH/PUCCH that the UE actually repeatedly transmits.

And/or, a rule may be defined and/or configured so that the base station (eNB) indicates/configures a target power, and the UE adaptively adjusts power of each TTI considering an actual transmission opportunity of the corresponding uplink (UL) channel, and thus a total transmission power satisfies the target power.

For example, if a target power for K repetition transmissions of PUSCH (or PUCCH) is indicated/configured to X, the UE may divide X depending on the number of actual repetition transmissions of the UE to obtain the total transmission power of X.

As a detailed example, if K=4, X=8, and the actual repetition transmission for the PDCCH detection of the UE is performed on two TTIs, the UE may carry a power of 4 on each of the two TTIs and perform the transmission. On the other hand, if the actual repetition transmission for the PDCCH detection of the UE is performed on four TTIs, the UE may carry a power of 2 on each of the four TTIs and perform the transmission.

Fourth Embodiment

Next, a method of controlling and/or determining power for uplink transmission considering a service priority, a service type, and/or service requirement is described.

In particular, the present disclosure divides and describes methods for uplink (UL) power control into 1) a method of configuring and/or determining a downlink path loss related parameter (alpha) depending on a priority of service (hereinafter, Method 1), 2) a method of configuring and/or determining whether to apply L3-RSRP filtering depending on a priority of service (hereinafter, Method 2), 3) a method of configuring and/or determining a timer for trigger of a power headroom report depending on a priority of service (hereinafter, Method 3), 4) a method of configuring and/or determining power control related parameters depending on a service type and/or requirement (hereinafter, Method 4), and 5) a method of resetting and/or reconfiguring a reference value of a power control adjustment state depending on a service type and/or requirement (hereinafter, Method 5), for convenience of explanation. However, the methods are merely divided for convenience of explanation, and thus it is apparent that configuration of any method can be replaced by or combined with configurations of other methods.

In the present disclosure, traffic, service, and/or application may be referred to service.

(Method 1)

A method of configuring and/or determining a downlink path loss related parameter (alpha) depending on a priority of service is first described in detail.

Traffic, service, and/or application such as Ultra Reliable Low Latency Communication (URLLC) may require high transmission/reception reliability. For example, reliability requirement of a block error rate (BLER) of $10^{-5}$ or less may need to be satisfied. To this end, in the uplink power control, it may be important to be able to always maintain a target signal to noise ratio (SNR) at a certain value or more. The alpha among parameters of the UL power control may mean a parameter that can adjust how much uplink power is boosted by compensating a DL path loss estimated by a UE. A base station may configure the alpha within a previously promised range (e.g., 0<=alpha<=1).

For example, in order to be able to always maintain a target SNR at a certain value or more in traffic, service, and/or application such as URLLC, the alpha may be fixed to 1. That is, a rule may be defined and/or configured so that the alpha is fixed to 1 for UL transmission corresponding to a specific traffic, service, and/or application with a high priority.

And/or, a rule may be defined and/or promised so that alpha for UL transmission corresponding to a specific traffic, service, and/or application with a high priority is configured to a value higher than alpha for UL transmission corresponding to other traffics, services, and/or applications. Alternatively, a rule may be defined so that alpha can be separately configured per reliability requirement, latency requirement, a target BLER, a service type, a TTI length, numerology, and/or a processing time. Herein, traffic, service, and/or application with a higher priority may mean traffic, service, and/or application that require higher reliability, lower latency, lower BLER, shorter TTI length, larger subcarrier spacing, shorter processing time, etc.

More specifically, 1) a rule may be defined and/or promised so that a value of alpha is fixed to 1 when detecting a DCI format related to UL transmission (scheduling) corresponding to a specific traffic, service, and/or application with a high priority, and/or detecting DCI in a search space. Alternatively, a rule may be defined and/or configured so that alpha configured for UL transmission corresponding to a specific traffic, service, and/or application with a high priority is configured to a value higher than alpha configured for UL transmission corresponding to other traffics, services, and/or applications.

Alternatively, 2) alpha of a different value may be previously defined/promised/configured per DCI format and/or search space.

Alternatively, 3) a value of alpha may be dynamically indicated via DCI.

Alternatively, 4) alpha may be independently and differently configured according to a mapping type. For example, if a specific mapping type is limited to being used for UL transmission (scheduling) corresponding to a specific traffic, service, and/or application with a high priority, a separate value of alpha for the corresponding mapping type may be configured/indicated to 1 or a value higher than alpha configured for UL transmission corresponding to other traffics, services, and/or applications via higher/physical layer signal.

Alternatively, 5) alpha may be independently and differently configured depending on a scheduling unit/time duration of data. For example, if a specific scheduling unit (e.g., mini-slot) is limited to being used for UL transmission (scheduling) corresponding to a specific traffic, service, and/or application with a higher priority, a separate value of alpha for a channel to be transmitted in the corresponding scheduling unit may be configured/indicated to 1 or a value higher than alpha configured for UL transmission corresponding to other traffics, services, and/or applications via higher/physical layer signal.

Alternatively, 6) alpha may be independently and differently configured per RNTI/CRC mask. For example, if a specific RNTI/CRC mask is limited to being used for UL transmission (scheduling) corresponding to a specific traffic, service, and/or application with a high priority, a separate value of alpha for the corresponding RNTI/CRC mask may be configured/indicated to 1 or a value higher than alpha configured for UL transmission corresponding to other traffics, services, and/or applications via higher/physical layer signal.

(Method 2)

Next, a method of determining and/or configuring whether to apply L3-RSRP filtering depending on a priority of service is described in detail.

A DL path loss estimation of the UE may be determined by a difference between a transmission power of a reference signal derived by a parameter configured by the base station and a reference signal received power (RSRP) by measurement of the UE.

In order to be able to always maintain a target SNR at a certain value or more in traffic, service, and/or application such as URLLC, L3-RSRP filtering operation may be defined differently from an existing operation. The following illustrates an example of layer 3 filter operation for measurement of the UE.

The UE may operate according to a pre-defined standard (e.g., 3GPP TS 38.311, 5.5.3.1) for each cell measurement quantity and for each beam measurement quantity, that the UE performs measurements.

The UE may Layer3 filter the measured result, before using for evaluation of reporting criteria or for measurement reporting, by the following Equation 6.

$$F_n = (1-a) \cdot F_{n-1} + a \cdot M_n \qquad \text{[Equation 6]}$$

In Equation 6, M_n is the latest received measurement result from the physical layer. F_n is the updated filtered measurement result, and may be used for evaluation of reporting criteria or for measurement reporting. F_n−1 is the old filtered measurement result, where F_0 is determined as M_1, and the first measurement result from the physical layer may be received. Further, $a=(1/2)^{(k/4)}$, where k is filterCoefficient for the corresponding measurement quantity received by an upper layer parameter quantityConfig.

The UE adopts the filter such that the time characteristics of the filter are preserved at different input rates, observing that the filterCoefficient k assumes as a sample rate equal to X ms. A value of X is equivalent to an intra-frequency L1 measurement period as described in the pre-defined standard (e.g., TS 38.331) assuming a non-discontinuous reception (DRX) operation, and depends on a frequency range. In this instance, if k is set to 0, no layer 3 filtering is applicable. The filtering may be performed in the same domain as used for evaluation of reporting criteria or for measurement reporting. That is, the filtering may be logarithmic filtering for logarithmic measurements. The filter input rate may depend on the implementation to fulfil the performance requirements described in the pre-defined standard (e.g., TS 38.133). The detailed description about the physical layer measurements may see the pre-defined standard.

For the more instantaneous path loss estimation, no L3-RSRP filtering is applicable to the RSRP measurement result of the UE. In other words, a rule may be defined and/or promised so that L3-RSRP filtering is not applied for UL transmission corresponding to a specific traffic, service, and/or application with a higher priority (e.g., $k=0 \Rightarrow a=1 \Rightarrow F\_n=M\_n$).

And/or, a coefficient (e.g., k) of L3-RSRP filtering may be independently and differently defined, promised, and/or configured per service.

More specifically, 1) a rule may be defined so that L3-RSRP filtering is not applied when detecting a DCI format related to UL transmission (scheduling) corresponding to a specific traffic, service, and/or application with a higher priority, and/or detecting DCI in a search space.

Alternatively, 2) a coefficient of L3-RSRP filtering may be previously and differently defined, promised, and/or configured per DCI format and/or search space.

Alternatively, 3) a coefficient of L3-RSRP filtering may be independently and differently configured according to a mapping type. For example, if a specific mapping type is limited to being used for UL transmission (scheduling) corresponding to a specific traffic, service, and/or application with a higher priority, a separate coefficient of L3-RSRP filtering (e.g., k=0, i.e., so that L3-RSRP filtering is not applied) for the corresponding mapping type may be configured/indicated via higher/physical layer signal.

Alternatively, 4) a coefficient of L3-RSRP filtering may be independently and differently configured depending on a scheduling unit/time duration of data. For example, if a specific scheduling unit (e.g., mini-slot) is limited to being used for UL transmission (scheduling) corresponding to a specific traffic, service, and/or application with a higher priority, a separate coefficient (e.g., k=0, i.e., so that L3-RSRP filtering is not applied) of L3-RSRP filtering for a channel to be transmitted in the corresponding scheduling unit may be configured/indicated via higher/physical layer signal.

Alternatively, 5) a coefficient of L3-RSRP filtering may be independently and differently configured per RNTI/CRC mask used in scrambling of DCI. For example, if a specific RNTI/CRC mask is limited to being used for UL transmission (scheduling) corresponding to a specific traffic, service, and/or application with a higher priority, a separate coefficient (e.g., k=0, i.e., so that L3-RSRP filtering is not applied) of L3-RSRP filtering for the corresponding RNTI/CRC mask may be configured/indicated via higher/physical layer signal.

(Method 3)

Next, a method of differently configuring and/or determining a timer for trigger of a power headroom report (PHR) depending on a priority of service is described in detail.

For UL transmission corresponding to a specific traffic, service, and/or application with a higher priority, closed-loop power control may be controlled independently from UL transmission corresponding to other traffics, services, and/or applications. Thus, closed-loop power control related parameter (e.g., TPC command) may be separately given. Further, considering this, PHR report and triggering this may be separately configured. That is, a timer (e.g., prohibitPHR-Timer, periodicPHR-Timer) for PHR trigger may be independently (differently) configured per service. For example, if a value of a path loss calculated based on a specific reference signal (RS) power is greater than a predetermined threshold, the UE may configure the PHR transmission to be triggered. Alternatively, a threshold for the PHR triggering may be independently (differently) defined per service. In this instance, the threshold may be previously promised, or configured/indicated via higher/physical layer signal.

(Method 4)

Next, a method of differently configuring and/or determining a power control parameter depending on a service type and/or requirement is described in detail.

The required power may differ per service (or service type, service requirement, service feature) of UL channel. Herein, the service may mean service with specific reliability, specific latency, and/or specific block error rate (BLER) requirement. Further, the service type and/or the service feature may be distinguished according to reliability, latency, and/or BLER requirement.

For example, if the high reliability is required as in URLLC traffic, high power may be required. Hence, a value higher than an open-loop power control parameter configured to other traffics and/or an increase or decrease value greater than an increase or decrease value of a TPC command previously defined for TPC accumulation may be required. To this end, the open-loop power control parameter (e.g., P_O, alpha) and/or the increase or decrease value of the TPC command that has been previously defined for TPC accumulation (or offset value to be additionally applied to the TPC command), etc., as a plurality of parameters, may be configured to the UE.

More specifically, a rule and/or an appointment may be defined so that a value to be actually applied to the power calculation of PUSCH and/or PUCCH is indicated through the following methods.

1) A value to be applied to power calculation may be explicitly indicated via DCI scheduling DL/UL data.

Alternatively, 2) a value to be applied to power calculation may be indicated by service type/requirement configured/indicated via DCI that links service types/requirements per the plurality of parameters in advance and schedules DL/UL data. Herein, the service type/requirement may be configured via higher layer signal, or explicitly indicated via DCI scheduling DL data, or distinguished through a search space to which PDCCH scheduling DL data belongs, or distinguished through a control resource set (CORESET) to which PDCCH scheduling DL data belongs, or distinguished via RNTI, or distinguished via the DCI format, or distinguished through CRC masking of PDCCH.

Alternatively, 3) a value to be applied to power calculation may be indicated by a search space (set) to which PDCCH, that links the search space (set) per the plurality of parameters in advance and schedules DL/UL data, belongs.

Alternatively, 4) a value to be applied to power calculation may be indicated by a control resource set (CORESET) to which PDCCH, that links the CORESET per the plurality of parameters in advance and schedules DL/UL data, belongs.

Alternatively, 5) a value to be applied to power calculation may be indicated by RNTI used in CRC scrambling of PDCCH that links the RNTI per the plurality of parameters in advance and schedules DL/UL data.

Alternatively, 6) a value to be applied to power calculation may be indicated by a DCI format of PDCCH that links the DCI format per the plurality of parameters in advance and schedules DL/UL data. Alternatively, 7) a rule may be defined so that a value to be applied to power calculation is indicated by CRC masking of PDCCH that links the CRC masking per the plurality of parameters in advance and schedules DL/UL data.

In particular, the method 1) above has an advantage capable of solving a problem that a spatial restriction occurs since the scheduling of the base station is limited to a predetermined frequency or time band by linking the CORESET or the search space, and a problem that there occurs a limitation in the number of RNTIs caused by linking the RNTI when there is a plurality of supporting services.

(Method 5)

A method of resetting and/or reconfiguring a reference value of a power control adjustment state depending on a service type and/or requirement upon elapse of a predetermined time is described in detail.

Upon TPC accumulation for a specific UL channel, a reference value of a power control adjustment state to apply a TPC command (i.e., power control adjustment state before the TPC command is added) may be defined as a value of the latest UL channel transmission occasion with the same service as the corresponding TPC command (the old PDCCH reception including the corresponding TPC command). Herein, a service type/requirement of the TPC command may be distinguished with search space/CORESET/RNTI/DCI format/CRC masking, etc. to which PDCCH including the corresponding TPC command belongs (or corresponding to PDCCH).

URLLC traffic may occur sporadically. In this case, because PUSCH corresponding to a reference value of a power control adjustment state to apply a TPC command requires a long time up to the transmission, it may not be preferable to take the accumulation operation. Thus, when a predetermined time passes, a rule may be defined and/or configured so that the UE resets a power control adjustment state. Herein, "when the predetermined time passes" may mean when a previously defined/promised/signalled time passes from the transmission/scheduling of a channel linked to a specific service type/requirement corresponding to the power control adjustment state (or scheduled/triggered by RNTI/DCI format/search space/CORESET/CRC masking indicating a specific service type/requirement), or when a timer is defined and the corresponding timer expires.

This timer may be applied only to a channel corresponding to the specific service type/requirement. Alternatively, this timer may be applied only to a channel scheduled/triggered by RNTI/DCI format/search space/CORESET/CRC masking linked to the specific service type/requirement (or indicating the specific service type/requirement).

And/or, the URLLC may require relatively higher power than eMBB traffic, in order to secure higher reliability. In order to further facilitate this, a rule may be defined so that a reset value is reset to not 0 dB but a previously defined value or a value configured/indicated via the higher/physical layer signal (or an offset value is defined compared to eMBB or configured/indicated via the higher/physical layer signal) when resetting the power control adjustment state.

Fifth Embodiment

Next, a power control method of a plurality of SPSs is described.

In particular, the present disclosure divides and describes power control methods of a plurality of SPSs into 1) a method of configuring and/or determining a TPC command for each SPS configuration (hereinafter, Method 1), and 2) a method of defining and/or configuring a rule and/or an appointment with dynamically scheduled PUSCH (hereinafter, Method 2), for convenience of explanation. However, the methods are merely divided for convenience of explanation, and thus it is apparent that configuration of any method can be replaced by or combined with configurations of other methods.

(Method 1)

A method of configuring and/or determining a transit power control (TPC) command for a plurality of SPS configurations is first described in detail.

The SPS is configurable only in a primary cell and may be activated. It may be useful if a plurality of SPSs is configurable and can be activated for more flexible system operation (and/or with different periods and offsets to reduce a latency). If the SPS is configurable for a plurality of serving cells and can be activated, a power control method for each SPS configuration may be necessary. Similarly, if a plurality of SPSs is configurable for a specific serving cell and can be activated, a power control method for each SPS configuration may also be necessary.

A TPC command transmission/reception method considering the above-described situation is described below.

The UE may perform the power control (particularly, TPC command reception) via group-common DCI (or UE-specific DCI) like DCI format 3/3A. In this instance, information, on which a TPC command (and/or TPC command related information) to be used for the power control for SPS configuration of a specific serving cell (or for a specific SPS configuration within a serving cell) consists of what numberth element of the corresponding DCI, may be previously configured via the higher layer signal. In other words, if the UE is previously configured with information, on which a TPC command (and/or TPC command related information) to apply to SPS for a specific serving cell (or for a specific SPS configuration within a serving cell) is what numberth element of the DCI, via the higher layer signal, and receives the DCI, the UE may obtain and apply TPC command (related information) that shall apply to the SPS activated in the specific serving cell (or to a specific SPS configuration within a serving cell) via this information. Further, information on a (minimum) processing time from a DCI reception time to a time, at which TPC command (related information) to apply to SPS for a specific serving cell (or for a specific SPS configuration within a serving cell) has to be applied, may be configured via the higher layer signal.

And/or, separate RNTI per servicing cell (or per specific SPS configuration within a serving cell) may be assigned to the UE. The UE may obtain and apply TPC command (related information) that shall apply to SPS configuration activated in the corresponding serving cell (or to SPS configuration activated within a serving cell) in DCI that is correctly decoded via RNTI for a specific serving cell (or for a specific SPS configuration within a serving cell). Further, information on a (minimum) processing time from a DCI reception time to a time, at which a TPC command (and/or TPC command related information) to apply to SPS for a specific serving cell (or for a specific SPS configuration within a serving cell) has to be applied, is tied per RNTI and may be configured via the higher layer signal.

And/or, a rule may be defined to derive TPC command (and/or TPC command related information) for remaining serving cells through TPC command (and/or TPC command related information) for a specific serving cell. For example, an offset that shall apply to each (or group) of the remaining serving cells may be previously promised or configured via the higher layer signal, and TPC command (and/or TPC command related information) for each of the remaining serving cells may be derived through TPC command (and/or TPC command related information) indicated for the specific serving cell and the above offset. Similarly, a rule may be defined so that TPC command (and/or TPC command related information) for a specific SPS configuration within one serving cell is transmitted via the above DCI (e.g., DCI format 3/3A)), and the UE applies the offset to it to derive TPC command (and/or TPC command related information) for each of remaining SPS configurations. Further, information on a (minimum) processing time from a DCI reception time to a time, at which a TPC command (and/or TPC command related information) to apply to SPS for a specific serving cell (or for a specific SPS configuration within a serving cell) has to be applied, may be configured via the higher layer signal (together with the offset).

(Method 2)

Next, a method of defining and/or configuring a rule and/or an appointment between power control for dynamically scheduled PUSCH and TPC command for SPS configuration is described in detail.

When UL SPS is able to be configured and/or activated for a plurality of servicing cells, and/or when a plurality of UL SPSs is able to be configured and/or activated for a specific serving cell, if power control (particularly, TPC command reception) for SPS is performed via group-common DCI (or UE-specific DCI) like DCI format 3/3A, a UE operation may need to define how TPC command(s) received from the DCI will affect the power control of PUSCH scheduled by a dynamic UL grant.

If it is previously defined or configured via the higher layer signal that what numberth TPC command in DCI is applied per serving cell and/or per UL SPS configuration index, a rule may be defined so that fc(*) value of a power control loop for dynamically scheduled PUSCH of each servicing cell is updated by a TPC command for specific UL SPS, that is previously defined (e.g., lowest SPS configuration index) or configured via the higher layer signal, among UL SPS configuration indexes configured/activated to the corresponding serving cell.

For example, if SPS configurations 1, 2, 3, and 4 are configured to a primary cell (PCell) and SPS configurations 1, 2, 3, and 4 are configured to a secondary cell (SCell) (or if SPS configurations 5, 6, 7, and 8 are configured for distinguishment form PCell SPS), a TPC command corresponding to the PCell SPS configuration 1 may be applied to dynamically scheduled PUSCH of the PCell, and a TPC command corresponding to the SCell SPS configuration 1 (or 5) may be applied to dynamically scheduled PUSCH of the SCell.

And/or, a rule may be generally defined so that a TPC command for a specific UL SPS configuration index (e.g., lowest SPS configuration index), that is previously defined (or configured via the higher layer signal) within a specific serving cell, is used to update the fc(*) value of the power control loop for dynamically scheduled PUSCH of the corresponding serving cell.

And/or, if UL SPS is configurable and activated for a plurality of servicing cells, and/or if a plurality of UL SPSs is configurable and activated for a specific serving cell, a rule may be defined so that a TPC command for UL SPS is not applied to update the fc(*) value of the power control loop for dynamically scheduled PUSCH. That is, a rule may be defined so that the UE ignores or does not consider the TPC command for UL SPS when calculating the fc(*) value of the power control loop for dynamically scheduled PUSCH.

Since examples of embodiments described in the present disclosure can be included as one of implementations of the present disclosure, it is obvious that they can be regarded as a type of embodiment.

As mentioned above, embodiments described in the present disclosure can be independently implemented, but can be implemented in the form of combination (or incorporation) of some embodiments. A rule may be defined and/or configured so that the base station informs the UE of information on whether to apply embodiments (or information on rules of the embodiments) via pre-defined signalling (e.g., physical layer signalling and/or higher layer signalling).

FIG. 18 is a flow chart illustrating an operation method of a UE described in the present disclosure.

Referring to FIG. 18, a UE may first receive transmission power related information from a base station via higher layer signaling in S1801.

For example, the transmission power related information may include one or more base station reception related parameters (P_O), one or more path loss related parameters (alpha), and/or one or more transmission power control command related parameters (TPC command, increase or decrease value of TPC command that has been previously defined for TPC accumulation, or offset value to be additionally applied to TPC command).

In other words, the base station may transmit, to the UE, the transmission power related information including a plurality of base station reception related parameters (P_O) with different values, a plurality of path loss related parameters (alpha) with different values, and/or a plurality of transmission power control command related parameters with different values (TPC command, increase or decrease value of TPC command, or offset value to be additionally applied to TPC command), or the like.

Herein, the parameters included in the transmission power related information are not limited to the base station reception related parameters (P_O), the path loss related parameters (alpha), and/or the transmission power control command related parameters (increase or decrease value of TPC command, or offset value to be additionally applied to TPC command), and may additionally include various parameters required for calculation and/or configuration of the transmission power.

Next, the UE may receive a physical downlink control channel from the base station in S1802. For example, the physical downlink control channel may include downlink control information (DCI).

Next, the UE may transmit an uplink physical channel to the base station based on the physical downlink control channel in S1803. The uplink physical channel may include a first uplink physical channel and/or a second uplink physical channel. For example, the first uplink physical channel and the second uplink physical channel may be channels for information with different service types (or features, priorities) and/or service requirements. In other words, the first uplink physical channel may be a physical uplink channel for service (or service type) requiring higher reliability, higher quality of service, a larger subcarrier spacing, a shorter transmission time interval (TTI) length, lower latency, a shorter processing time, and/or a lower block error rate than the second uplink physical channel. As another example, the first uplink physical channel may be a channel related to URLLC, and the second uplink physical channel may be a channel that is not included in the first uplink physical channel.

The uplink physical channel may include at least one of a physical uplink control channel or a physical uplink shared channel. In other words, each of the first uplink physical channel and the second uplink physical channel may be a channel including at least one of the physical uplink control channel or the physical uplink shared channel. For example, the first uplink physical channel may include the physical uplink control channel and the physical uplink shared channel that are related to URLLC.

The transmission powers for the first uplink physical channel and the second uplink physical channel may be respectively calculated by different power related parameters determined based on the transmission power related information and the physical downlink control channel.

For example, more specifically, 1) downlink control information included in the physical downlink control channel may include indication information for a power related parameter required for power calculation of the first uplink physical channel and/or the second uplink physical channel. The power related parameter may be one or more parameters determined and/or configured to be used for the power calculation of the first uplink physical channel and/or the second uplink physical channel among the transmission power related information. The UE may determine and/or calculate a parameter required for the power calculation among the transmission power related information based on the indication information, and may transmit, to the base station, the first uplink physical channel and/or the second uplink physical channel with the calculated power. In this instance, the power related parameter for the first uplink physical channel may have a higher value than the power related parameter for the second uplink physical channel. Indication information for the parameters for the power calculation of the first uplink physical channel and the second uplink physical channel may be included by different downlink control information.

And/or, 2) parameters included in the transmission power related information may be linked (associated) with a service type (or feature, priority) and/or service requirement of an uplink physical channel. In this case, downlink control information scheduling DL/UL data may include a service type (or feature, priority) and/or service requirement. The UE may calculate power using parameters linked with the service type and/or the service requirement included in the downlink control information among the transmission power related information, and transmit the uplink physical channel with the corresponding power. The service type (or feature, priority) and/or the service requirement may be configured via the higher layer signal, or may be included in downlink control information scheduling DL data and explicitly indicated, or may be distinguished through a search space (set) to which PDCCH scheduling DL data belongs, or may be distinguished through a control resource set (CORESET) to which PDCCH scheduling DL data belongs, or may be distinguished through RNTI, or may be distinguished through a format of downlink control information, or may be distinguished and/or indicated through CRC masking of PDCCH.

And/or, 3) parameters included in the power related information may be linked (associated) with a search space. In this case, specific parameters may be determined among the transmission power related information by a search space to which PDCCH scheduling DL/UL data belongs, and may be used for the calculation of transmission power of the first uplink physical channel and/or the second uplink physical channel.

And/or, 4) parameters included in the power related information may be linked (associated) with a CORESET. In this case, specific parameters may be determined among the transmission power related information by a CORESET to which PDCCH scheduling DL/UL data belongs, and may be used for the calculation of transmission power of the first uplink physical channel and/or the second uplink physical channel.

And/or, 5) parameters included in the power related information may be linked (associated) with RNTI. In this case, specific parameters may be determined among the transmission power related information by RNTI used in CRC scrambling of PDCCH scheduling DL/UL data, and may be used for the calculation of transmission power of the first uplink physical channel and/or the second uplink physical channel.

And/or, 6) parameters included in the power related information may be linked (associated) with a format of downlink control information (DCI). In this case, specific parameters may be determined among the transmission power related information by DCI format of PDCCH scheduling DL/UL data, and may be used for the calculation of transmission power of the first uplink physical channel and/or the second uplink physical channel. The parameters to be used for the calculation of transmission power of the first uplink physical channel and the second uplink physical channel may be indicated by formats of different downlink control information.

And/or, 7) parameters included in the power related information may be linked (associated) with CRC masking. In this case, specific parameters may be determined among the transmission power related information by CRC masking of PDCCH scheduling DL/UL data, and may be used for the calculation of transmission power of the first uplink physical channel and/or the second uplink physical channel.

And/or, the first uplink physical channel includes a first uplink channel and a second uplink channel transmitted before the first uplink channel, and a reference value of a power control adjustment state of the first uplink channel may be reset when a pre-configured time exceeds from a time at which the second uplink channel is transmitted and/or scheduled.

Herein, the first uplink channel and the second uplink channel are channels related to the same service type (or feature, priority) and/or service requirement, and may be different channels in terms of a transmission time of the UE or a reception time of the base station. The reference value of the power control adjustment state may mean a power adjustment state before adding a current TPC command upon TPC accumulation. A service type (or feature, requirement, priority) and/or service requirement of a TPC command may be distinguished and/or configured with a search space, CORESET, RNTI, a format of downlink control information, and/or CRC masking, etc. belonging to a physical downlink control channel including the corresponding TPC command. The pre-configured time may mean a time that is previously defined, promised, and/or signalled from transmission and/or scheduling of a channel linked with a specific service type and/or service requirement (or scheduled and/or triggered by RNTI, a format of downlink control information, a search space, CORESET, and/or CRC masking indicating the specific service type and/or service requirement), or may means when a timer is defined and the corresponding timer expires. The timer may be applied to a channel corresponding to the specific service type and/or service requirement. Alternatively, the timer may be applied to only a channel scheduled and/or triggered by RNTI, the format of downlink control information, the search space, CORESET, and/or CRC masking linked with the specific service type and/or service requirement (or indicating the specific service type and/or service requirement). The reset may mean resting to a value, that is previously defined or configured and/or indicated via the higher/physical layer signal, not 0 db (decibel).

Since the operation method of the UE illustrated in FIG. 18 is the same as the operation method of the UE described with reference to FIGS. 1 to 17, the detailed description thereof is omitted below.

With regard to this, the UE's operation described above can be implemented in detail by a user equipment (UE) 2020 illustrated in FIG. 20 of the present disclosure. For example, the UE's operation described above may be performed by a processor 2021 and/or a RF unit 2023.

Referring to FIG. 20, the processor 2021 may first receive transmission power related information from a base station via higher layer signaling through the RF unit 2023 in S1801.

For example, the transmission power related information may include one or more base station reception related parameters (P_O), one or more path loss related parameters (alpha), and/or one or more transmission power control command related parameters (TPC command, increase or decrease value of TPC command that has been previously defined for TPC accumulation, or offset value to be additionally applied to TPC command).

In other words, the base station may transmit, to the UE, the transmission power related information including a plurality of base station reception related parameters (P_O) with different values, a plurality of path loss related parameters (alpha) with different values, and/or a plurality of transmission power control command related parameters with different values (TPC command, increase or decrease value of TPC command, or offset value to be additionally applied to TPC command), or the like.

Herein, the parameters included in the transmission power related information are not limited to the base station reception related parameters (P_O), the path loss related parameters (alpha), and/or the transmission power control command related parameters (increase or decrease value of TPC command, or offset value to be additionally applied to TPC command), and may additionally include various parameters required for calculation and/or configuration of the transmission power.

Next, the processor 2021 may receive a physical downlink control channel from the base station through the RF unit 2023 in S1802. For example, the physical downlink control channel may include downlink control information (DCI).

Next, the processor 2021 may transmit an uplink physical channel to the base station based on the physical downlink control channel through the RF unit 2023 in S1803. The uplink physical channel may include a first uplink physical channel and/or a second uplink physical channel. For example, the first uplink physical channel and the second uplink physical channel may be channels for information with different service types (or features, priorities) and/or service requirements. In other words, the first uplink physical channel may be a physical uplink channel for service (or service type) requiring higher reliability, higher quality of service, a larger subcarrier spacing, a shorter transmission time interval (TTI) length, lower latency, a shorter processing time, and/or a lower block error rate than the second uplink physical channel. As another example, the first uplink physical channel may be a channel related to URLLC, and the second uplink physical channel may be a channel that is not included in the first uplink physical channel.

The uplink physical channel may include at least one of a physical uplink control channel or a physical uplink shared channel. In other words, each of the first uplink physical channel and the second uplink physical channel may be a channel including at least one of the physical uplink control channel or the physical uplink shared channel. For example, the first uplink physical channel may include the physical uplink control channel and the physical uplink shared channel that are related to URLLC.

The transmission powers for the first uplink physical channel and the second uplink physical channel may be respectively calculated by different power related parameters determined based on the transmission power related information and the physical downlink control channel. In other words, the transmission power of the first uplink physical channel may be calculated by a different power related parameter from the second uplink physical channel.

For example, more specifically, 1) downlink control information included in the physical downlink control channel may include indication information for a power related parameter required for power calculation of the first uplink physical channel and/or the second uplink physical channel. The power related parameter may be one or more parameters determined and/or configured to be used for the power calculation of the first uplink physical channel and/or the second uplink physical channel among the transmission power related information. The UE may determine and/or calculate a parameter required for the power calculation among the transmission power related information based on the indication information, and may transmit, to the base station, the first uplink physical channel and/or the second uplink physical channel with the calculated power. In this instance, the power related parameter for the first uplink physical channel may have a higher value than the power related parameter for the second uplink physical channel.

And/or, 2) parameters included in the transmission power related information may be linked (associated) with a service type (or feature, priority) and/or service requirement of an uplink physical channel. In this case, downlink control information scheduling DL/UL data may include a service type (or feature, priority) and/or service requirement. The UE may calculate power using parameters linked with the service type and/or the service requirement included in the downlink control information among the transmission power related information, and transmit the uplink physical channel with the corresponding power. The service type (or feature, priority) and/or the service requirement may be configured via the higher layer signal, or may be included in downlink control information scheduling DL data and explicitly indicated, or may be distinguished through a search space (set) to which PDCCH scheduling DL data belongs, or may be distinguished through a control resource set (CORESET) to which PDCCH scheduling DL data belongs, or may be distinguished through RNTI, or may be distinguished through a format of downlink control information, or may be distinguished and/or indicated through CRC masking of PDCCH.

And/or, 3) parameters included in the power related information may be linked (associated) with a search space. In this case, specific parameters may be determined among the transmission power related information by a search space to which PDCCH scheduling DL/UL data belongs, and may be used for the calculation of transmission power of the first uplink physical channel and/or the second uplink physical channel.

And/or, 4) parameters included in the power related information may be linked (associated) with a CORESET. In this case, specific parameters may be determined among the transmission power related information by a CORESET to which PDCCH scheduling DL/UL data belongs, and may be used for the calculation of transmission power of the first uplink physical channel and/or the second uplink physical channel.

And/or, 5) parameters included in the power related information may be linked (associated) with RNTI. In this case, specific parameters may be determined among the transmission power related information by RNTI used in CRC scrambling of PDCCH scheduling DL/UL data, and may be used for the calculation of transmission power of the first uplink physical channel and/or the second uplink physical channel.

And/or, 6) parameters included in the power related information may be linked (associated) with a format of downlink control information (DCI). In this case, specific parameters may be determined among the transmission power related information by DCI format of PDCCH scheduling DL/UL data, and may be used for the calculation of transmission power of the first uplink physical channel and/or the second uplink physical channel.

And/or, 7) parameters included in the power related information may be linked (associated) with CRC masking. In this case, specific parameters may be determined among the transmission power related information by CRC masking of PDCCH scheduling DL/UL data, and may be used for the calculation of transmission power of the first uplink physical channel and/or the second uplink physical channel.

And/or, the first uplink physical channel includes a first uplink channel and a second uplink channel transmitted before the first uplink channel, and a reference value of a power control adjustment state of the first uplink channel may be reset when a pre-configured time exceeds from a time at which the second uplink channel is transmitted and/or scheduled.

Herein, the first uplink channel and the second uplink channel are channels related to the same service type (or feature, priority) and/or service requirement, and may be different channels in terms of a transmission time of the UE or a reception time of the base station. The reference value of the power control adjustment state may mean a power adjustment state before adding a current TPC command upon TPC accumulation. A service type (or feature, requirement, priority) and/or service requirement of a TPC command may be distinguished and/or configured with a search space, CORESET, RNTI, a format of downlink control information, and/or CRC masking, etc. belonging to a physical downlink control channel including the corresponding TPC command. The pre-configured time may mean a time that is previously defined, promised, and/or signalled from transmission and/or scheduling of a channel linked with a specific service type and/or service requirement (or scheduled and/or triggered by RNTI, a format of downlink control information, a search space, CORESET, and/or CRC masking indicating the specific service type and/or service requirement), or may means when a timer is defined and the corresponding timer expires. The timer may be applied to a channel corresponding to the specific service type and/or service requirement. Alternatively, the timer may be applied to only a channel scheduled and/or triggered by RNTI, the format of downlink control information, the search space, CORESET, and/or CRC masking linked with the specific service type and/or service requirement (or indicating the specific service type and/or service requirement). The reset may mean resting to a value, that is previously defined or configured and/or indicated via the higher/physical layer signal, not 0 db (decibel).

Since the operation of the UE 2020 illustrated in FIG. 20 is the same as the operation of the UE described with reference to FIGS. 1 to 18, the detailed description thereof is omitted below.

FIG. 19 is a flow chart illustrating an operation method of a base station described in the present disclosure.

Referring to FIG. 19, a base station may first transmit transmission power related information to a UE via higher layer signaling in S1901.

For example, the transmission power related information may include one or more base station reception related parameters (P_O), one or more path loss related parameters (alpha), and/or one or more transmission power control command related parameters (TPC command, increase or decrease value of TPC command that has been previously defined for TPC accumulation, or offset value to be additionally applied to TPC command).

In other words, the base station may transmit, to the UE, the transmission power related information including a plurality of base station reception related parameters (P_O) with different values, a plurality of path loss related parameters (alpha) with different values, and/or a plurality of transmission power control command related parameters with different values (TPC command, increase or decrease value of TPC command, or offset value to be additionally applied to TPC command), or the like.

Herein, the parameters included in the transmission power related information are not limited to the base station reception related parameters (P_O), the path loss related parameters (alpha), and/or the transmission power control command related parameters (increase or decrease value of TPC command, or offset value to be additionally applied to TPC command), and may additionally include various parameters required for calculation and/or configuration of the transmission power.

Next, the base station may transmit a physical downlink control channel to the UE in S1902. For example, the physical downlink control channel may include downlink control information (DCI).

Next, the base station may receive an uplink physical channel from the UE in S1903. The uplink physical channel may include a first uplink physical channel and/or a second uplink physical channel. For example, the first uplink physical channel and the second uplink physical channel may be channels for information with different service types (or features, priorities) and/or service requirements. In other words, the first uplink physical channel may be a physical uplink channel for service (or service type) requiring higher reliability, higher quality of service, a larger subcarrier spacing, a shorter transmission time interval (TTI) length, lower latency, a shorter processing time, and/or a lower block error rate than the second uplink physical channel. As another example, the first uplink physical channel may be a channel related to URLLC, and the second uplink physical channel may be a channel that is not included in the first uplink physical channel.

The uplink physical channel may include at least one of a physical uplink control channel or a physical uplink shared channel. In other words, each of the first uplink physical channel and the second uplink physical channel may be a channel including at least one of the physical uplink control channel or the physical uplink shared channel. For example, the first uplink physical channel may include the physical uplink control channel and the physical uplink shared channel that are related to URLLC.

The transmission powers for the first uplink physical channel and the second uplink physical channel may be respectively calculated by different power related parameters determined based on the transmission power related information and the physical downlink control channel. In other words, the transmission power of the first uplink physical channel may be calculated by a different power related parameter from the second uplink physical channel.

For example, more specifically, 1) downlink control information included in the physical downlink control channel may include indication information for a power related parameter required for power calculation of the first uplink physical channel and/or the second uplink physical channel. The power related parameter may be one or more parameters determined and/or configured to be used for the power calculation of the first uplink physical channel and/or the second uplink physical channel among the transmission power related information. The UE may determine and/or calculate a parameter required for the power calculation among the transmission power related information based on the indication information, and may transmit, to the base station, the first uplink physical channel and/or the second uplink physical channel with the calculated power. In this instance, the power related parameter for the first uplink physical channel may have a higher value than the power related parameter for the second uplink physical channel.

And/or, 2) parameters included in the transmission power related information may be linked (associated) with a service type (or feature, priority) and/or service requirement of an uplink physical channel. In this case, downlink control information scheduling DL/UL data may include a service type (or feature, priority) and/or service requirement. The UE may calculate power using parameters linked with the service type and/or the service requirement included in the downlink control information among the transmission power related information, and transmit the uplink physical channel with the corresponding power. The service type (or feature, priority) and/or the service requirement may be configured via the higher layer signal, or may be included in downlink control information scheduling DL data and explicitly indicated, or may be distinguished through a search space (set) to which PDCCH scheduling DL data belongs, or may be distinguished through a control resource set (CORESET) to which PDCCH scheduling DL data belongs, or may be distinguished through RNTI, or may be distinguished through a format of downlink control information, or may be distinguished and/or indicated through CRC masking of PDCCH.

And/or, 3) parameters included in the power related information may be linked (associated) with a search space. In this case, specific parameters may be determined among the transmission power related information by a search space to which PDCCH scheduling DL/UL data belongs, and may be used for the calculation of transmission power of the first uplink physical channel and/or the second uplink physical channel.

And/or, 4) parameters included in the power related information may be linked (associated) with a CORESET. In this case, specific parameters may be determined among the transmission power related information by a CORESET to which PDCCH scheduling DL/UL data belongs, and may be used for the calculation of transmission power of the first uplink physical channel and/or the second uplink physical channel.

And/or, 5) parameters included in the power related information may be linked (associated) with RNTI. In this case, specific parameters may be determined among the transmission power related information by RNTI used in CRC scrambling of PDCCH scheduling DL/UL data, and may be used for the calculation of transmission power of the first uplink physical channel and/or the second uplink physical channel.

And/or, 6) parameters included in the power related information may be linked (associated) with a format of downlink control information (DCI). In this case, specific parameters may be determined among the transmission power related information by DCI format of PDCCH scheduling DL/UL data, and may be used for the calculation of transmission power of the first uplink physical channel and/or the second uplink physical channel.

And/or, 7) parameters included in the power related information may be linked (associated) with CRC masking. In this case, specific parameters may be determined among the transmission power related information by CRC masking of PDCCH scheduling DL/UL data, and may be used for the calculation of transmission power of the first uplink physical channel and/or the second uplink physical channel.

And/or, the first uplink physical channel includes a first uplink channel and a second uplink channel transmitted before the first uplink channel, and a reference value of a power control adjustment state of the first uplink channel may be reset when a pre-configured time exceeds from a time at which the second uplink channel is transmitted and/or scheduled.

Herein, the first uplink channel and the second uplink channel are channels related to the same service type (or feature, priority) and/or service requirement, and may be different channels in terms of a transmission time of the UE or a reception time of the base station. The reference value of the power control adjustment state may mean a power adjustment state before adding a current TPC command upon TPC accumulation. A service type (or feature, requirement, priority) and/or service requirement of a TPC command may be distinguished and/or configured with a search space, CORESET, RNTI, a format of downlink control information, and/or CRC masking, etc. belonging to a physical downlink control channel including the corresponding TPC command. The pre-configured time may mean a time that is previously defined, promised, and/or signalled from transmission and/or scheduling of a channel linked with a specific service type and/or service requirement (or scheduled and/or triggered by RNTI, a format of downlink control information, a search space, CORESET, and/or CRC masking indicating the specific service type and/or service requirement), or may means when a timer is defined and the corresponding timer expires. The timer may be applied to a channel corresponding to the specific service type and/or service requirement. Alternatively, the timer may be applied to only a channel scheduled and/or triggered by RNTI, the format of downlink control information, the search space, CORESET, and/or CRC masking linked with the specific service type and/or service requirement (or indicating the specific service type and/or service requirement). The reset may mean resting to a value, that is previously defined or configured and/or indicated via the higher/physical layer signal, not 0 db (decibel).

Since the operation of the base station illustrated in FIG. 19 is the same as the operation of the base station described with reference to FIGS. 1 to 18, the detailed description thereof is omitted below.

With regard to this, the operation of the base station described above can be implemented in detail by a base station 2010 illustrated in FIG. 20 of the present disclosure. For example, the operation of the base station described above may be performed by a processor 2011 and/or a RF unit 2013.

Referring to FIG. 20, the processor 2011 may first transmit transmission power related information to a UE via higher layer signaling through the RF unit 2013 in S1901.

For example, the transmission power related information may include one or more base station reception related parameters (P_O), one or more path loss related parameters (alpha), and/or one or more transmission power control command related parameters (TPC command, increase or decrease value of TPC command that has been previously defined for TPC accumulation, or offset value to be additionally applied to TPC command).

In other words, the base station may transmit, to the UE, the transmission power related information including a plurality of base station reception related parameters (P_O) with different values, a plurality of path loss related parameters (alpha) with different values, and/or a plurality of transmission power control command related parameters with different values (TPC command, increase or decrease value of TPC command, or offset value to be additionally applied to TPC command), or the like.

Herein, the parameters included in the transmission power related information are not limited to the base station reception related parameters (P_O), the path loss related parameters (alpha), and/or the transmission power control command related parameters (increase or decrease value of TPC command, or offset value to be additionally applied to TPC command), and may additionally include various parameters required for calculation and/or configuration of the transmission power.

Next, the processor 2011 may transmit a physical downlink control channel to the UE through the RF unit 2013 in S1902. For example, the physical downlink control channel may include downlink control information (DCI).

Next, the processor 2011 may receive an uplink physical channel from the UE through the RF unit 2013 in S1903. The uplink physical channel may include a first uplink physical channel and/or a second uplink physical channel. For example, the first uplink physical channel and the second uplink physical channel may be channels for information with different service types (or features, priorities) and/or service requirements. In other words, the first uplink physical channel may be a physical uplink channel for service (or service type) requiring higher reliability, higher quality of service, a larger subcarrier spacing, a shorter transmission time interval (TTI) length, lower latency, a shorter processing time, and/or a lower block error rate than the second uplink physical channel. As another example, the first uplink physical channel may be a channel related to URLLC, and the second uplink physical channel may be a channel that is not included in the first uplink physical channel.

The uplink physical channel may include at least one of a physical uplink control channel or a physical uplink shared channel. In other words, each of the first uplink physical channel and the second uplink physical channel may be a channel including at least one of the physical uplink control channel or the physical uplink shared channel. For example, the first uplink physical channel may include the physical uplink control channel and the physical uplink shared channel that are related to URLLC.

The transmission powers for the first uplink physical channel and the second uplink physical channel may be respectively calculated by different power related parameters determined based on the transmission power related information and the physical downlink control channel. In other words, the transmission power of the first uplink physical channel may be calculated by a different power related parameter from the second uplink physical channel.

For example, more specifically, 1) downlink control information included in the physical downlink control channel may include indication information for a power related parameter required for power calculation of the first uplink physical channel and/or the second uplink physical channel. The power related parameter may be one or more parameters determined and/or configured to be used for the power calculation of the first uplink physical channel and/or the second uplink physical channel among the transmission power related information. The UE may determine and/or calculate a parameter required for the power calculation among the transmission power related information based on the indication information, and may transmit, to the base station, the first uplink physical channel and/or the second uplink physical channel with the calculated power. In this instance, the power related parameter for the first uplink physical channel may have a higher value than the power related parameter for the second uplink physical channel.

And/or, 2) parameters included in the transmission power related information may be linked (associated) with a service type (or feature, priority) and/or service requirement of an uplink physical channel. In this case, downlink control information scheduling DL/UL data may include a service type (or feature, priority) and/or service requirement. The UE may calculate power using parameters linked with the service type and/or the service requirement included in the downlink control information among the transmission power related information, and transmit the uplink physical channel with the corresponding power. The service type (or feature, priority) and/or the service requirement may be configured via the higher layer signal, or may be included in downlink control information scheduling DL data and explicitly indicated, or may be distinguished through a search space (set) to which PDCCH scheduling DL data belongs, or may be distinguished through a control resource set (CORESET) to which PDCCH scheduling DL data belongs, or may be distinguished through RNTI, or may be distinguished through a format of downlink control information, or may be distinguished and/or indicated through CRC masking of PDCCH.

And/or, 3) parameters included in the power related information may be linked (associated) with a search space. In this case, specific parameters may be determined among the transmission power related information by a search space to which PDCCH scheduling DL/UL data belongs, and may be used for the calculation of transmission power of the first uplink physical channel and/or the second uplink physical channel.

And/or, 4) parameters included in the power related information may be linked (associated) with a CORESET. In this case, specific parameters may be determined among the transmission power related information by a CORESET to which PDCCH scheduling DL/UL data belongs, and may be used for the calculation of transmission power of the first uplink physical channel and/or the second uplink physical channel.

And/or, 5) parameters included in the power related information may be linked (associated) with RNTI. In this case, specific parameters may be determined among the transmission power related information by RNTI used in CRC scrambling of PDCCH scheduling DL/UL data, and may be used for the calculation of transmission power of the first uplink physical channel and/or the second uplink physical channel.

And/or, 6) parameters included in the power related information may be linked (associated) with a format of downlink control information (DCI). In this case, specific parameters may be determined among the transmission power related information by DCI format of PDCCH scheduling DL/UL data, and may be used for the calculation of transmission power of the first uplink physical channel and/or the second uplink physical channel.

And/or, 7) parameters included in the power related information may be linked (associated) with CRC masking. In this case, specific parameters may be determined among the transmission power related information by CRC masking of PDCCH scheduling DL/UL data, and may be used for the calculation of transmission power of the first uplink physical channel and/or the second uplink physical channel.

And/or, the first uplink physical channel includes a first uplink channel and a second uplink channel transmitted before the first uplink channel, and a reference value of a power control adjustment state of the first uplink channel may be reset when a pre-configured time exceeds from a time at which the second uplink channel is transmitted and/or scheduled.

Herein, the first uplink channel and the second uplink channel are channels related to the same service type (or feature, priority) and/or service requirement, and may be different channels in terms of a transmission time of the UE or a reception time of the base station. The reference value of the power control adjustment state may mean a power adjustment state before adding a current TPC command upon TPC accumulation. A service type (or feature, requirement, priority) and/or service requirement of a TPC command may be distinguished and/or configured with a search space, CORESET, RNTI, a format of downlink control information, and/or CRC masking, etc. belonging to a physical downlink control channel including the corresponding TPC command. The pre-configured time may mean a time that is previously defined, promised, and/or signalled from transmission and/or scheduling of a channel linked with a specific service type and/or service requirement (or scheduled and/or triggered by RNTI, a format of downlink control information, a search space, CORESET, and/or CRC masking indicating the specific service type and/or service requirement), or may means when a timer is defined and the corresponding timer expires. The timer may be applied to a channel corresponding to the specific service type and/or service requirement. Alternatively, the timer may be applied to only a channel scheduled and/or triggered by RNTI, the format of downlink control information, the search space, CORESET, and/or CRC masking linked with the specific service type and/or service requirement (or indicating the specific service type and/or service requirement). The reset may mean resting to a value, that is previously defined or configured and/or indicated via the higher/physical layer signal, not 0 db (decibel).

Since the operation of the base station illustrated in FIG. 20 is the same as the operation of the base station described with reference to FIGS. 1 to 18, the detailed description thereof is omitted below.

Overview of Device to which the Present Disclosure is Applicable

FIG. 20 illustrates an example of an internal block diagram of a wireless communication device to which the present disclosure is applicable.

Referring to FIG. 20, a wireless communication system includes a base station 2010 and multiple UEs 2020 located in an area of the base station.

The base station 2010 includes a processor 2011, a memory 2012, and a radio frequency (RF) unit 2013. The processor 2011 implements functions, processes, and/or methods described in FIGS. 1 to 19. Layers of radio interface protocol may be implemented by the processor 2011. The memory 2012 is connected to the processor 2011 and stores various types of information for driving the processor 2011. The RF unit 2013 is connected to the processor 2011 and transmits and/or receives radio signals.

The UE 2020 includes a processor 2021, a memory 2022, and a RF unit 2023. The processor 2021 implements functions, processes, and/or methods described in FIGS. 1 to 19. Layers of radio interface protocol may be implemented by the processor 2021. The memory 2022 is connected to the processor 2021 and stores various types of information for driving the processor 2021. The RF unit 2023 is connected to the processor 2021 and transmits and/or receives radio signals.

The memories 2012 and 2022 may be inside or outside the processors 2011 and 2021 and may be connected to the processors 2011 and 2021 through various well-known means.

Further, the base station 2010 and/or the UE 2020 may have a single antenna or multiple antennas.

FIG. 21 illustrates a block configuration diagram of a communication device according to an embodiment of the present disclosure.

In particular, FIG. 21 illustrates in more detail the UE illustrated in FIG. 20.

Referring to FIG. 21, the UE may include a processor (or digital signal processor (DSP)) 2110, an RF module (or RF unit) 2135, a power management module 2105, an antenna 2140, a battery 2155, a display 2115, a keypad 2120, a memory 2130, a subscriber identification module (SIM) card 2125 (which is optional), a speaker 2145, and a microphone 2150. The UE may also include a single antenna or multiple antennas.

The processor 2110 implements functions, processes, and/or methods described in FIGS. 1 to 20. Layers of a radio interface protocol may be implemented by the processor 2110.

The memory 2130 is connected to the processor 2110 and stores information related to operations of the processor 2110. The memory 2130 may be inside or outside the processor 2110 and may be connected to the processors 2110 through various well-known means.

A user inputs instructional information, such as a telephone number, for example, by pushing (or touching) buttons of the keypad 2120 or by voice activation using the microphone 2150. The processor 2110 receives and processes the instructional information to perform an appropriate function, such as to dial the telephone number. Operational data may be extracted from the SIM card 2125 or the memory 2130. Further, the processor 2110 may display instructional information or operational information on the display 2115 for the user's reference and convenience.

The RF module 2135 is connected to the processor 2110 and transmits and/or receives a RF signal. The processor 2110 sends instructional information to the RF module 2135 in order to initiate communication, for example, transmit a radio signal configuring voice communication data. The RF module 2135 consists of a receiver and a transmitter to receive and transmit the radio signal. The antenna 2140 functions to transmit and receive the radio signal. Upon reception of the radio signal, the RF module 2135 may send a signal to be processed by the processor 2110 and convert the signal into a baseband. The processed signal may be converted into audible or readable information output via the speaker 2145.

Figure 22:
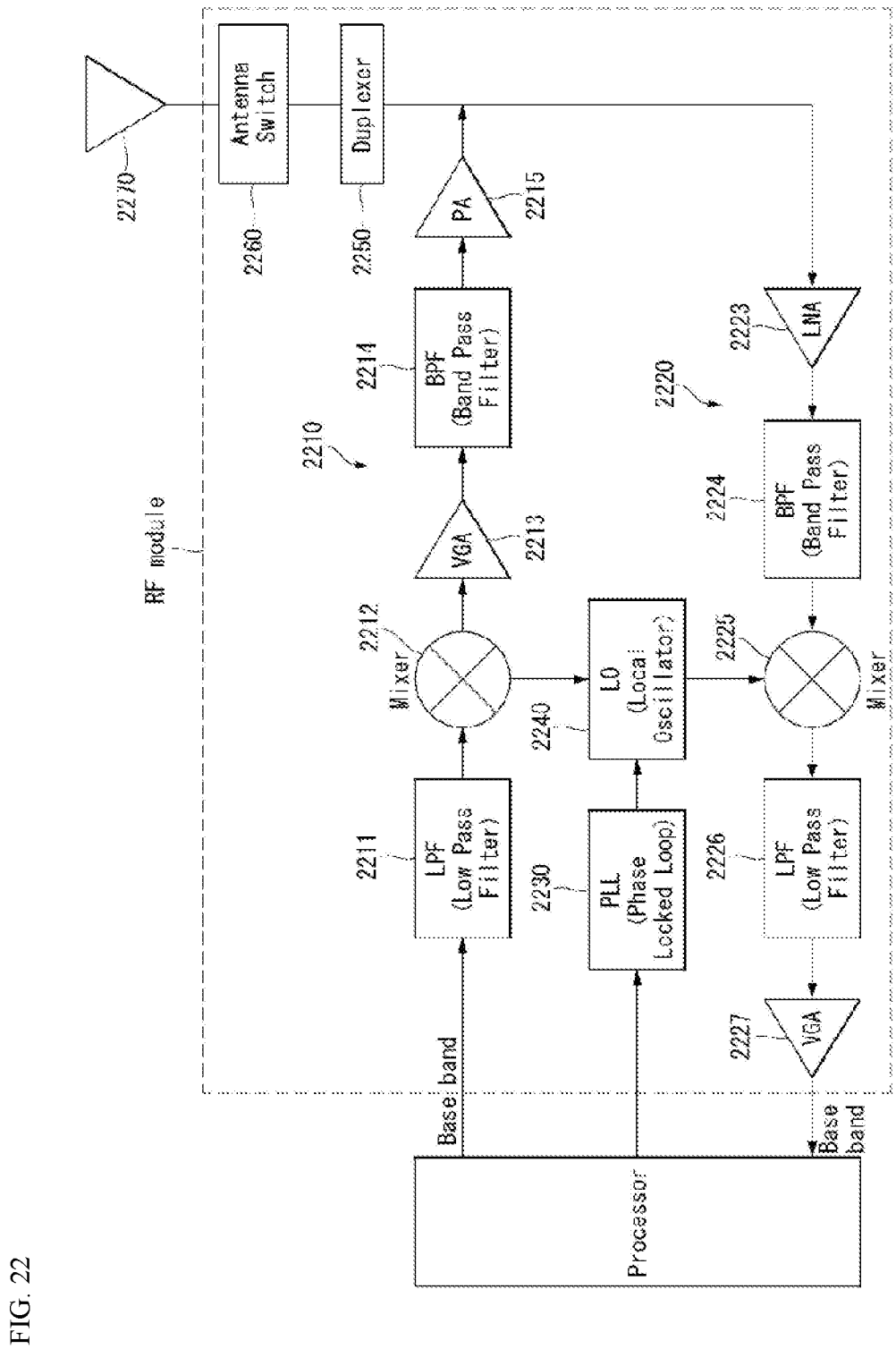
FIG. 22 illustrates an example of a RF module of a wireless communication device to which a method described in the present disclosure is applicable.

FIG. 22 illustrates an example of a RF module of a wireless communication device to which a method described in the present disclosure is applicable.

More specifically, FIG. 22 illustrates an example of an RF module that can be implemented in a frequency division duplex (FDD) system.

First, in a transmission path, the processor described in FIGS. 20 and 21 processes data to be transmitted and provides an analog output signal to a transmitter 2210.

In the transmitter 2210, the analog output signal is filtered by a low pass filter (LPF) 2211 to remove images caused by a digital-to-analog conversion (ADC), is up-converted from a baseband to an RF by an up-converter (mixer) 2212, and is amplified by a variable gain amplifier (VGA) 2213. The amplified signal is filtered by a filter 2214, is additionally amplified by a power amplifier (PA) 2215, is routed through duplexer(s) 2250/antenna switch(s) 2260, and is transmitted through an antenna 2270.

Further, in a reception path, the antenna 2270 receives signals from the outside and provides the received signals, and the signals are routed through the antenna switch(s) 2260/duplexers 2250 and are provided to a receiver 2220.

In the receiver 2220, the received signals are amplified by a low noise amplifier (LNA) 2223, are filtered by a bans pass filter 2224, and are down-converted from the RF to the baseband by a down-converter (mixer) 2225.

The down-converted signal is filtered by a low pass filter (LPF) 2226 and is amplified by a VGA 2227 to obtain an analog input signal, and the analog input signal is provided to the processor described in FIGS. 20 and 21.

Further, a local oscillator (LO) generator 2240 generates transmitted and received LO signals and provides them to each of the up-converter 2212 and the down-converter 2225.

In addition, a phase locked loop (PLL) 2230 receives control information from the processor in order to generate the transmitted and received LO signals at appropriate frequencies and provides control signals to the LO generator 2240.

The circuits illustrated in FIG. 22 may be arranged differently from the configuration illustrated in FIG. 22.

Figure 23:
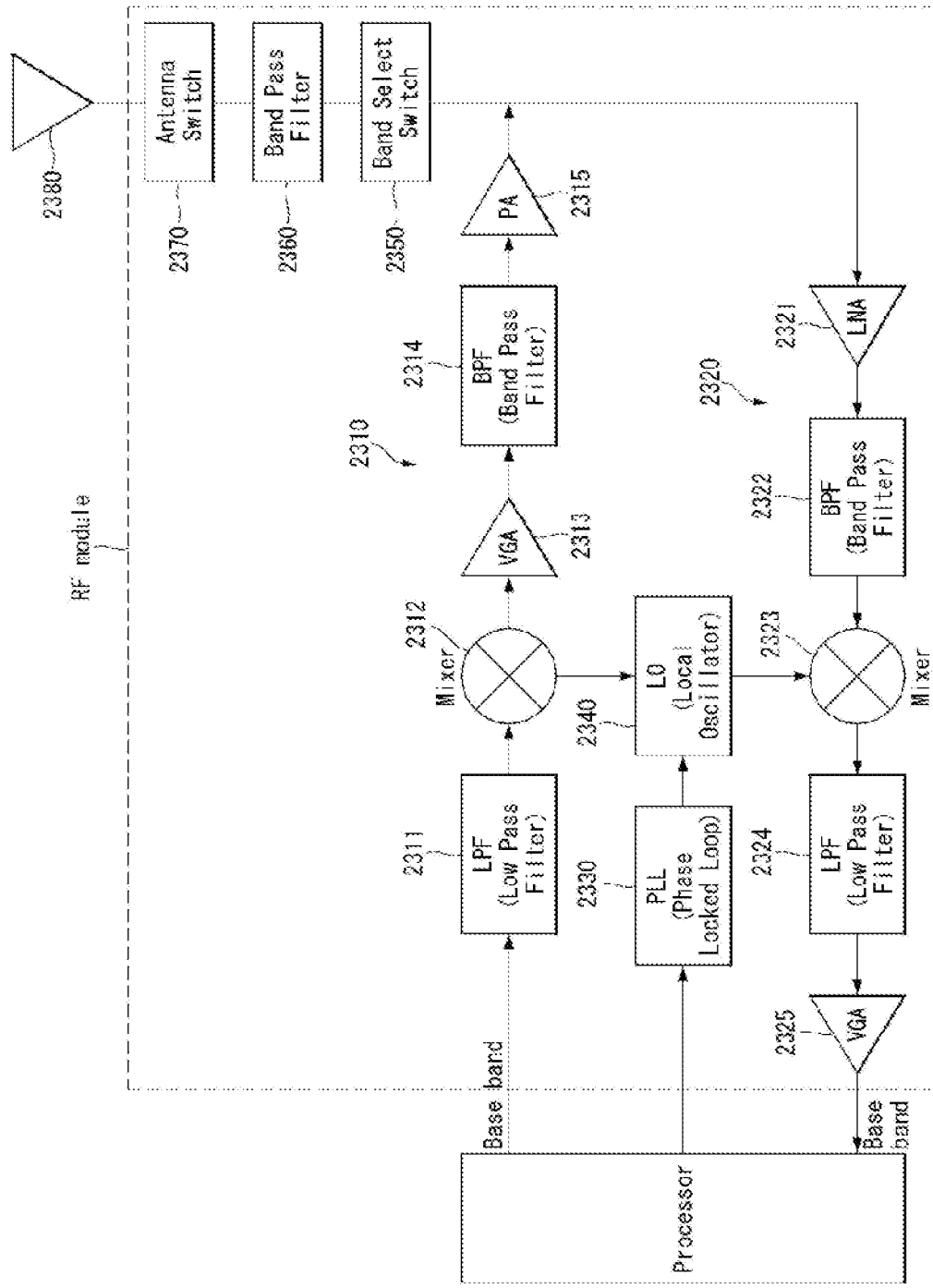
FIG. 23 illustrates another example of a RF module of a wireless communication device to which a method described in the present disclosure is applicable.

FIG. 23 illustrates another example of a RF module of a wireless communication device to which a method described in the present disclosure is applicable.

More specifically, FIG. 23 illustrates an example of an RF module that can be implemented in a time division duplex (TDD) system.

A transmitter 2310 and a receiver 2320 of the RF module in the TDD system have the same structure as the transmitter and the receiver of the RF module in the FDD system.

Only the structure of the RF module of the TDD system that differs from the RF module of the FDD system will be described below, and the same structure refers to the description of FIG. 22.

A signal amplified by a power amplifier (PA) 2315 of the transmitter 2310 is routed through a band select switch 2350, a band pass filter (BPF) 2360, and antenna switch(s) 2370 and is transmitted via an antenna 2380.

Further, in a reception path, the antenna 2380 receives signals from the outside and provides the received signals, and the signals are routed through the antenna switch(s) 2370, the band pass filter 2360, and the band select switch 2350 and are provided to the receiver 2320.

The embodiments described above are implemented by combinations of components and features of the present disclosure in predetermined forms. Each component or feature should be considered selectively unless specified separately. Each component or feature can be carried out without being combined with another component or feature. Moreover, some components and/or features are combined with each other and can implement embodiments of the present disclosure. The order of operations described in embodiments of the present disclosure can be changed. Some components or features of one embodiment may be included in another embodiment, or may be replaced by corresponding components or features of another embodiment. It is apparent that some claims referring to specific claims may be combined with another claims referring to the claims other than the specific claims to constitute the embodiment or add new claims by means of amendment after the application is filed.

Embodiments of the present disclosure can be implemented by various means, for example, hardware, firmware, software, or combinations thereof. When embodiments are implemented by hardware, one embodiment of the present disclosure can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and the like.

When embodiments are implemented by firmware or software, one embodiment of the present disclosure can be implemented by modules, procedures, functions, etc. performing functions or operations described above. Software code can be stored in a memory and can be driven by a processor. The memory is provided inside or outside the processor and can exchange data with the processor by various well-known means.

It is apparent to those skilled in the art that the present disclosure can be embodied in other specific forms without departing from essential features of the present disclosure. Accordingly, the aforementioned detailed description should not be construed as limiting in all aspects and should be considered as illustrative. The scope of the present disclosure should be determined by rational construing of the appended claims, and all modifications within an equivalent scope of the present disclosure are included in the scope of the present disclosure.

INDUSTRIAL APPLICABILITY

Although the present disclosure has described a method for transmitting uplink data in a wireless communication system, focusing on examples applying to the 3GPP LTE/LTE-A system, the present disclosure can be applied to various wireless communication systems, such as the 5G system, other than the 3GPP LTE/LTE-A system.

The invention claimed is:

1. A method of transmitting, by a user equipment (UE), an uplink physical channel in a wireless communication system, the method comprising:
performing a synchronization with a base station;
receiving, from the base station, system information;
receiving, from the base station, transmission power related information and service type related information via higher layer signaling;
receiving, from the base station, a physical downlink control channel (PDCCH) including a downlink control information (DCI) for the uplink physical channel on a control resource set (CORESET) or a search space, wherein a transmission power parameter is determined based on the CORESET or the search space;
determining transmission power for the uplink physical channel based on the transmission power parameter;
transmitting, to the base station, the uplink physical channel based on the transmission power,
wherein the transmission power parameter is based on an estimated downlink pathloss from a reference signal received power (RSRP), and a layer 3 filtering related parameter applied to the RSRP is differently configured per service type of the uplink physical channel.

2. The method of claim 1, wherein the transmission power related information includes one or more base station reception related parameters, one or more path loss related parameters, and/or one or more transmission power control command related parameters.

3. The method of claim 1, further comprising:
receiving, from the base station, another PDCCH including another DCI for another uplink physical channel on another CORESET or another search space;
determining transmission power for the uplink physical channel based on transmission power parameter set based on the another CORESET or the another search space; and
transmitting, to the base station, the another uplink physical channel based on the transmission power,
wherein a service type of the uplink physical channel is different from a service type of the another uplink physical channel.

4. The method of claim 3, wherein the uplink physical channel is a physical uplink channel for a service requiring higher reliability, higher quality of service, a larger subcarrier spacing, a shorter transmission time interval (TTI) length, a lower latency, a shorter processing time, and/or a lower block error rate than the another uplink physical channel.

5. The method of claim 3, for the uplink physical channel, a layer 3 filtering is not performed.

6. The method of claim 3, a layer 3 filtering related parameter for the uplink physical channel is configured differently from a layer 3 filtering related parameter for the another uplink physical channel.

7. The method of claim 1, wherein the uplink physical channel includes at least one of a physical uplink control channel or a physical uplink shared channel.

8. The method of claim 1, wherein the first uplink physical channel includes a first uplink channel and a second uplink channel transmitted before the first uplink channel,
wherein a reference value of a power control adjustment state of the first uplink channel is reset based on a pre-configured time exceeding from a time at which the second uplink channel is transmitted or scheduled.

9. A user equipment (UE) configured to transmit an uplink physical channel in a wireless communication system, the UE comprising:
at least one transceiver;
at least one processor; and
at least one memory operably connectable to the at least one processor and storing instructions that, based on being executed by the at least one processor, perform operations comprising:
performing synchronization with a base station;
receiving, from the base station, system information;
receiving, from the base station, transmission power related information and service type related information via higher layer signaling;
receiving, from the base station, a physical downlink control channel (PDCCH) including a downlink control information (DCI) for the uplink physical channel on a control resource set (CORESET) or a search space, wherein a transmission power parameter is determined based on the CORESET or the search space;
determining transmission power for the uplink physical channel based on the transmission power parameter set;
transmitting, to the base station, the uplink physical channel based on the transmission power,
wherein the transmission power parameter is based on an estimated downlink pathloss from a reference signal received power (RSRP), and a layer 3 filtering related parameter applied to the RSRP is differently configured per service type of the uplink physical channel.

10. The UE of claim 9, wherein the transmission power related information includes one or more base station reception related parameters, one or more path loss related parameters, and/or one or more transmission power control command related parameters.

11. The UE of claim 9, the operations further comprise:
receiving, from the base station, another PDCCH including another DCI for another uplink physical channel on another CORESET or another search space;
determining transmission power for the uplink physical channel based on transmission power parameter set based on the another CORESET or the another search space; and
transmitting, to the base station, the another uplink physical channel based on the transmission power,
wherein a service type of the uplink physical channel is different from a service type of the another uplink physical channel.

12. The UE of claim 11, wherein the uplink physical channel is a physical uplink channel for a service requiring higher reliability, higher quality of service, a larger subcarrier spacing, a shorter transmission time interval (TTI) length, a lower latency, a shorter processing time, and/or a lower block error rate than the another uplink physical channel.

13. The UE of claim 11, for the uplink physical channel, a layer 3 filtering is not performed.

14. A base station configured to receive an uplink physical channel in a wireless communication system, the base station comprising:
at least one transceiver;
at least one processor; and
at least one memory operably connectable to the at least one processor and storing instructions that, based on being executed by the at least one processor, perform operations comprising:

performing a synchronization with a user equipment;
transmitting, to the user equipment, system information;
transmitting, to the user equipment, transmission power related information and service type related information via higher layer signaling;
transmitting, to the user equipment, a physical downlink control channel (PDCCH) including a downlink control information (DCI) for the uplink physical channel on a control resource set (CORESET) or a search space, wherein a transmission power parameter is determined based on the CORESET or the search space, wherein transmission power for the uplink physical channel is determined based on the transmission power parameter set;
receiving, from the user equipment, the uplink physical channel based on the transmission power,
wherein the transmission power parameter is based on an estimated downlink pathloss from a reference signal received power (RSRP), and a layer 3 filtering related parameter applied to the RSRP is differently configured per service type of the uplink physical channel.

* * * * *